(12) United States Patent
Farr et al.

(10) Patent No.: US 11,503,875 B2
(45) Date of Patent: Nov. 22, 2022

(54) SOLE STRUCTURES INCLUDING POLYOLEFIN PLATES AND ARTICLES OF FOOTWEAR FORMED THEREFROM

(71) Applicant: NIKE, Inc., Beaverton, OR (US)

(72) Inventors: Isaac Farr, Beaverton, OR (US); Devon Frazier, Beaverton, OR (US); Jeremy D. Walker, Portland, OR (US); Zachary C. Wright, Beaverton, OR (US)

(73) Assignee: NIKE, INC., Beaverton, OR (US)

( * ) Notice: Subject to any disclaimer, the term of this patent is extended or adjusted under 35 U.S.C. 154(b) by 0 days.

(21) Appl. No.: 16/931,010

(22) Filed: Jul. 16, 2020

(65) Prior Publication Data

US 2021/0015205 A1 Jan. 21, 2021

Related U.S. Application Data

(60) Provisional application No. 62/876,251, filed on Jul. 19, 2019, provisional application No. 63/037,208, filed on Jun. 10, 2020.

(51) Int. Cl.
*B32B 3/08* (2006.01)
*B32B 27/32* (2006.01)
(Continued)

(52) U.S. Cl.
CPC .............. *A43B 13/04* (2013.01); *A43B 13/12* (2013.01); *A43B 13/122* (2013.01);
(Continued)

(58) Field of Classification Search
CPC ....... A43B 13/04; A43B 13/12; A43B 13/141; A43B 13/18; A43B 13/187; A43B 13/22;
(Continued)

(56) References Cited

U.S. PATENT DOCUMENTS 1,963,577 A * 6/1934 Cuozzo ................... A43B 13/32
 12/146 D
3,190,016 A * 6/1965 Hansjosten ............ A43B 13/12
 36/14
(Continued)

FOREIGN PATENT DOCUMENTS

BE 549506 A * 12/1959 ........... A43B 13/026
CN 1259967 A 7/2000
(Continued)

OTHER PUBLICATIONS

Derwent Abstract for RO 93151 A, Dec. 1987 (Year: 1987).*
(Continued)

*Primary Examiner* — Jeffrey A Vonch
(74) *Attorney, Agent, or Firm* — Thomas | Horstemeyer, LLP

(57) ABSTRACT

Sole structures including a plate including a first polyolefin resin, and an edge portion comprising a second resin are disclosed herein. The edge portion is more flexible or less rigid than the plate. Articles of footwear formed from the sole structures are also provided. Methods of making the polyolefin resin compositions, plates, edge portions, sole structures, and articles of footwear are also provided. In some aspects, the first polyolefin resin composition includes an effective amount of a polymeric resin modifier.

14 Claims, 19 Drawing Sheets

(51) Int. Cl.

| | | |
|---|---|---|
| A43B 9/00 | (2006.01) | |
| A43B 13/04 | (2006.01) | |
| A43B 13/12 | (2006.01) | |
| A43B 13/18 | (2006.01) | |
| B32B 3/30 | (2006.01) | |
| B32B 3/26 | (2006.01) | |
| B32B 7/022 | (2019.01) | |
| B32B 3/02 | (2006.01) | |
| B32B 3/06 | (2006.01) | |
| C08L 23/14 | (2006.01) | |
| C08L 23/12 | (2006.01) | |
| B29D 35/14 | (2010.01) | |
| B29D 35/08 | (2010.01) | |
| B29D 35/06 | (2010.01) | |
| A43B 5/02 | (2006.01) | |
| B32B 7/08 | (2019.01) | |
| B32B 5/14 | (2006.01) | |
| C08F 210/06 | (2006.01) | |
| A43B 13/22 | (2006.01) | |
| A43B 9/12 | (2006.01) | |
| A43B 9/16 | (2006.01) | |
| B29D 35/12 | (2010.01) | |
| A43B 13/14 | (2006.01) | |

(52) U.S. Cl.
CPC ............ *A43B 13/187* (2013.01); *B29D 35/06* (2013.01); *B29D 35/08* (2013.01); *B29D 35/142* (2013.01); *B32B 3/02* (2013.01); *B32B 3/06* (2013.01); *B32B 3/08* (2013.01); *B32B 3/266* (2013.01); *B32B 3/30* (2013.01); *B32B 7/022* (2019.01); *B32B 27/327* (2013.01); *C08L 23/12* (2013.01); *C08L 23/142* (2013.01); *A43B 5/02* (2013.01); *A43B 9/00* (2013.01); *A43B 9/12* (2013.01); *A43B 9/16* (2013.01); *A43B 13/141* (2013.01); *A43B 13/22* (2013.01); *B29D 35/062* (2013.01); *B29D 35/067* (2013.01); *B29D 35/122* (2013.01); *B32B 3/26* (2013.01); *B32B 5/142* (2013.01); *B32B 7/08* (2013.01); *B32B 2274/00* (2013.01); *B32B 2307/4023* (2013.01); *B32B 2307/546* (2013.01); *B32B 2323/10* (2013.01); *B32B 2437/02* (2013.01); *C08F 210/06* (2013.01); *C08F 2500/27* (2021.01); *C08F 2500/30* (2021.01); *C08F 2800/20* (2013.01); *Y10T 428/24488* (2015.01); *Y10T 428/24612* (2015.01); *Y10T 428/24777* (2015.01)

(58) Field of Classification Search
CPC ........... A43B 13/223; A43B 1/14; A43B 5/02; B32B 7/022; B32B 3/08; B32B 3/266; B32B 3/30; B32B 27/06; B32B 27/08; B32B 27/32; B32B 2274/00; B32B 2307/4023; B32B 2307/546; B32B 2437/02; Y10T 428/24273; Y10T 428/24322; Y10T 428/24479; Y10T 428/24612; Y10T 428/24777; Y10T 428/24942; Y10T 428/2495
USPC ....... 428/131, 137, 156, 172, 192, 212, 213, 428/220; 36/87, 102, 103, 113–115, 128, 36/25 R, 59 C
See application file for complete search history.

(56) References Cited

U.S. PATENT DOCUMENTS

| | | | | |
|---|---|---|---|---|
| 3,824,716 | A * | 7/1974 | Di Paolo | B29D 35/081 36/32 R |
| 3,851,411 | A | 12/1974 | Crosbie et al. | |
| 4,120,477 | A * | 10/1978 | Justamante | B29D 35/081 249/109 |
| 4,434,518 | A * | 3/1984 | Watanabe | A43B 13/04 12/142 RS |
| 4,542,598 | A * | 9/1985 | Misevich | A43B 13/16 36/31 |
| 5,025,573 | A * | 6/1991 | Giese | A43B 13/181 36/31 |
| 5,118,753 | A * | 6/1992 | Hikasa | C08K 5/20 525/198 |
| 5,300,365 | A * | 4/1994 | Ogale | C08F 297/08 428/461 |
| 5,538,804 | A * | 7/1996 | Ogale | B32B 27/08 525/216 |
| 5,784,809 | A * | 7/1998 | McDonald | A43B 13/12 36/115 |
| 5,820,719 | A | 10/1998 | Strickland et al. | |
| 6,008,286 | A | 12/1999 | Groves | |
| 6,308,439 | B1 * | 10/2001 | Ellis, III | A43B 13/143 36/31 |
| 6,584,705 | B2 | 7/2003 | Lain | |
| 6,948,264 | B1 | 9/2005 | Lyden | |
| 7,585,796 | B2 | 9/2009 | Suzuki et al. | |
| 7,619,038 | B2 | 11/2009 | Mehta et al. | |
| 8,079,159 | B1 * | 12/2011 | Rosa | A43B 7/142 36/31 |
| 8,263,707 | B2 | 9/2012 | Datta et al. | |
| 8,505,216 | B2 | 8/2013 | Sokolowski et al. | |
| 10,182,617 | B2 | 1/2019 | Craig | |
| 11,044,963 | B2 | 6/2021 | Love et al. | |
| 11,272,758 | B2 | 3/2022 | Farr et al. | |
| 2002/0028875 | A1 | 3/2002 | Anderle et al. | |
| 2002/0050078 | A1 * | 5/2002 | Dietrich | A43B 7/24 36/31 |
| 2002/0162246 | A1 * | 11/2002 | Mayer | A43B 13/38 36/102 |
| 2003/0131499 | A1 * | 7/2003 | Silverman | A43B 13/28 36/91 |
| 2004/0087751 | A1 * | 5/2004 | Tau | C09K 3/10 525/240 |
| 2004/0166752 | A1 | 8/2004 | Taghavi | |
| 2004/0168348 | A1 | 9/2004 | Strickland | |
| 2005/0016029 | A1 * | 1/2005 | Auger | A43B 13/14 36/134 |
| 2005/0022425 | A1 * | 2/2005 | Brown | A43B 7/12 36/25 R |
| 2007/0107258 | A1 * | 5/2007 | Umezawa | A43B 5/00 36/28 |
| 2007/0180731 | A1 * | 8/2007 | Polegato Moretti | B29D 35/062 36/14 |
| 2008/0010863 | A1 * | 1/2008 | Auger | A43D 8/00 36/103 |
| 2008/0249232 | A1 | 10/2008 | Datta et al. | |
| 2009/0019730 | A1 * | 1/2009 | Salminen | A43B 7/1425 36/102 |
| 2009/0031584 | A1 * | 2/2009 | Rasmussen | A43B 7/24 12/146 B |
| 2009/0163643 | A1 * | 6/2009 | Kiss | C08L 23/0815 525/240 |
| 2009/0260259 | A1 * | 10/2009 | Berend | A43B 7/1435 36/35 B |
| 2009/0320330 | A1 * | 12/2009 | Borel | A43B 13/12 36/30 R |
| 2010/0031531 | A1 * | 2/2010 | Baucom | B29C 45/16 36/43 |
| 2010/0192421 | A1 | 8/2010 | Kerns et al. | |
| 2010/0263234 | A1 * | 10/2010 | Teteriatnikov | A43B 13/145 36/108 |

(56) References Cited

U.S. PATENT DOCUMENTS

| | | | |
|---|---|---|---|
| 2010/0285325 A1* | 11/2010 | Hoya | C08L 23/10 |
| | | | 525/240 |
| 2010/0287792 A1* | 11/2010 | Hide | A43B 5/10 |
| | | | 36/114 |
| 2011/0061264 A1* | 3/2011 | Solymosi | A43B 13/12 |
| | | | 36/88 |
| 2011/0065865 A1* | 3/2011 | Bokhari | C08L 23/10 |
| | | | 525/99 |
| 2011/0082256 A1* | 4/2011 | Martinez | B32B 7/12 |
| | | | 525/77 |
| 2011/0082257 A1* | 4/2011 | Carnahan | C08L 23/00 |
| | | | 525/88 |
| 2011/0179680 A1* | 7/2011 | Miette | A43B 13/141 |
| | | | 36/30 R |
| 2011/0277355 A1* | 11/2011 | Fahmi | A43B 13/42 |
| | | | 36/30 R |
| 2011/0313107 A1* | 12/2011 | Shan | C08L 23/142 |
| | | | 525/88 |
| 2012/0036740 A1* | 2/2012 | Gerber | A43B 13/26 |
| | | | 36/134 |
| 2012/0151806 A1* | 6/2012 | Polegato Moretti | B29D 35/142 |
| | | | 36/3 B |
| 2012/0180343 A1* | 7/2012 | Auger | A43B 13/26 |
| | | | 12/146 B |
| 2012/0198728 A1* | 8/2012 | Farrelly | A43B 7/148 |
| | | | 36/25 R |
| 2012/0208961 A1* | 8/2012 | Carnahan | C08L 23/10 |
| | | | 525/88 |
| 2013/0177720 A1* | 7/2013 | Liang | C08J 5/18 |
| | | | 525/88 |
| 2013/0255103 A1 | 10/2013 | Dua et al. | |
| 2013/0318824 A1* | 12/2013 | Auger | A43B 5/02 |
| | | | 36/88 |
| 2014/0208619 A1* | 7/2014 | Kenens | A43B 13/04 |
| | | | 521/134 |
| 2014/0250727 A1* | 9/2014 | VanDernoot | A43B 7/34 |
| | | | 36/102 |
| 2015/0047229 A1* | 2/2015 | Elliott | A43B 23/227 |
| | | | 36/102 |
| 2015/0068066 A1* | 3/2015 | Ludemann | A43B 21/24 |
| | | | 36/83 |
| 2015/0082668 A1* | 3/2015 | Nonogawa | A43B 7/144 |
| | | | 36/30 R |
| 2015/0096199 A1* | 4/2015 | Cavaliere | A43B 13/38 |
| | | | 36/103 |
| 2015/0143720 A1 | 5/2015 | Avar | |
| 2015/0351492 A1 | 12/2015 | Dombrow et al. | |
| 2016/0083571 A1* | 3/2016 | Li | C08L 23/14 |
| | | | 525/240 |
| 2016/0128433 A1 | 5/2016 | Downing et al. | |
| 2016/0150835 A1* | 6/2016 | Salmini | A41D 13/08 |
| | | | 428/137 |
| 2016/0174655 A1 | 6/2016 | Schiller et al. | |
| 2016/0192737 A1* | 7/2016 | Campos, II | B32B 27/08 |
| | | | 12/146 B |
| 2016/0219978 A1 | 8/2016 | Elder et al. | |
| 2016/0242499 A1 | 8/2016 | Droege et al. | |
| 2016/0262494 A1* | 9/2016 | Weidl | A43B 23/042 |
| 2016/0270475 A1* | 9/2016 | Foxen | A43B 13/42 |
| 2016/0295935 A1 | 10/2016 | Foster et al. | |
| 2016/0295971 A1 | 10/2016 | Arnese et al. | |
| 2016/0309841 A1* | 10/2016 | Diard | A43B 13/04 |
| 2016/0338446 A1* | 11/2016 | Merlo | A43B 13/186 |
| 2017/0181498 A1* | 6/2017 | Whelan | C08J 9/08 |
| 2017/0273399 A1* | 9/2017 | Nishi | A43B 13/04 |
| 2018/0116337 A1* | 5/2018 | Montross | B29D 35/0054 |
| 2018/0125151 A1* | 5/2018 | Möhlmann | A43B 13/203 |
| 2018/0153254 A1* | 6/2018 | Fusco | A43B 13/187 |
| 2018/0303192 A1* | 10/2018 | Su | B32B 27/32 |
| 2018/0312675 A1* | 11/2018 | Inoue | C08L 23/12 |
| 2018/0327580 A1 | 11/2018 | Minowa et al. | |
| 2019/0016079 A1* | 1/2019 | Tanabe | A43B 5/00 |
| 2019/0029361 A1* | 1/2019 | Gopalan | A43B 13/187 |
| 2019/0031870 A1* | 1/2019 | Grestenberger | C08L 23/16 |
| 2019/0045880 A1* | 2/2019 | Li | B29D 35/148 |
| 2019/0098946 A1 | 4/2019 | Bee et al. | |
| 2019/0116929 A1* | 4/2019 | Kurcinka | A43B 13/186 |
| 2019/0225784 A1* | 7/2019 | Farr | C08L 23/14 |
| 2019/0343220 A1* | 11/2019 | Farr | B32B 27/32 |
| 2019/0343221 A1 | 11/2019 | Farr et al. | |
| 2019/0380434 A1* | 12/2019 | Luh | B32B 9/047 |
| 2020/0275738 A1* | 9/2020 | Rhenter | A43B 13/383 |
| 2021/0022445 A1 | 1/2021 | Dua et al. | |
| 2021/0085025 A1* | 3/2021 | Geis | A43B 13/145 |
| 2021/0214536 A1* | 7/2021 | Tateishi | B29D 35/122 |
| 2022/0142295 A1* | 5/2022 | Laverty | A43B 13/141 |

FOREIGN PATENT DOCUMENTS

| | | | | |
|---|---|---|---|---|
| CN | 1531883 A | * | 9/2004 | |
| CN | 1537484 A | | 10/2004 | |
| CN | 1796448 A | * | 7/2006 | |
| CN | 101389469 A | | 3/2009 | |
| CN | 101466784 A | | 6/2009 | |
| CN | 104824901 A | | 8/2015 | |
| CN | 105415818 A | * | 3/2016 | |
| CN | 206525647 U | | 9/2017 | |
| DE | 1865048 U | * | 1/1963 | |
| DE | 2709546 A | * | 9/1978 | A43B 13/187 |
| EP | 0962459 A1 | | 12/1999 | |
| EP | 1504688 A1 | * | 2/2005 | A43B 13/04 |
| EP | 1591031 A1 | * | 11/2005 | A43B 13/223 |
| EP | 1820821 A1 | | 8/2007 | |
| EP | 2471858 A1 | | 7/2012 | |
| EP | 3005897 A1 | | 4/2016 | |
| EP | 3168261 A1 | | 5/2017 | |
| EP | 3168361 A1 | | 5/2017 | |
| EP | 3199586 A1 | | 8/2017 | |
| EP | 3245889 | | 11/2017 | |
| EP | 3315040 A2 | | 5/2018 | |
| EP | 3427603 A1 | | 1/2019 | |
| EP | 2471859 A1 | | 7/2021 | |
| FR | 1109855 A | * | 2/1956 | |
| FR | 2775875 A1 | * | 9/1999 | A43B 13/026 |
| FR | 2898252 A1 | * | 9/2007 | A43B 13/026 |
| GB | 1062411 A | * | 3/1967 | A43B 13/12 |
| GB | 2425706 A | * | 11/2006 | A43B 13/141 |
| JP | 08113681 A | * | 5/1996 | A43B 13/026 |
| JP | 2000210102 A | | 8/2000 | |
| JP | 2005278989 A | * | 10/2005 | |
| KR | 2017053782 A | * | 5/2017 | A43B 13/12 |
| NL | 272430 A | * | 12/1960 | A43B 13/04 |
| WO | 0001528 A1 | | 1/2000 | |
| WO | WO-03005845 A1 | * | 1/2003 | A43B 5/02 |
| WO | 2006065648 A1 | | 6/2006 | |
| WO | 2007120147 A1 | | 10/2007 | |
| WO | WO-2007120147 A1 | * | 10/2007 | C08K 5/01 |
| WO | 2015164091 A1 | | 10/2015 | |
| WO | 2017082358 A1 | | 5/2017 | |
| WO | 2017104452 A1 | | 6/2017 | |
| WO | WO-2017115840 A1 | * | 7/2017 | B29D 35/122 |
| WO | WO-2017141200 A1 | * | 8/2017 | A43B 13/12 |

OTHER PUBLICATIONS

"Waterborne Adhesives and Sealants," Apr. 17, 2017, Polymer Properties Database available at https://web.archive.org/web/20170417122206/https://polymerdatabase.com/Adhesives/WB%20Adhesives.html. (Year: 2017).

International Preliminary Report on Patentability for PCT/US2019/015016, dated Feb. 19, 2020.

International Preliminary Report on Patentability for PCT/US2019/015021, dated Jul. 7, 2020.

International Preliminary Report on Patentability for PCT/US2019/031389, dated Apr. 3, 2020.

International Preliminary Report on Patentability for PCT/US2019/031392, dated Aug. 27, 2020.

International Search Report and Written Opinion for PCT/US2019/015016 dated Jul. 29, 2019.

(56) References Cited

OTHER PUBLICATIONS

International Search Report and Written Opinion for PCT/US2019/015021, dated Jun. 5, 2019.
International Search Report and Written Opinion for PCT/US2019/031389, dated Sep. 6, 2019.
International Search Report and Written Opinion for PCT/US2019/031392, dated Sep. 6, 2019.
Written Opinion for PCT/US2019/015016, dated Nov. 20, 2019.
Written Opinion for PCT/US2019/015021, dated Jan. 8, 2020.
Written Opinion for PCT/US2019/015021, dated Mar. 26, 2020.
Written Opinion for PCT/US2019/015021, dated May 11, 2020.
Written Opinion for PCT/US2019/031392, dated Apr. 1, 2020.
"Present Situation and Development of Thermoplastic Elastomers", LEI Xiaoping, et al., Fiber Composites, No. 2.
International Search Report and Written Opinion for PCT/US2022/072223, dated Aug. 22, 2022.

* cited by examiner

SOLE STRUCTURES INCLUDING POLYOLEFIN PLATES AND ARTICLES OF FOOTWEAR FORMED THEREFROM

CROSS-REFERENCE TO RELATED APPLICATIONS

This application claims the benefit of and priority to U.S. Provisional Application Ser. No. 62/876,251, having the title "SOLE STRUCTURES INCLUDING POLYOLEFIN PLATES AND ARTICLES OF FOOTWEAR FORMED THEREFROM", filed on Jul. 19, 2019, and to U.S. Provisional Application Ser. No. 63/037,208, having the title "SOLE STRUCTURES INCLUDING POLYOLEFIN PLATES AND ARTICLES OF FOOTWEAR FORMED THEREFROM", filed on Jun. 10, 2020, the disclosures of which are incorporated herein by reference in their respective entireties.

TECHNICAL FIELD

The present disclosure generally relates to sole structures and plates including polyolefin resins and articles of footwear including said sole structures.

BACKGROUND

The design and manufacture of footwear and sporting equipment involves a variety of factors from the aesthetic aspects, to the comfort and feel, to the performance and durability. While design and fashion may be rapidly changing, the demand for increasing performance in the footwear and sporting equipment market is unchanging. In addition, the market has shifted to demand lower-cost and recyclable materials still capable of meeting increasing performance demands. To balance these demands, designers of footwear and sporting equipment employ a variety of materials and designs for the various components.

BRIEF DESCRIPTION OF THE DRAWINGS

Further aspects of the present disclosure will be readily appreciated upon review of the detailed description, described below, when taken in conjunction with the accompanying drawings.

FIG. 1A is a lateral side perspective view of the exemplary article of athletic footwear. FIG. 1B is a lateral side elevational view of the exemplary article of athletic footwear. FIG. 1C is a medial side elevational view of the exemplary article of athletic footwear. FIG. 1D is a top view of the exemplary article of athletic footwear. FIG. 1E is a front view of the exemplary article of athletic footwear. FIG. 1F is a rear view of the exemplary article of athletic footwear. FIG. 1G is an exploded perspective view of the exemplary article of athletic footwear. FIG. 1H is a sectional view along 1-1 of the exemplary article of athletic footwear.

FIG. 2A is a lateral side elevational view of the exemplary article of athletic footwear. FIG. 2B is an exploded perspective view of the exemplary article of athletic footwear. FIG. 2C is a sectional view along 2-2 of the exemplary article of athletic footwear.

FIG. 4A is a lateral side elevational view of the exemplary article of athletic footwear. FIG. 4B is an exploded perspective view of the exemplary article of athletic footwear. FIG. 4C is a sectional view along 4-4 of the exemplary article of athletic footwear.

FIG. 5A is a lateral side elevational view of the exemplary article of athletic footwear. FIG. 5B is an exploded perspective view of the exemplary article of athletic footwear.

FIG. 6A is a lateral side elevational view of the exemplary article of athletic footwear. FIG. 6B is a sectional view along 6B-6B of the exemplary article of athletic footwear of FIG. 6A. FIG. 6C is an exploded perspective view of the exemplary article of athletic footwear. FIG. 6D is a lateral side elevational view of an exemplary article of athletic footwear. FIG. 6E is a sectional view of an alternative exemplary article as viewed along 6E-6E of athletic footwear of FIG. 6D.

FIG. 7A is a lateral side elevation view of the exemplary article of athletic footwear. FIG. 7B is a sectional view along 7-7 of the exemplary article of athletic footwear of FIG. 7A.

FIG. 8A is a lateral side elevation view of the exemplary article of athletic footwear. FIG. 8B is a sectional view along 8-8 of the exemplary article of athletic footwear of FIG. 8A.

DETAILED DESCRIPTION

Figure 1A:
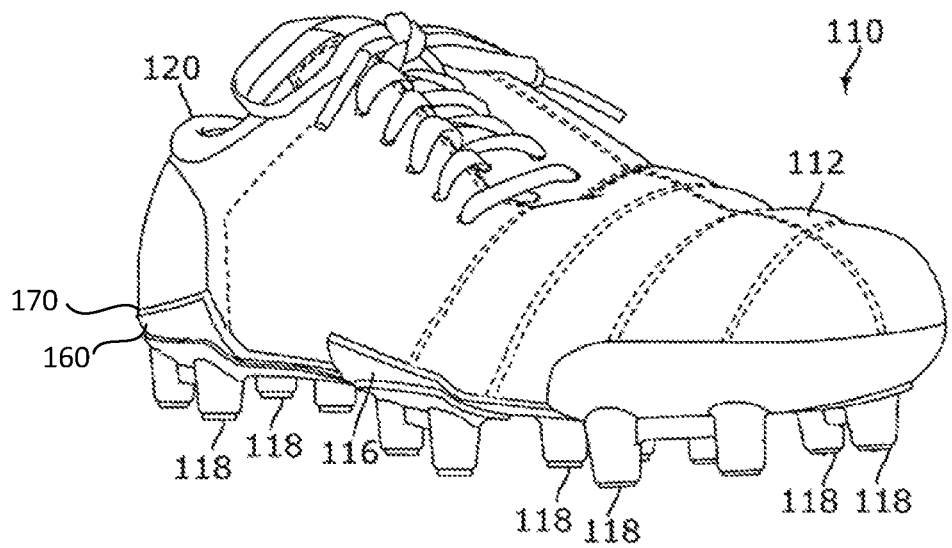
FIGS. 1A-1H depict an exemplary article of athletic footwear.

State of the art specialty polymers for footwear and sporting equipment include polymers such as polyurethane and polyamide polymers, but there remains a need for lower-cost alternatives to these performance polymers, especially lower-cost alternatives that are recyclable and readily processable. Alternatives such as polyolefins, while cost-effective, have traditionally suffered from poor mechanical properties and poor surfaces and surface energies for bonding. New designs and materials are needed. In particular, there remains a need for improved polymer resins for making components of footwear and sporting equipment which are resistant to stress whitening or cracking when flexed under cold conditions, resistant to abrasion, and that are capable of adequate bonding for footwear and other athletic equipment applications.

In various aspects, this disclosure provides sole structures including a plate containing a polyolefin resin composition, and an edge portion attached to an outer perimeter of the plate. Plates having the polyolefin resin compositions can have improved mechanical properties making them particularly suitable for use in components for footwear and sporting equipment. Specifically, these resin compositions are both resistant to stress whitening or cracking when flexed under cold conditions and resistant to abrasion to the levels needed for use in footwear and sporting equipment. However, the connection between the plate and the upper at the biteline is not always as durable as desired. In some aspects, the sole structures include the plate, the edge portion, and a textile on one or more surfaces of the plate. The textile can improve the bonding of other components (e.g. an upper or a chassis) to the plate, the edge portion, or both. The textile can also be used for decorative purposes.

In various aspects, the edge portion can be extended so that it overlaps and wraps about at least a portion of the upper. When affixed to the upper, the extended edge portion can provide a more durable bond between the sole structure and the upper. The extended edge portion can be disposed around substantially the entire outer periphery of the article of footwear, or only in target areas. For example, the extended edge portion may extend about the forefoot portion, the midfoot portion, the heel portion or a combination thereof. The extended edge portion may provide additional properties, such as abrasion resistance, water resistance, or a combination thereof. In some aspects, the extended edge portion may have a decorative appearance, such as a colored or printed decorative element. In some aspects, the extended edge portion may have a textured surface.

In some aspects, this disclosure provides a sole structure for an article of footwear, the sole structure having a plate containing a first polyolefin resin, the plate having a first side and a second side, and a perimeter, wherein the first side is configured to be ground-facing when the plate is a component of an article of footwear; and an edge portion comprising a second resin that is different from the first polyolefin resin, the edge portion disposed on at least a portion of the perimeter. In some aspects, the edge portion is more flexible than the plate. In some aspects, a textile is disposed on one or both of the first side and the second side. In some aspects, the sole structure further includes a chassis configured to be on the first side of the plate. The chassis can wrap around the plate and engage or be attached to an upper when the sole structure is a component of an article of footwear, for example the chassis can attach to the upper at the bite line. In some aspects, the chassis can include the edge portion. In some aspects, the sole structures do not include a textile, e.g. the sole structure can include the plate, edge portion, and a chassis as described above and detailed more fully below.

In various aspects, this disclosure also provides articles of footwear including a sole structure described herein.

The present disclosure will be better understood upon reading the following numbered aspects, which should not be confused with the claims. Any of the numbered aspects below can, in some instances, be combined with aspects described elsewhere in this disclosure and such combinations are intended to form part of the disclosure.

Aspect 1. A sole structure for an article of footwear, the sole structure comprising: a plate comprising a first polyolefin resin, the plate having a first side and a second side and a perimeter, wherein the first side is configured to be ground-facing when the plate is a component of an article of footwear; and an edge portion comprising a second resin that is different from the first polyolefin resin, the edge portion disposed on at least a portion of the perimeter.

Aspect 2. The sole structure according to any one of Aspect 1 to Aspect 127, wherein the edge portion is more flexible than the plate.

Aspect 3. The sole structure according to any one of Aspect 1 to Aspect 127, wherein the edge portion is less rigid than the plate.

Aspect 4. The sole structure according to any one of Aspect 1 to Aspect 127, wherein the edge portion is integral with the plate.

Aspect 5. The sole structure according to any one of Aspect 1 to Aspect 127, wherein the edge portion is separately formed, and operably coupled with the plate.

Aspect 6. The sole structure according to any one of Aspect 1 to Aspect 127, wherein the edge portion is disposed about substantially the entire perimeter of the plate.

Aspect 7. The sole structure according to any one of Aspect 1 to Aspect 127, wherein the edge portion is adhesively bonded to the plate.

Aspect 8. The sole structure according to any one of Aspect 1 to Aspect 127, wherein the edge portion is thermally bonded to the plate.

Aspect 9. The sole structure according to any one of Aspect 1 to Aspect 127, wherein the edge portion is mechanically bonded to the plate.

Aspect 10. The sole structure according to any one of the Aspect 1 to Aspect 127, wherein the edge portion has a thickness of from about 1 millimeter to about 5 millimeters.

Aspect 11. The sole structure according to any one of the Aspect 1 to Aspect 127, wherein the edge portion has a width of from about 0.25 millimeter to about 25 millimeters.

Aspect 12. The sole structure according to any one of Aspect 1 to Aspect 127, wherein the edge portion has a flexural modulus that is at least 10 percent, or at least 15 percent or at least 20 percent or at least 25 percent, or at least 30 percent or at least 35 percent lower than a flexural modulus of the plate.

Aspect 13. The sole structure according to any one of Aspect 1 to Aspect 127, wherein the edge portion has a Durometer hardness that is at least 10 percent, or at least 15 percent or at least 20 percent or at least 25 percent, or at least 30 percent or at least 35 percent lower than a Durometer hardness of the plate.

Aspect 14. The sole structure according to any one of Aspect 1 to Aspect 127, wherein the edge portion operably couples with an upper when the sole structure is a component of an article of footwear.

Aspect 15. The sole structure according to any one of Aspect 1 to Aspect 127, wherein the edge portion attaches to the upper at the bite line when the sole structure is a component of an article of footwear.

Aspect 16. The sole structure according to any one of Aspect 1 to Aspect 127, wherein at least a portion of the edge portion extends beyond the bite line when the sole structure is a component of an article of footwear.

Aspect 17. The sole structure according to any one of Aspect 1 to Aspect 127, wherein the edge portion extends beyond the bite line about 0.25 millimeters to about 25 millimeters, or from about 0.5 millimeters to about 10 millimeters, or from about 1 millimeter to about 5 millimeters, or from about 1 to about 3 millimeters, when the sole structure is a component of an article of footwear.

Aspect 18. The sole structure according to any one of Aspect 1 to Aspect 127, wherein the edge portion has at least one decorative portion that is colored or printed or both.

Aspect 19. The sole structure according to any one of Aspect 1 to Aspect 127, wherein a decorative textile or film is disposed on an exterior surface of the edge portion.

Aspect 20. The sole structure according to any one of Aspect 1 to Aspect 127, wherein a decorative textile or film is disposed on an interior surface of the edge portion, between the edge portion and the upper.

Aspect 21. The sole structure according to any one of Aspect 1 to Aspect 127, wherein the edge portion has a textured surface.

Aspect 22. The sole structure according to any one of Aspect 1 to Aspect 127, wherein the first polyolefin resin comprises a resin composition according to any one of Aspect 195 to Aspect 260.

Aspect 23. The sole structure according to any one of Aspect 1 to Aspect 127, wherein the second resin comprises a resin composition according to any one of Aspect 195 to Aspect 260.

Aspect 24. The sole structure according to any one of Aspect 1 to Aspect 127, wherein the second resin comprises a resin composition that is the same as that of first polyolefin resin, except comprising a greater amount of polymeric resin modifier.

Aspect 25. The sole structure according to any one of Aspect 1 to Aspect 127, wherein the second resin comprises a polyolefin resin composition according to any one of Aspect 195 to Aspect 260, and wherein the effective amount of the polymeric resin modifier is an amount effective to increase flexibility of the resin composition, decrease rigidity of the resin composition, decrease hardness of the resin composition, increase bonding between the resin composition and a textile, or any combination thereof, by at least 2 percent, optionally by at least 5 percent or at least 10 percent or at least 15 percent or at least 20 percent, as compared to the first polyolefin resin composition.

Aspect 26. The sole structure according to any one of Aspect 1 to Aspect 127, wherein the second resin comprises an elastomeric material, optionally an olefin elastomer.

Aspect 27. The sole structure according to any one of Aspect 1 to Aspect 127, wherein the second resin comprises a polystyrene, a polyethylene, an ethylene-α-olefin copolymer, an ethylene-propylene rubber (EPDM), a polybutene, a polyisobutylene, a poly-4-methylpent-1-ene, a polyisoprene, a polybutadiene, an ethylene-methacrylic acid copolymer, a copolymer thereof, or a blend or mixture thereof.

Aspect 28. The sole structure according to any one of Aspect 1 to Aspect 127, wherein the second resin comprises about 20 percent, about 10 percent, or less of a polyolefin.

Aspect 29. The sole structure according to any one of Aspect 1 to Aspect 127, wherein the second resin comprises about 20 percent, about 10 percent, or less of polypropylene.

Aspect 30. The sole structure according to any one of Aspect 1 to Aspect 127, wherein the second resin comprises an ethylene-propylene rubber (EPDM) dispersed in a polypropylene.

Aspect 31. The sole structure according to any one of Aspect 1-Aspect 127, wherein the second resin comprises a block copolymer comprising a polystyrene block.

Aspect 32. The sole structure according to any one of Aspect 1 to Aspect 127, wherein the block copolymer comprises a copolymer of styrene and one or both of ethylene and butylene.

Aspect 33. The sole structure according to any one of Aspect 1 to Aspect 127, wherein the second resin comprises a polymer having a maleic anhydride functional group.

Aspect 34. The sole structure according to any one of Aspect 1 to Aspect 127, wherein the sole structure is configured to extend from a medial side to a lateral side of the article of footwear when the sole structure is the component of the article of footwear.

Aspect 35. The sole structure according to any one of Aspect 1 to Aspect 127, wherein a length of the plate is configured to extend through a metatarsal region to a midfoot region of the article of footwear when the sole structure is the component of the article of footwear.

Aspect 36. The sole structure according to any one of Aspect 1 to Aspect 127, wherein a length of the plate is configured to extend through a metatarsal region to a toe region of the article of footwear when the sole structure is the component of the article of footwear.

Aspect 37. The sole structure according to any one of Aspect 1 to Aspect 127, wherein a length of the plate is configured to extend through a heel region of the article of footwear when the sole structure is the component of the article of footwear.

Aspect 38. The sole structure according to any one of Aspect 1 to Aspect 127, wherein a length of the plate is configured to extend through a midfoot region to a heel region of the article of footwear when the sole structure is the component of the article of footwear.

Aspect 39. The sole structure according to any one of Aspect 1 to Aspect 127, wherein a length of the plate is configured to extend from a toe region to a heel region of the article of footwear when the sole structure is the component of the article of footwear.

Aspect 40. A sole structure for an article of footwear, the sole structure comprising: a plate comprising a first polyolefin resin, the plate having a first side and a second side and a perimeter, wherein the first side is configured to be ground-facing when the plate is a component of an article of footwear; an edge portion comprising a second resin that is different than the first polyolefin resin, the edge portion disposed on at least a portion of the perimeter; and a chassis, wherein the chassis is disposed on the first side of the plate.

Aspect 41. The sole structure according to any one of Aspect 1 to Aspect 127, wherein the edge portion is more flexible than the plate.

Aspect 42. The sole structure according to any one of Aspect 1 to Aspect 127, wherein the edge portion is integral with the chassis.

Aspect 43. The sole structure according to any one of Aspect 1 to Aspect 127, wherein the first polyolefin resin comprises a resin composition according to any one of Aspect 195 to Aspect 260.

Aspect 44. The sole structure according to any one of Aspect 1 to Aspect 127, wherein the second resin comprises a resin composition according to any one of Aspect 195 to Aspect 260.

Aspect 45. The sole structure according to any one of Aspect 1 to Aspect 127, wherein the second resin comprises a polymeric component that is substantially similar to the polymeric component of the first polyolefin resin, except the polymeric component of the second resin comprises a greater concentration of the resin modifier than the polymeric component of the first polyolefin resin.

Aspect 46. The sole structure according to any one of Aspect 1 to Aspect 127, wherein the chassis wraps around at least a portion of the plate and operably couples with an upper when the sole structure is a component of an article of footwear.

Aspect 47. The sole structure according to any one of Aspect 1 to Aspect 127, wherein the chassis attaches to the upper at the bite line when the sole structure is a component of an article of footwear.

Aspect 48. The sole structure according to any one of Aspect 1 to Aspect 127, wherein the chassis comprises the second resin.

Aspect 49. The sole structure according to any one of Aspect 1 to Aspect 127, wherein the chassis comprises a third resin that is different from the first polyolefin resin and the second resin.

Aspect 50. The sole structure according to any one of Aspect 1 to Aspect 127, wherein the third resin comprises a polymer selected from the group consisting of polypropylene, polypropylene/polyethylene copolymers, copolymers of ethylene and higher olefins such as polyethylene/polyoctene copolymers, copolymers thereof including one or more additional polymers, and blends thereof.

Aspect 51. The sole structure according to any one of Aspect 1 to Aspect 127, wherein the third resin comprises a polyolefin.

Aspect 52. The sole structure according to any one of Aspect 1 to Aspect 127, wherein the third resin comprises a resin composition according to any one of Aspect 195 to Aspect 260.

Aspect 53. The sole structure according to any one of Aspect 1 to Aspect 127, wherein the third resin comprises an elastomeric material, optionally an olefin elastomer.

Aspect 54. The sole structure according to any one of Aspect 1 to Aspect 127, wherein the third resin comprises a polystyrene, a polyethylene, an ethylene-α-olefin copolymer, an ethylene-propylene rubber (EPDM), a polybutene, a polyisobutylene, a poly-4-methylpent-1-ene, a polyisoprene, a polybutadiene, an ethylene-methacrylic acid copolymer, a copolymer thereof, or a blend or mixture thereof.

Aspect 55. The sole structure according to any one of Aspect 1 to Aspect 127, wherein the third resin comprises about 20 percent, about 10 percent, or less of a polyolefin.

Aspect 56. The sole structure according to any one of Aspect 1 to Aspect 127, wherein the third resin comprises about 20 percent, about 10 percent, or less of polypropylene.

Aspect 57. The sole structure according to any one of Aspect 1 to Aspect 127, wherein the third resin comprises an ethylene-propylene rubber (EPDM) dispersed in a polypropylene.

Aspect 58. The sole structure according to any one of Aspect 1 to Aspect 127, wherein the third resin comprises a block copolymer comprising a polystyrene block.

Aspect 59. The sole structure according to any one of Aspect 1 to Aspect 127, wherein the block copolymer comprises a copolymer of styrene and one or both of ethylene and butylene.

Aspect 60. The sole structure according to any one of Aspect 1 to Aspect 127, wherein the sole structure is configured to extend from a medial side to a lateral side of the article of footwear when the sole structure is the component of the article of footwear.

Aspect 61. The sole structure according to any one of Aspect 1 to Aspect 127, wherein a length of the plate is configured to extend through a metatarsal region to a midfoot region of the article of footwear when the sole structure is the component of the article of footwear.

Aspect 62. The sole structure according to any one of Aspect 1 to Aspect 127, wherein a length of the plate is configured to extend through a midfoot region to a heel region of the article of footwear when the sole structure is the component of the article of footwear.

Aspect 63. The sole structure according to any one of Aspect 1 to Aspect 127, wherein a length of the plate is configured to extend from a toe region to a heel region of the article of footwear when the sole structure is the component of the article of footwear.

Aspect 64. The sole structure according to any one of Aspect 1 to Aspect 127, wherein the first side of the plate includes one or more traction elements.

Aspect 65. The sole structure according to any one of Aspect 1 to Aspect 127, wherein the one or more traction elements are integrally formed with the plate.

Aspect 66. The sole structure according to any one of Aspect 1 to Aspect 127, wherein the one or more traction elements comprise the second resin.

Aspect 67. The sole structure according to any one of Aspect 1 to Aspect 127, wherein the chassis includes one or more traction elements on a side of the chassis that is configured to be ground facing when the sole structure is a component of an article of footwear.

Aspect 68. The sole structure according to any one of Aspect 1 to Aspect 127, wherein the one or more traction elements are integrally formed with the chassis.

Aspect 69. The sole structure according to any one of Aspect 1 to Aspect 127, wherein the first side of the plate comprises one or more openings configured to receive a detachable traction element.

Aspect 70. The sole structure according to any one of Aspect 1 to Aspect 127, wherein the chassis includes one or more openings configured to receive a detachable traction element on a side of the chassis that is configured to be ground facing when the sole structure is a component of an article of footwear.

Aspect 71. The sole structure according to any one of Aspect 1 to Aspect 127, wherein the one or more traction elements comprise one or more of the first polyolefin resin, the second resin, and the third resin.

Aspect 72. The sole structure according to any one of Aspect 1 to Aspect 127, wherein the traction elements comprise a fourth resin that is different from the first polyolefin resin, the second resin, and the third resin.

Aspect 73. The sole structure according to any one of Aspect 1 to Aspect 127, wherein the fourth resin comprises a resin composition according to any one of Aspect 195 to Aspect 260.

Aspect 74. The sole structure according to any one of Aspect 1 to Aspect 127, wherein the fourth resin comprises an elastomeric material, optionally an olefin elastomer.

Aspect 75. The sole structure according to any one of Aspect 1 to Aspect 127, wherein the fourth resin comprises a polystyrene, a polyethylene, an ethylene-α-olefin copolymer, an ethylene-propylene rubber (EPDM), a polybutene, a polyisobutylene, a poly-4-methylpent-1-ene, a polyisoprene, a polybutadiene, an ethylene-methacrylic acid copolymer, a copolymer thereof, or a blend or mixture thereof.

Aspect 76. The sole structure according to any one of Aspect 1 to Aspect 127, wherein the fourth resin comprises about 20 percent, about 10 percent, or less of a polyolefin.

Aspect 77. The sole structure according to any one of Aspect 1 to Aspect 127, wherein the fourth resin comprises about 20 percent, about 10 percent, or less of polypropylene.

Aspect 78. The sole structure according to any one of Aspect 1 to Aspect 127, wherein the fourth resin comprises an ethylene-propylene rubber (EPDM) dispersed in a polypropylene.

Aspect 79. The sole structure according to any one of Aspect 1 to Aspect 127, wherein the fourth resin comprises a block copolymer comprising a polystyrene block.

Aspect 80. The sole structure according to any one of Aspect 1 to Aspect 127, wherein the block copolymer comprises a copolymer of styrene and one or both of ethylene and butylene.

Aspect 81. The sole structure according to any one of Aspect 1 to Aspect 127, further comprising a textile on the first side or the second side or both sides of the plate.

Aspect 82. The sole structure according to any one of Aspect 1 to Aspect 127, wherein the textile overlaps with at least a portion of the edge portion.

Aspect 83. The sole structure according to any one of Aspect 1 to Aspect 127, wherein the textile does not overlap the edge portion.

Aspect 84. The sole structure according to any one of Aspect 1 to Aspect 127, wherein the textile is disposed on the first side of the plate, and wherein a bond strength of the first side to the chassis is greater than a bond strength of the otherwise same plate to the otherwise same chassis using the otherwise same bonding procedure except without the textile.

Aspect 85. The sole structure according to any one of Aspect 1 to Aspect 127, wherein the textile is on the first side of the plate, and wherein the textile comprises a patterned or decorative textile.

Aspect 86. The sole structure according to any one of Aspect 1 to Aspect 127, wherein the textile comprises a first textile on the first side of the plate and a second textile on the second side of the plate.

Aspect 87. The sole structure according to any one of Aspect 1 to Aspect 127, wherein the first textile and the second textile are different.

Aspect 88. The sole structure according to any one of Aspect 1 to Aspect 127, wherein the first textile and the second textile are the same.

Aspect 89. The sole structure according to any one of Aspect 1 to Aspect 127, wherein the textile is disposed on the plate by injection molding the plate onto the textile, by laminating the textile onto the plate, by welding the textile onto the plate, and/or by bonding to the plate using an adhesive.

Aspect 90. The sole structure according to any one of Aspect 1 to Aspect 127, wherein the textile is selected from the group consisting of a woven textile, a non-woven textile, a knit textile, a braided textile, and a combination thereof.

Aspect 91. The sole structure according to any one of Aspect 1 to Aspect 127, wherein the textile comprises one or more fibers comprising a polymer selected from the group consisting of a polyester, a polyamide, a polyolefin, any blend thereof, and any combination thereof.

Aspect 92. The sole structure according to any one of Aspect 1 to Aspect 127, wherein the textile comprises a yarn comprising the one or more fibers.

Aspect 93. The sole structure according to any one of Aspect 1 to Aspect 127, wherein a surface roughness of the surface comprising the textile is greater than a surface roughness of the otherwise same surface except without the textile.

Aspect 94. The sole structure according to any one of Aspect 1 to Aspect 127, wherein at least one of the first side of the plate, the chassis, the rand, and the edge portion comprises a hydrogel material.

Aspect 95. The sole structure according to any one of Aspect 1 to Aspect 127, wherein the hydrogel material comprises a polyurethane hydrogel.

Aspect 96. The sole structure according to any one of Aspect 1 to Aspect 127, wherein the polyurethane hydrogel is a reaction polymer of a diisocyanate with a polyol.

Aspect 97. The sole structure according to any one of Aspect 1 to Aspect 127, wherein the hydrogel material comprises a polyamide hydrogel.

Aspect 98. The sole structure according to any one of Aspect 1 to Aspect 127, wherein the polyamide hydrogel is a reaction polymer of a condensation of diamino compounds with dicarboxylic acids.

Aspect 99. The sole structure according to any one of Aspect 1 to Aspect 127, wherein the hydrogel material comprises a polyurea hydrogel.

Aspect 100. The sole structure according to any one of Aspect 1 to Aspect 127, wherein the polyurea hydrogel is a reaction polymer of a diisocyanate with a diamine.

Aspect 101. The sole structure according to any one of Aspect 1 to Aspect 127, wherein the hydrogel material comprises a polyester hydrogel.

Aspect 102. The sole structure according to any one of Aspect 1 to Aspect 127, wherein the polyester hydrogel is a reaction polymer of a dicarboxylic acid with a diol.

Aspect 103. The sole structure according to any one of Aspect 1 to Aspect 127, wherein the hydrogel material comprises a polycarbonate hydrogel.

Aspect 104. The sole structure according to any one of Aspect 1 to Aspect 127, wherein the polycarbonate hydrogel is a reaction polymer of a diol with phosgene or a carbonate diester Aspect 105. The sole structure according to any one of Aspect 1 to Aspect 127, wherein the hydrogel material comprises a polyetheramide hydrogel.

Aspect 106. The sole structure according to any one of Aspect 1 to Aspect 127, wherein the polyetheramide hydrogel is a reaction polymer of dicarboxylic acid and polyether diamine.

Aspect 107. The sole structure according to any one of Aspect 1 to Aspect 127, wherein the hydrogel material comprises a hydrogel formed of addition polymers of ethylenically unsaturated monomers.

Aspect 108. The sole structure according to any one of Aspect 1 to Aspect 127, wherein the hydrogel material comprises a hydrogel formed of a copolymer, wherein the copolymer is a combination of two or more types of polymers within each polymer chain.

Aspect 109. The sole structure according to any one of Aspect 1 to Aspect 127, wherein the copolymer is selected from the group consisting of: a polyurethane/polyurea copolymer, a polyurethane/polyester copolymer, and a polyester/polycarbonate copolymer.

Aspect 110. The sole structure according to any one of Aspect 1 to Aspect 127, wherein the hydrogel is provided as a mixture or dispersion with an elastomeric material.

Aspect 111. The sole structure according to any one of Aspect 1 to Aspect 127, wherein a first elastomeric material includes a mixture of a first cured rubber and from about 30 weight percent to about 70 weight percent of a first polymeric hydrogel, based on the total weight of the first elastomeric material, wherein the first polymeric hydrogel comprises a first polyurethane hydrogel.

Aspect 112. The sole structure according to any one of Aspect 1 to Aspect 127, wherein the hydrogel is distributed throughout the first elastomeric material and entrapped by a first polymeric network including the first cured rubber.

Aspect 113. The sole structure according to any one of Aspect 1 to Aspect 127, wherein the sole structure comprises the chassis, and wherein the chassis or a side of the chassis that is configured to be ground facing when the sole structure is a component of an article of footwear comprises the hydrogel material.

Aspect 114. The sole structure of according any one of Aspect 1 to Aspect 127, wherein the hydrogel material has a water cycling weight loss from about 0 weight percent to about 15 weight percent as measured using the Water Cycling Test with the Component Sampling Procedure.

Aspect 115. The sole structure of according to any one of Aspect 1 to Aspect 127, wherein the hydrogel material has a water cycling weight loss of less than 15 wt. percent as measured using the Water Cycling Test with the Component Sampling Procedure.

Aspect 116. The sole structure of according to any one of Aspect 1 to Aspect 127, wherein the hydrogel material has a water cycling weight loss of less than 10 wt. percent.

Aspect 117. The sole structure of according to any one of Aspect 1 to Aspect 127, wherein the hydrogel material has a dry-state thickness in the range of about 0.2 millimeter to about 2.0 millimeter.

Aspect 118. The sole structure of according to any one of Aspect 1 to Aspect 127, wherein the hydrogel material has a saturated-state thickness that is at least 100 percent greater than the dry-state thickness of the hydrogel material.

Aspect 119. The sole structure of according to any one of Aspect 1 to Aspect 127, wherein the saturated-state thickness of the hydrogel material is at least 200 percent greater than the dry-state thickness of the hydrogel material.

Aspect 120. The sole structure of according to any one of Aspect 1 to Aspect 127, wherein the sole structure has a ground facing side, and the hydrogel material is affixed to the ground facing side of the sole structure.

Aspect 121. The sole structure of according to any one of Aspect 1 to Aspect 127, wherein the sole structure further includes an adhesive, a primer, or a tie layer located between the ground facing side and the hydrogel material.

Aspect 122. The sole structure according to any one of Aspect 1 to Aspect 127, wherein one or more of the adhesive, the primer, and the tie layer include a polymer having epoxy segments, urethane segments, acrylic segments, cyanoacrylate segments, silicone segments, or any combination thereof.

Aspect 123. The sole structure according to any one of Aspect 1 to Aspect 127, wherein one or more of the first polyolefin resin of the plate, the second resin, the third resin, the fourth resin, the adhesive, the primer, and the tie layer include a polymer having maleic anhydride functional groups.

Aspect 124. The sole structure according to any one of Aspect 1 to Aspect 127, wherein one or more of the plate, the edge portion, the adhesive, the primer, and the tie layer include maleic anhydride.

Aspect 125. The sole structure according to any one of Aspect 1 to Aspect 127, wherein the adhesive, the primer or the tie layer includes a thermoplastic polyurethane.

Aspect 126. The sole structure according to any one of Aspect 1 to Aspect 127, wherein the ground facing side of the sole structure includes a texture.

Aspect 127. The sole structure according to any one of Aspect 1 to Aspect 127, wherein the ground facing side of the sole structure formed by the hydrogel material has a mud pull-off force that is less than about 12 Newton as determined by the Mud Pull-Off Test using the Component Sampling Procedure.

Aspect 128. An article of footwear comprising an upper and a sole structure according to any one of Aspect 1 to Aspect 127.

Aspect 129. The article of footwear according to any one of Aspect 128 to Aspect 159, wherein the article includes a mechanical bond between the upper and one or more of the plate, the edge portion, the chassis, or any combination thereof.

Aspect 130. The article of footwear according to any one of Aspect 128 to Aspect 159, wherein at least a portion of the edge portion wraps around an outer surface of the upper.

Aspect 131. The article of footwear according to any one of Aspect 128 to Aspect 159, wherein the edge portion wraps around an outer surface of the upper in the forefoot portion, the midfoot portion, the heel portion, or a combination thereof.

Aspect 132. The article of footwear according to any one of Aspect 128 to Aspect 159, further comprising a bond between the chassis and the upper.

Aspect 133. The article of footwear according to any one of Aspect 128 to Aspect 159, further comprising a rand disposed on the upper.

Aspect 134. The article of footwear according to any one of Aspect 128 to Aspect 159, wherein the rand is operably coupled with the plate, the edge portion, or both.

Aspect 135. The article of footwear according to any one of Aspect 128 to Aspect 159, wherein the rand is disposed about substantially the entire perimeter of the plate, the edge portion, or both.

Aspect 136. The article of footwear according to any one of Aspect 128 to Aspect 159, wherein the rand is adhesively bonded to the upper, the plate, the edge portion, or a combination thereof.

Aspect 137. The article of footwear according to any one of Aspect 128 to Aspect 159, wherein the rand is thermally bonded to the upper, the plate, the edge portion, or a combination thereof.

Aspect 138. The article of footwear according to any one of Aspect 128 to Aspect 159, wherein the rand is mechanically bonded to the upper, the plate, the edge portion, or a combination thereof.

Aspect 139. The article of footwear according to any one of the Aspect 128 to Aspect 159, wherein the rand has a thickness of from about 0.25 millimeter to about 3 millimeters.

Aspect 140. The article of footwear according to any one of Aspect 128 to Aspect 159, wherein the rand attaches to the upper beyond the bite line when the sole structure is a component of an article of footwear.

Aspect 141. The article of footwear according to any one of Aspect 128 to Aspect 159, wherein the rand comprises a rand material.

Aspect 142. The article of footwear according to any one of Aspect 128 to Aspect 159, wherein the rand material comprises a resin composition according to any one of Aspect 195 to Aspect 260.

Aspect 143. The article of footwear according to any one of Aspect 128 to Aspect 159, wherein the rand material comprises an elastomeric material.

Aspect 144. The article of footwear according to any one of Aspect 128 to Aspect 159, wherein the rand material comprises a foamed material.

Aspect 145. The article of footwear according to any one of Aspect 128 to Aspect 159, wherein the rand material comprises a resin composition that is the same as that of first polyolefin resin, except comprising a greater amount of polymeric resin modifier.

Aspect 146. The article of footwear according to any one of Aspect 128 to Aspect 159, wherein the rand material comprises a polyolefin resin composition according to any one of Aspect 195 to Aspect 260, and wherein the effective amount of the polymeric resin modifier is an amount effective to increase flexibility of the resin composition, decrease rigidity of the resin composition, decrease hardness of the resin composition, increase bonding between the resin composition and a textile, or any combination thereof, by at least 2 percent, optionally by at least 5 percent or at least 10 percent or at least 15 percent or at least 20 percent, as compared to the first polyolefin resin composition.

Aspect 147. The article of footwear according to any one of Aspect 128 to Aspect 159, wherein the rand material comprises an olefin elastomer.

Aspect 148. The article of footwear according to any one of Aspect 128 to Aspect 159, wherein the rand material comprises a polystyrene, a polyethylene, an ethylene-α-olefin copolymer, an ethylene-propylene rubber (EPDM), a polybutene, a polyisobutylene, a poly-4-methylpent-1-ene, a polyisoprene, a polybutadiene, an ethylene-methacrylic acid copolymer, a copolymer thereof, or a blend or mixture thereof.

Aspect 149. The article of footwear according to any one of Aspect 128 to Aspect 159, wherein the rand material comprises about 20 percent, about 10 percent, or less of a polyolefin.

Aspect 150. The article of footwear according to any one of Aspect 128 to Aspect 159, wherein the rand material comprises about 20 percent, about 10 percent, or less of polypropylene.

Aspect 151. The article of footwear according to any one of Aspect 128 to Aspect 159, wherein the rand material comprises an ethylene-propylene rubber (EPDM) dispersed in a polypropylene.

Aspect 152. The article of footwear according to any one of Aspect 128 to Aspect 159, wherein the rand material comprises a block copolymer comprising a polystyrene block.

Aspect 153. The article of footwear according to any one of Aspect 128 to Aspect 159, wherein the block copolymer comprises a copolymer of styrene and one or both of ethylene and butylene.

Aspect 154. The article of footwear according to any one of Aspect 128 to Aspect 159, wherein the rand material comprises a polymer having a maleic anhydride functional group Aspect 155. The article of footwear according to any one of Aspect 128 to Aspect 159, wherein one or more of the first polyolefin resin composition of the plate, the second resin of the edge portion, the resin composition of the chassis, the rand polymeric material, and a polymeric material of the upper are melded together.

Aspect 156. The article of footwear according to any one of Aspect 128 to Aspect 159, wherein a length of the plate extends from a medial side to a lateral side of the article of footwear.

Aspect 157. The article of footwear according to any one of Aspect 128 to Aspect 159, wherein a length of the plate extends through a metatarsal region to a midfoot region of the article of footwear.

Aspect 158. The article of footwear according to any one of Aspect 128 to Aspect 159, wherein a length of the plate extends through a midfoot region to a heel region of the article of footwear.

Aspect 159. The article of footwear according to any one of Aspect 128 to Aspect 159, wherein a length of the plate extends from a toe region to a heel region of the article of footwear.

Aspect 160. A method of manufacturing a component for an article of footwear or athletic equipment, the method comprising: forming a plate comprising a first polyolefin resin, and having a first side, a second side, and a perimeter; and disposing on at least a portion of the perimeter an edge portion comprising a second resin that is different from the first polyolefin resin.

Aspect 161. The method according to any one of Aspect 160 to Aspect 193, wherein the method comprises integrally forming the edge portion with the plate.

Aspect 162. The method according to any one of Aspect 160 to Aspect 193, wherein the method comprises injection molding the first polyolefin resin composition to form the plate, and injection molding a second resin composition to form the edge portion.

Aspect 163. The method according to any one of Aspect 160 to Aspect 193, wherein the injection molding the first polyolefin resin composition is simultaneous with the injection molding the second resin composition.

Aspect 164. The method according to any one of Aspect 160 to Aspect 193, wherein after injection molding the first polyolefin resin composition to form the plate, the second resin composition is injection molded onto the plate to form the edge portion.

Aspect 165. The method according to any one of Aspect 160 to Aspect 193, wherein the method comprises forming the plate, and then operably coupling the edge portion with at least a portion of the plate.

Aspect 166. The method according to any one of Aspect 160 to Aspect 193, wherein the edge portion is extruded onto the plate.

Aspect 167. The method according to any one of Aspect 160 to Aspect 193, wherein the edge portion is chemically or adhesively bonded to the plate.

Aspect 168. The method according to any one of Aspect 160 to Aspect 193, wherein the edge portion is thermally bonded to the plate.

Aspect 169. The method according to any one of Aspect 160 to Aspect 193, wherein the edge portion is mechanically bonded to the plate.

Aspect 170. The method according to any one of Aspect 160 to Aspect 193, wherein the first polyolefin resin comprises a resin composition according to any one of Aspect 195 to Aspect 260.

Aspect 171. The method according to any one of Aspect 160 to Aspect 193, wherein the second resin comprises a resin composition according to any one of Aspect 195 to Aspect 260.

Aspect 172. The method according to any one of Aspect 160 to Aspect 193, wherein the second resin comprises a polymeric component that is substantially similar to the polymeric component of the first polyolefin resin, except the polymeric component of the second resin comprises a greater concentration of the resin modifier than the polymeric component of the first polyolefin resin.

Aspect 173. The method according to any one of Aspect 160 to Aspect 193, further comprising disposing a rand on the upper, the plate, the edge portion, or a combination thereof.

Aspect 174. The method according to any one of Aspect 160 to Aspect 193, wherein the rand is coated or printed on the upper, the plate, the edge portion, or a combination thereof.

Aspect 175. The method according to any one of Aspect 160 to Aspect 193, wherein the rand is chemically or adhesively bonded to the upper, the plate, the edge portion, or a combination thereof.

Aspect 176. The method according to any one of Aspect 160 to Aspect 193, wherein the rand is thermally bonded to the upper, the plate, the edge portion, or a combination thereof.

Aspect 177. The method according to any one of Aspect 160 to Aspect 193, wherein the rand is mechanically bonded to the upper, the plate, the edge portion, or both.

Aspect 178. The method according to any one of Aspect 160 to Aspect 193, further comprising decorating at least a portion of the edge portion.

Aspect 179. The method according to any one of Aspect 160 to Aspect 193, wherein the decorating at least a portion of the edge portion comprises printing or coloring the edge portion.

Aspect 180. The method according to any one of Aspect 160 to Aspect 193, wherein the decorating at least a portion of the edge portion comprises attaching a printed film or a printed textile to the edge portion.

Aspect 181. The method according to any one of Aspect 160 to Aspect 193, further comprising providing a textured surface on the edge portion.

Aspect 182. The method according to any one of Aspect 160 to Aspect 193, further comprising operably coupling the plate with a chassis configured to be on a ground facing side of the plate when the sole structure is a component of an article of footwear.

Aspect 183. The method according to any one of Aspect 160 to Aspect 193, wherein the chassis comprises the edge portion.

Aspect 184. The method according to any one of Aspect 160 to Aspect 193, comprising disposing at least a portion of the plate in a recess of the chassis.

Aspect 185. The method according to any one of Aspect 160 to Aspect 193, comprising injection molding the plate into the chassis.

Aspect 186. The method according to any one of Aspect 160 to Aspect 193, further comprising injection molding the chassis, and injecting molding the plate into the injection-molded chassis Aspect 187. The method according to any one of Aspect 160 to Aspect 193, further comprising disposing a textile onto one or both of the first surface or the second surface of the plate.

Aspect 188. The method according to any one of Aspect 160 to Aspect 193, comprising one or more of laminating the textile onto a surface of the plate, welding the textile onto a surface of the plate, and bonding the textile to a surface of plate using an adhesive.

Aspect 189. The method according to any one of Aspect 160 to Aspect 193, comprising injection molding the plate onto the textile.

Aspect 190. The method according to any one of Aspect 160 to Aspect 193, wherein the textile is selected from the group consisting of a woven textile, a non-woven textile, a knit textile, a braided textile, and a combination thereof.

Aspect 191. The method according to any one of Aspect 160 to Aspect 193, wherein the textile comprises one or more fibers comprising a polymer selected from the group consisting of a polyester, a polyamide, a polyolefin, a blend thereof, and a combination thereof.

Aspect 192. The method according to any one of Aspect 160 to Aspect 193, wherein the textile comprises a yarn comprising the one or more fibers.

Aspect 193. The method according to any one of Aspect 160 to Aspect 193, wherein a surface roughness of the surface comprising the textile is greater than a surface roughness of the otherwise same surface except without the textile.

Aspect 194. A method of manufacturing an article of footwear comprising: manufacturing a sole component according to the method of any one of Aspect 160 to Aspect 193; providing an upper for an article of footwear; and affixing the sole component to the upper.

Aspect 195. A resin composition comprising: a polyolefin copolymer, and an effective amount of a polymeric resin modifier.

Aspect 196. The resin composition according to any one of Aspect 195 to Aspect 260, wherein the resin composition has an abrasion loss of about 0.05 cubic centimeters to about 0.1 cubic centimeters or about 0.08 cubic centimeters to about 0.1 cubic centimeters pursuant to Abrasion Loss Test using the Neat Material Sampling Procedure.

Aspect 197. The resin composition according to any one of Aspect 195 to Aspect 260, wherein the effective amount of the polymeric resin modifier is an amount effective to allow the resin composition to pass a flex test pursuant to the Cold Ross Flex Test using the Plaque Sampling Procedure.

Aspect 198. The resin composition according to any one of Aspect 195 to Aspect 260, wherein the effective amount of the polymeric resin modifier is an amount effective to allow the resin composition to pass a flex test pursuant to the Cold Ross Flex Test using the Plaque Sampling Procedure without a significant change in an abrasion loss as compared to an abrasion loss of a second resin composition identical to the resin composition except without the polymeric resin modifier when measured pursuant to Abrasion Loss Test using the Neat Material Sampling Procedure.

Aspect 199. The resin composition according to any one of Aspect 195 to Aspect 260, wherein the effective amount of the polymeric resin modifier is an amount effective to increase flexibility of the resin composition, decrease rigidity of the resin composition, decrease hardness of the resin composition, increase bonding between the resin composition and a textile, or any combination thereof, by at least 2 percent, optionally by at least 5 percent or at least 10 percent or at least 15 percent or at least 20 percent, as comparted to a resin composition with is essentially identical except without the polymeric resin modifier.

Aspect 200. The resin composition according to any one of Aspect 195 to Aspect 260, wherein the abrasion loss of the resin composition is about 0.08 cubic centimeters to about 0.1 cubic centimeters.

Aspect 201. The resin composition according to any one of Aspect 195 to Aspect 260, wherein the polyolefin copolymer is a random copolymer.

Aspect 202. The resin composition according to any one of Aspect 195 to Aspect 260, wherein the polyolefin copolymer comprises a plurality of repeat units, with each of the plurality of repeat units individually derived from an alkene monomer having about 1 to about 6 carbon atoms.

Aspect 203. The resin composition according to any one of Aspect 195 to Aspect 260, wherein the polyolefin copolymer comprises a plurality of repeat units, with each of the plurality of repeat units individually derived from a monomer selected from the group consisting of ethylene, propylene, 4-methyl-1-pentene, 1-butene, and a combination thereof.

Aspect 204. The resin composition according to any one of Aspect 195 to Aspect 260, wherein the polyolefin copolymer comprises a plurality of repeat units each individually selected from Formula 1A-1D Formula 1A

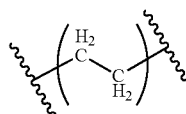

-continued

Formula 1B

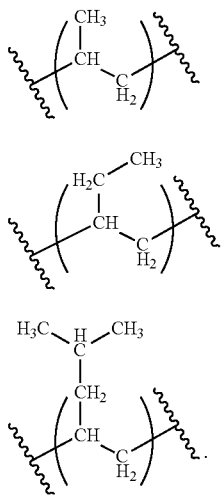

Formula 1C

Formula 1D

Aspect 205. The resin composition according to any one of Aspect 195 to Aspect 260, wherein the polyolefin copolymer comprises a plurality of repeat units each individually having a structure according to Formula 2

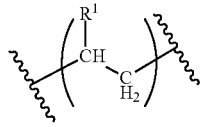

Formula 2 where R1 is a hydrogen or a substituted or unsubstituted, linear or branched, C1-C12 alkyl or heteroalkyl.

Aspect 206. The resin composition according to any one of Aspect 195 to Aspect 260, wherein polymers in the resin composition consist essentially of polyolefin copolymers.

Aspect 207. The resin composition according to any one of Aspect 195 to Aspect 260, wherein the polyolefin copolymer is a random copolymer of a first plurality of repeat units and a second plurality of repeat units, and wherein each repeat unit in the first plurality of repeat units is derived from ethylene and the each repeat unit in the second plurality of repeat units is derived from a second olefin.

Aspect 208. The resin composition according to any one of Aspect 195 to Aspect 260, wherein the second olefin is selected from the group consisting of propylene, 4-methyl-1-pentene, 1-butene, and other linear or branched terminal alkenes having about 3 to 12 carbon atoms.

Aspect 209. The resin composition according to any one of Aspect 195 to Aspect 260, wherein each of the repeat units in the first plurality of repeat units has a structure according to Formula 1A, and wherein each of the repeat units in the second plurality of repeat units has a structure selected from Formula 1B-1D

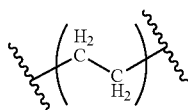

Formula 1A

-continued

Formula 1B

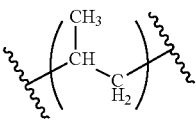

Formula 1C

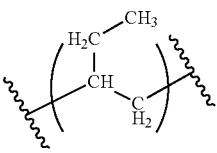

Formula 1D

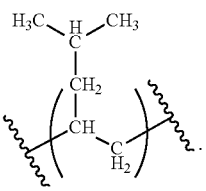

Aspect 210. The resin composition according to any one of Aspect 195 to Aspect 260, wherein each of the repeat units in the first plurality of repeat units has a structure according to Formula 1A, and wherein each of the repeat units in the second plurality of repeat units has a structure according to Formula 2

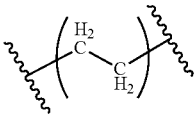

Formula 1A

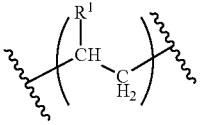

Formula 2 where R1 is a hydrogen or a substituted or unsubstituted, linear or branched, C2-C12 alkyl or heteroalkyl.

Aspect 211. The resin composition according to any one of Aspect 195 to Aspect 260, wherein the polyolefin copolymer comprises about 80 percent to about 99 percent, about 85 percent to about 99 percent, about 90 percent to about 99 percent, or about 95 percent to about 99 percent polyolefin repeat units by weight based upon a total weight of the polyolefin copolymer.

Aspect 212. The resin composition according to any one of Aspect 195 to Aspect 260, wherein the polyolefin copolymer comprises about 1 percent to about 5 percent, about 1 percent to about 3 percent, about 2 percent to about 3 percent, or about 2 percent to about 5 percent ethylene by weight based upon a total weight of the polyolefin copolymer.

Aspect 213. The resin composition according to any one of Aspect 195 to Aspect 260, wherein the polyolefin copolymer is substantially free of polyurethanes.

Aspect 214. The resin composition according to any one of Aspect 195 to Aspect 260, wherein polymer chains of the polyolefin copolymer are substantially free of urethane repeat units.

Aspect 215. The resin composition according to any one of Aspect 195 to Aspect 260, wherein the resin composition is substantially free of polymer chains including urethane repeat units.

Aspect 216. The resin composition according to any one of Aspect 195 to Aspect 260, wherein the polyolefin copolymer is substantially free of polyamide.

Aspect 217. The resin composition according to any one of Aspect 195 to Aspect 260, wherein polymer chains of the polyolefin copolymer are substantially free of amide repeat units.

Aspect 218. The resin composition according to any one of Aspect 195 to Aspect 260, wherein the resin composition is substantially free of polymer chains including amide repeat units.

Aspect 219. A resin composition comprising: a polypropylene copolymer, and an effective amount of a polymeric resin modifier.

Aspect 220. The resin composition according to any one of Aspect 195 to Aspect 260, wherein the resin composition has an abrasion loss of a about 0.05 cubic centimeters (cm³) to about 0.1 cubic centimeters (cm³), about 0.07 cubic centimeters (cm³) to about 0.1 cubic centimeters (cm³), about 0.08 cubic centimeters (cm³) to about 0.1 cubic centimeters (cm³), or about 0.08 cubic centimeters (cm³) to about 0.11 cubic centimeters (cm³) pursuant to Abrasion Loss Test using the Neat Material Sampling Procedure.

Aspect 221. The resin composition according to any one of Aspect 195 to Aspect 260, wherein the effective amount of the polymeric resin modifier is an amount effective to allow the resin composition to pass a flex test pursuant to the Cold Ross Flex Test using the Plaque Sampling Procedure.

Aspect 222. The resin composition according to any one of Aspect 195 to Aspect 260, wherein the effective amount of the polymeric resin modifier is an amount effective to allow the resin composition to pass a flex test pursuant to the Cold Ross Flex Test using the Plaque Sampling Procedure without a significant change in an abrasion loss as compared to an abrasion loss of a second resin composition identical to the resin composition except without the polymeric resin modifier when measured pursuant to Abrasion Loss Test using the Neat Material Sampling Procedure.

Aspect 223. The resin composition according to any one of Aspect 195 to Aspect 260, wherein the effective amount of the polymeric resin modifier is an amount effective to increase flexibility of the resin composition, decrease rigidity of the resin composition, decrease hardness of the resin composition, increase bonding between the resin composition and a textile, or any combination thereof, by at least 2 percent, optionally by at least 5 percent or at least 10 percent or at least 15 percent or at least 20 percent, as comparted to a resin composition with is essentially identical except without the polymeric resin modifier.

Aspect 224. The resin composition according to any one of Aspect 195 to Aspect 260, wherein the abrasion loss of the resin composition is about 0.05 cubic centimeters (cm³) to about 0.1 cubic centimeters (cm³), about 0.07 cubic centimeters (cm³) to about 0.1 cubic centimeters (cm³), about 0.08 cubic centimeters (cm³) to about 0.1 cubic centimeters (cm³), or about 0.08 cubic centimeters (cm³) to about 0.11 cubic centimeters (cm³).

Aspect 225. The resin composition according to any one of Aspect 195 to Aspect 260, wherein the polypropylene copolymer is a random copolymer.

Aspect 226. The resin composition according to any one of Aspect 195 to Aspect 260, wherein the polypropylene copolymer comprises about 80 percent to about 99 percent, about 85 percent to about 99 percent, about 90 percent to about 99 percent, or about 95 percent to about 99 percent polypropylene repeat units by weight based upon a total weight of the polypropylene copolymer.

Aspect 227. The resin composition according to any one of Aspect 195 to Aspect 260, wherein the polypropylene copolymer comprises about 1 percent to about 5 percent, about 1 percent to about 3 percent, about 2 percent to about 3 percent, or about 2 percent to about 5 percent ethylene by weight based upon a total weight of the polypropylene copolymer.

Aspect 228. The resin composition according to any one of Aspect 195 to Aspect 260, wherein the polypropylene copolymer is a random copolymer comprising about 2 percent to about 3 percent of a first plurality of repeat units by weight and about 80 percent to about 99 percent by weight of a second plurality of repeat units based upon a total weight of the polypropylene copolymer; wherein each of the repeat units in the first plurality of repeat units has a structure according to Formula 1A and each of the repeat units in the second plurality of repeat units has a structure according to Formula 1B

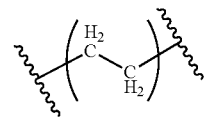

Formula 1A

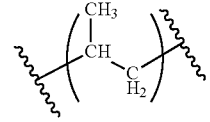

Formula 1B

Aspect 229. The resin composition according to any one of Aspect 195 to Aspect 260, wherein the polypropylene copolymer is substantially free of polyurethane.

Aspect 230. The resin composition according to any one of Aspect 195 to Aspect 260, wherein polymer chains of the polypropylene copolymer are substantially free of urethane repeat units.

Aspect 231. The resin composition according to any one of Aspect 195 to Aspect 260, wherein the resin composition is substantially free of polymer chains including urethane repeat units.

Aspect 232. The resin composition according to any one of Aspect 195 to Aspect 260, wherein the polypropylene copolymer is substantially free of polyamide.

Aspect 233. The resin composition according to any one of Aspect 195 to Aspect 260, wherein polymer chains of the polypropylene copolymer are substantially free of amide repeat units.

Aspect 234. The resin composition according to any one of Aspect 195 to Aspect 260, wherein the resin composition is substantially free of polymer chains including amide repeat units.

Aspect 235. The resin composition according to any one of Aspect 195 to Aspect 260, wherein polymers in the resin composition consist essentially of propylene repeat units.

Aspect 236. The resin composition according to any one of Aspect 195 to Aspect 260, wherein the resin composition consists essentially of polypropylene copolymers.

Aspect 237. The resin composition according to any one of Aspect 195 to Aspect 260, wherein the polypropylene copolymer is a random copolymer of ethylene and propylene.

Aspect 238. The resin composition according to any one of Aspect 195 to Aspect 260, wherein the abrasion loss of the resin composition is within about 20 percent of an abrasion loss of the otherwise same resin composition except without the resin modifier when measured pursuant to Abrasion Loss Test using the Neat Material Sampling Procedure.

Aspect 239. The resin composition according to any one of Aspect 195 to Aspect 260, wherein the resin composition has a percent crystallization of about 35 percent, about 30 percent, about 25 percent, or less when measured according to the Crystallinity Test using the Neat Material Sampling Procedure.

Aspect 240. The resin composition according to any one of Aspect 195 to Aspect 260, wherein the resin composition has a percent crystallization that is at least 4 percentage points less than a percent crystallization of the otherwise same resin composition except without the polymeric resin modifier when measured according to the Crystallinity Test using the Neat Material Sampling Procedure.

Aspect 241. The resin composition according to any one of Aspect 195 to Aspect 260, wherein the effective amount of the polymeric resin modifier is about 5 percent to about 30 percent, about 5 percent to about 25 percent, about 5 percent to about 20 percent, about 5 percent to about 15 percent, about 5 percent to about 10 percent, about 10 percent to about 15 percent, about 10 percent to about 20 percent, about 10 percent to about 25 percent, or about 10 percent to about 30 percent by weight based upon a total weight of the resin composition.

Aspect 242. The resin composition according to any one of Aspect 195 to Aspect 260, wherein the effective amount of the polymeric resin modifier is about 20 percent, about 15 percent, about 10 percent, about 5 percent, by weight, or less based upon a total weight of the resin composition.

Aspect 243. The resin composition according to any one of Aspect 195 to Aspect 260, wherein the polymeric resin modifier comprises about 10 percent to about 15 percent ethylene repeat units by weight based upon a total weight of the polymeric resin modifier.

Aspect 244. The resin composition according to any one of Aspect 195 to Aspect 260, wherein the polymeric resin modifier comprises about 10 percent to about 15 percent repeat units according to Formula 1A by weight based upon a total weight of the polymeric resin modifier

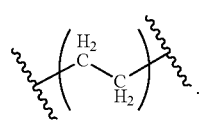

Formula 1A

Aspect 245. The resin composition according to any one of Aspect 195 to Aspect 260, wherein the resin composition has a total ethylene repeat unit content of about 3 percent to about 7 percent by weight based upon a total weight of the resin composition.

Aspect 246. The resin composition according to any one of Aspect 195 to Aspect 260, wherein the polymeric resin modifier has an ethylene repeat unit content of about 10 percent to about 15 percent by weight based upon a total weight of the polymeric resin modifier.

Aspect 247. The resin composition according to any one of Aspect 195 to Aspect 260, wherein the polymeric resin modifier is a copolymer comprising isotactic repeat units derived from an olefin.

Aspect 248. The resin composition according to any one of Aspect 195 to Aspect 260, wherein the polymeric resin modifier is a copolymer comprising repeat units according to Formula 1B, and wherein the repeat units according to Formula 1B are arranged in an isotactic stereochemical configuration

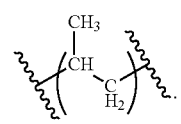

Formula 1B

Aspect 249. The resin composition according to any one of Aspect 195 to Aspect 260, wherein an otherwise same resin composition except without the polymeric resin modifier does not pass the cold Ross flex test using the Neat Material Sampling Procedure.

Aspect 250. The resin composition according to any one of Aspect 195 to Aspect 260, wherein the polymeric resin modifier is a copolymer comprising isotactic propylene repeat units and ethylene repeat units.

Aspect 251. The resin composition according to any one of Aspect 195 to Aspect 260, wherein the polymeric resin modifier is a copolymer comprising a first plurality of repeat units and a second plurality of repeat units; wherein each of the repeat units in the first plurality of repeat units has a structure according to Formula 1A and each of the repeat units in the second plurality of repeat units has a structure according to Formula 1B, and wherein the repeat units in the second plurality of repeat units are arranged in an isotactic stereochemical configuration

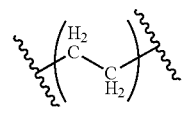

Formula 1A

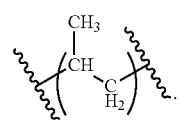

Formula 1B

Aspect 252. The resin composition according to any one of Aspect 195 to Aspect 260, wherein the polymeric resin modifier is a metallocene catalyzed polymer.

Aspect 253. The resin composition according to any one of Aspect 195 to Aspect 260, wherein the polymeric resin modifier is a metallocene catalyzed copolymer.

Aspect 254. The resin composition according to any one of Aspect 195 to Aspect 260, wherein the polymeric resin modifier is a metallocene catalyzed propylene copolymer.

Aspect 255. The resin composition according to any one of Aspect 195 to Aspect 260, wherein the resin composition further comprises a clarifying agent.

Aspect 256. The resin composition according to any one of Aspect 195 to Aspect 260, wherein the clarifying agent is present in an amount from about 0.5 percent by weight to about 5 percent by weight or about 1.5 percent by weight to about 2.5 percent by weight based upon a total weight of the resin composition.

Aspect 257. The resin composition according to any one of Aspect 195 to Aspect 260, wherein the clarifying agent is selected from the group consisting of a substituted or unsubstituted dibenzylidene sorbitol, 1,3-O-2,4-bis(3,4-dimethylbenzylidene) sorbitol, 1,2,3-trideoxy-4,6:5,7-bis-O-[(4-propylphenyl)methylene], and a derivative thereof.

Aspect 258. The resin composition according to any one of Aspect 195 to Aspect 260, wherein the clarifying agent comprises an acetal compound that is the condensation product of a polyhydric alcohol and an aromatic aldehyde.

Aspect 259. The resin composition according to any one of Aspect 195 to Aspect 260, wherein the polyhydric alcohol is selected from the group consisting of acyclic polyols such as xylitol and sorbitol and acyclic deoxy polyols such as 1,2,3-trideoxynonitol or 1,2,3-trideoxynon-1-enitol.

Aspect 260. The resin composition according to any one of Aspect 195 to Aspect 260, wherein the aromatic aldehyde is selected from the group consisting of benzaldehyde and substituted benzaldehydes.

Now having described aspects of the present disclosure generally, additional discussion regarding aspects will be described in greater detail.

Before the present disclosure is described in greater detail, it is to be understood that this disclosure is not limited to particular aspects described, and as such may, of course, vary. Other systems, methods, features, and advantages of resin compositions and articles and components thereof will be or become apparent to one with skill in the art upon examination of the following drawings and detailed description. It is intended that all such additional systems, methods, features, and advantages be included within this description, be within the scope of the present disclosure, and be protected by the accompanying claims. It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

Sole Structures and Articles of Footwear Made Therefrom

In some aspects, the present disclosure is directed to sole structures including a plate containing a first polyolefin resin, the plate having a first side and a second side and a perimeter, and an edge portion disposed on at least a portion of a perimeter, where the edge portion comprises a second polyolefin resin that is different than the first polyolefin resin. The present disclosure also provides articles of footwear including the sole structures. As discussed below, the plates containing the polyolefin resin compositions desirably exhibit high levels of mechanical strength and yet flexural durability. However, applicants have found that in some aspects, when polyolefin resin compositions are used in the plates, bonding between the edge of the plate and the footwear (e.g. bonding between the plate and the upper) may be unsatisfactory. Therefore, an edge portion is provided about at least a portion of the perimeter of the plate. The edge portion can be more flexible than the plate material. In some aspects, the edge portion is extended and wraps at least partially around the surface of the upper. The edge portion provides a more durable bond between the edge of the sole structure and the upper of the footwear at the biteline.

Figure 1B:
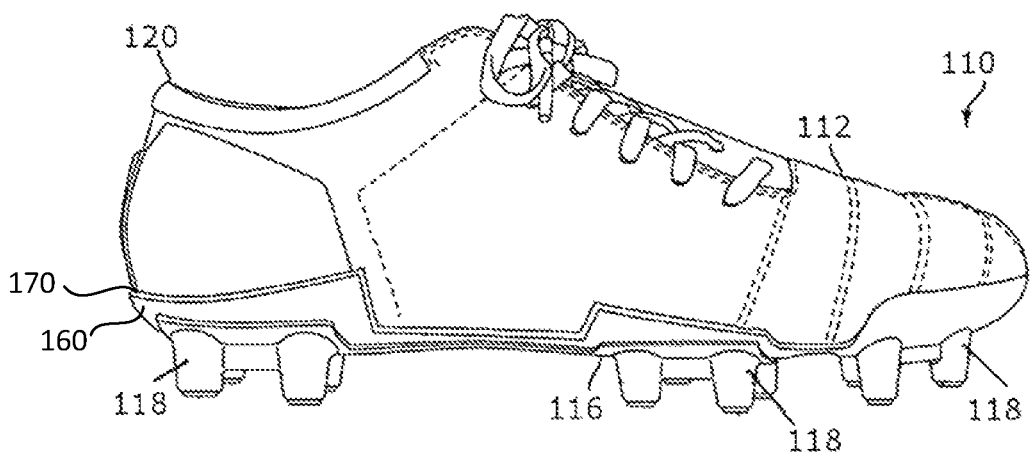
Figure 1C:
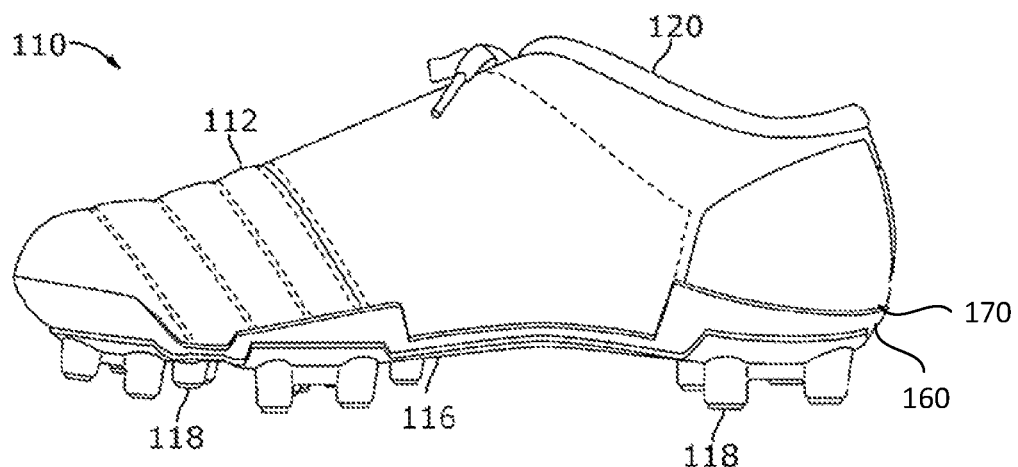
Figure 1D:
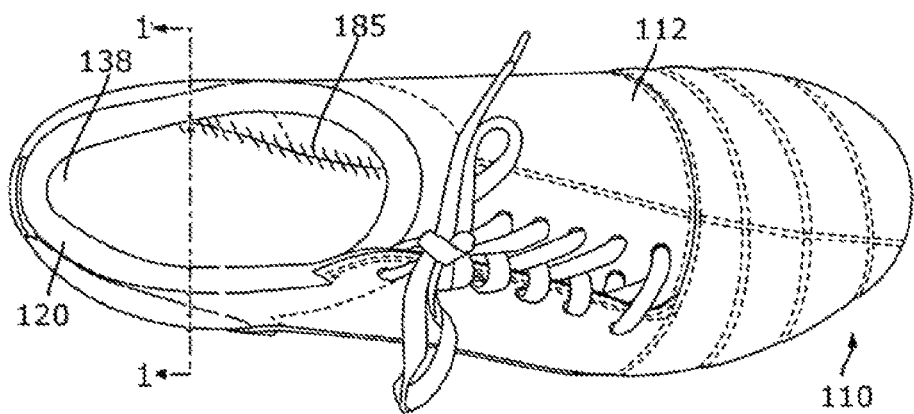
Figure 1E:
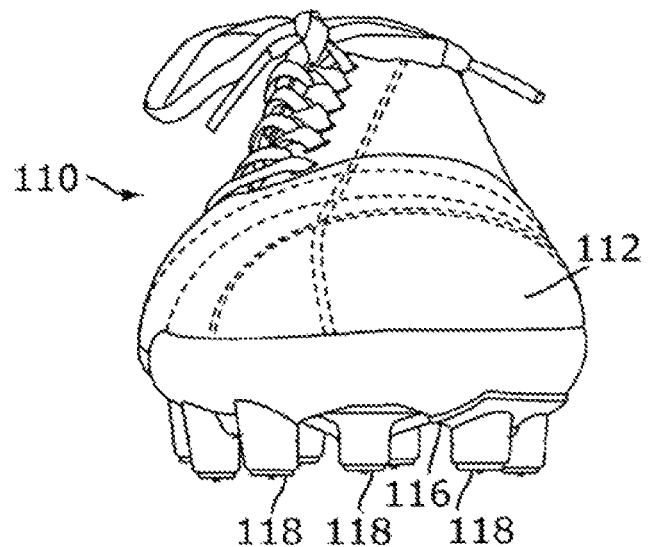
Figure 1F:
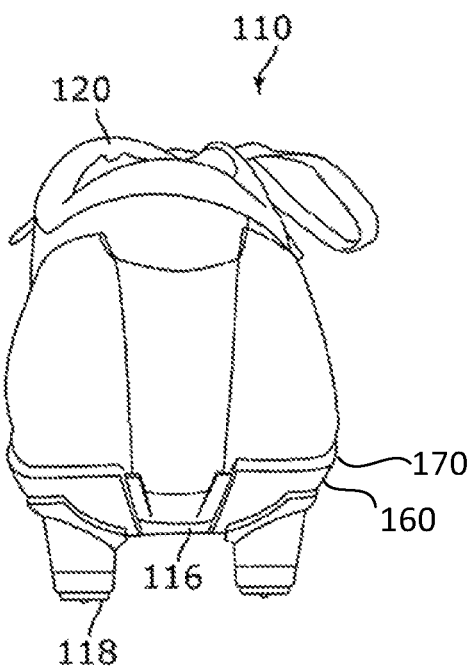

An exemplary cleated article of athletic footwear 110, such as a soccer/futbol boot, is described with reference to FIGS. 1A-1H. FIG. 1A is a lateral side perspective view of an exemplary cleated article of athletic footwear 110, which includes an upper 112 and a sole structure 113, which includes a plate 116, an edge portion 160, and a textile 114 disposed on the upper side 152 of the plate (see, e.g., FIG. 1G). The textile 114 is located between the plate 116 and the upper 112. Optionally, the textile 114 extends between the edge portion 160 and the upper 112. The plate 116 includes multiple traction elements 118. When worn, traction elements 118 provide traction to a wearer so as to enhance stability. One or more of the traction elements 118 can be integrally formed with the plate, as illustrated in FIG. 1A, or can be removable. Optionally, one or more of the traction elements 118 can include a traction element tip (not pictured) configured to be ground-contacting. The traction element tip can be integrally formed with the traction element 118. Optionally, the traction element tip can be formed of a different material (e.g., a metal, or a polymeric material containing different polymers) than the rest of the traction element 118. FIG. 1B is a lateral side elevational view of article of footwear 110. When the article of footwear 110 is worn, the lateral side of the article 110 is generally oriented on the side facing away from the centerline of the wearer's body. FIG. 1C is a medial side elevational view of the article of footwear 110. When the article of footwear 110 is worn, the medial side generally faces toward the centerline of the wearer's body. FIG. 1D is a top view of the article of footwear 110 (with no sock liner in place) and without a lasting board or other board-like member 115, and further shows upper 112. Upper 112 includes a padded collar 120. Alternatively or in addition, the upper can include a region configured to extend up to or over a wearer's ankle (not illustrated). In at least one aspect, upper 112 is tongueless, with the upper wrapping from the medial side of the wearer's foot, over the top of the foot, and under the lateral side portion of the upper, as illustrated in FIG. 1D. Alternatively, the article of footwear can include a tongue (not illustrated). As illustrated in FIG. 1A-1G, the laces of the article of footwear 110 optionally can be located on the lateral side of the article. In other examples, the article of footwear may have a slip-on design or may include a closure system other than laces (not illustrated). FIG. 1E and FIG. 1F are, respectively, front and rear elevational views of the article of footwear 110.

Figure 1G:
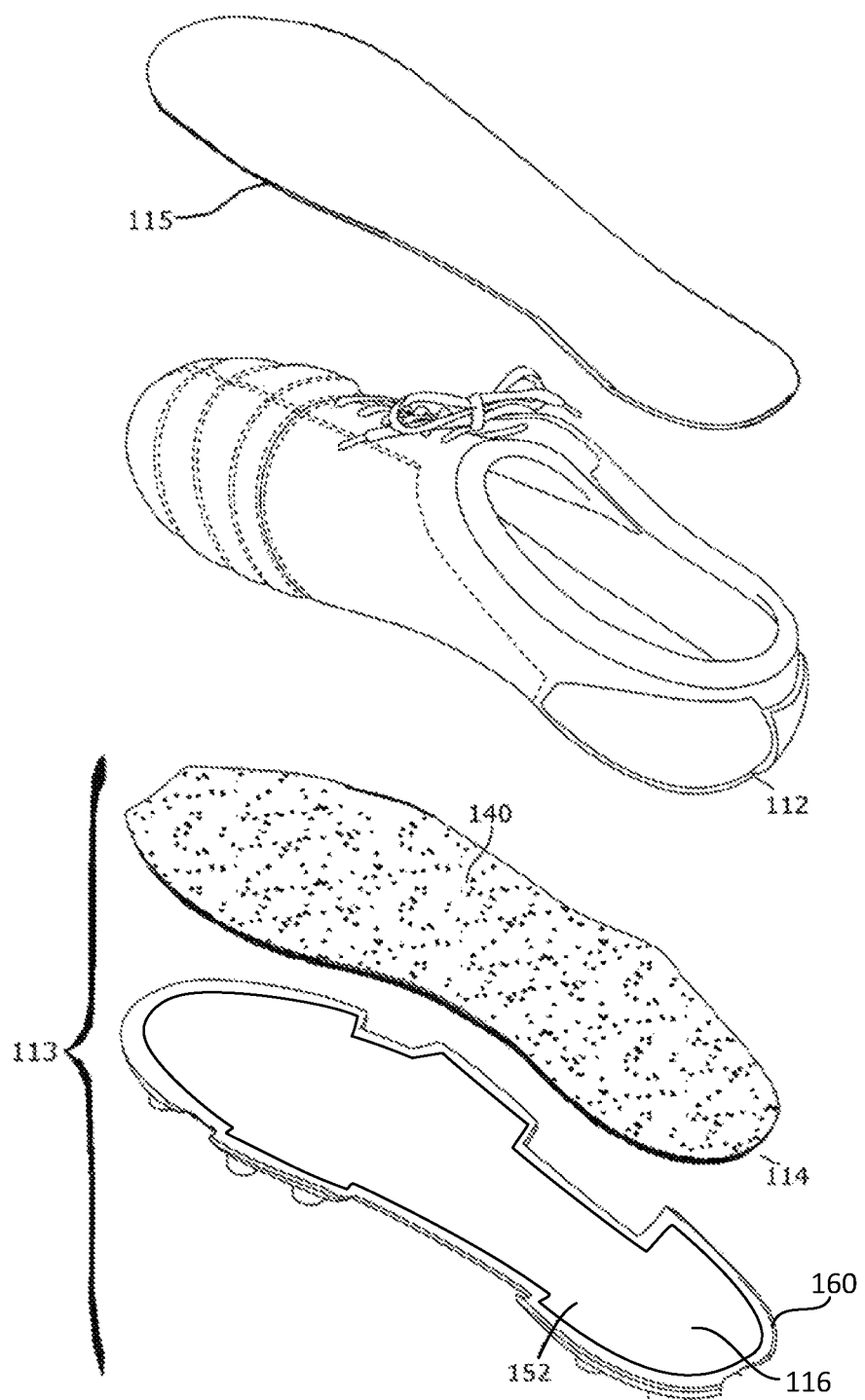
Figure 1H:
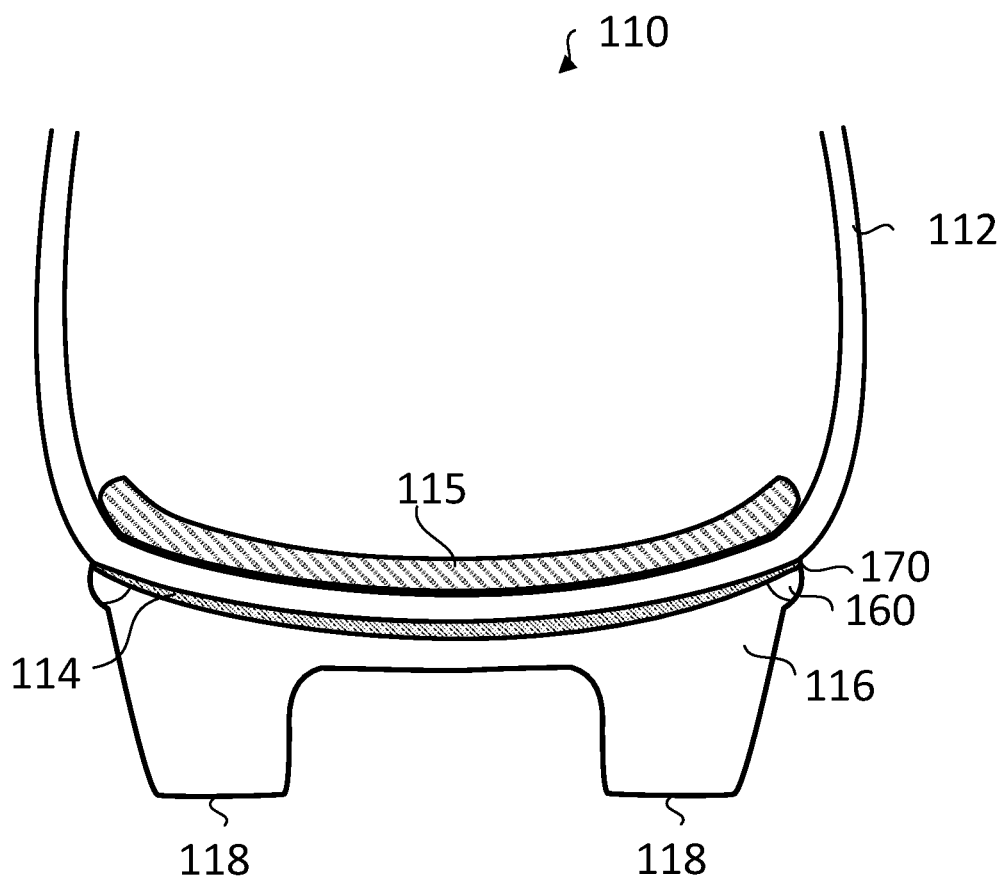

FIG. 1G is an exploded perspective view of the article of footwear 110 showing upper 112, plate 116, edge portion 160, and textile 114. In this aspect, edge portion 160 is attached to and extends around the perimeter of plate 116. Edge portion 160 may have a width as measured from the perimeter of the plate 116 to the outer edge of the edge portion 160. For example, the edge portion 160 may have a width of from about 0.25 millimeters to about 25 millimeters, or from about 0.5 millimeters to about 10 millimeters, or from about 1 millimeter to about 5 millimeters, or from about 1 millimeter to about 3 millimeters, as measured from the perimeter of plate 116 to the perimeter of the edge portion 160. Edge portion 160 may have a thickness of about 0.25 millimeters to about 5 millimeters, or from about 0.25 to about 4 millimeters, or from about 0.25 to about 3 millimeters. Textile 114 is disposed between the upper side 152 of plate 116, and the upper 112. In this configuration, textile 114 overlaps with plate 116 and optionally also extends outwardly so that it overlaps with at least a portion of edge portion 160. As seen in FIG. 1D, upper 112 includes a strobel 138. As illustrated in FIG. 1D, the strobel 138 is roughly the shape of a wearer's foot, and closes the bottom of the upper 112, and is stitched to other components to form the upper 112 along the periphery of the strobel 138 with stitching 185. A lasting board or other board-like member 115 can be located above or below the strobel 138. In some aspects, a lasting board or other board-like member can replace the strobel. The lasting board or other board-like member 115 can extend substantially the entire length of the plate, or can be present in a portion of the length of the plate, such as, for example, in the toe region 130, or in the midfoot region, or in the heel region. Upper 112 including strobel 138 is bonded to the upper surface 140 of the textile 114 (FIGS. 1G-1H), and optionally also to the edge portion 160. The lower surface 142 of the textile 114 can be bonded or melded to the upper surface 152 of the plate 116, and optionally to the edge portion 160. In some aspects, the lower surface 142 of the textile 114 can be mechanically bonded to the upper surface 152 of the plate 116, and optionally to the edge portion 160, by melding polymers in the textile 114 and the polymeric resin of the plate 116 and optionally the polymeric resin of edge portion 160. Alternatively or in addition, upper 112 including strobel 138 are mechanically bonded to the upper surface 140 of the textile 114 and optionally the edge portion 160 by melding the polymeric resin of the upper 112 or strobel 138 with the polymeric resin of the plate 116, and optionally the polymeric resin of edge portion 160. In some aspects, the bonding can include both adhesive bonding and mechanical bonding. When the sole structure 113 is attached to the upper 112, as described herein, the edge portion 160 is disposed along biteline 170.

In at least one aspect, plate 116 and textile 114 are first bonded before upper 112 and/or strobel 138 is bonded to textile 114. In some aspects, the article of footwear 110 can include a removable sock liner (not pictured). As is known in the art, a sock liner conforms to and lines the inner bottom surface of a shoe and is the component contacted by the sole (or socked sole) of a wearer's foot.

Figure 2A:
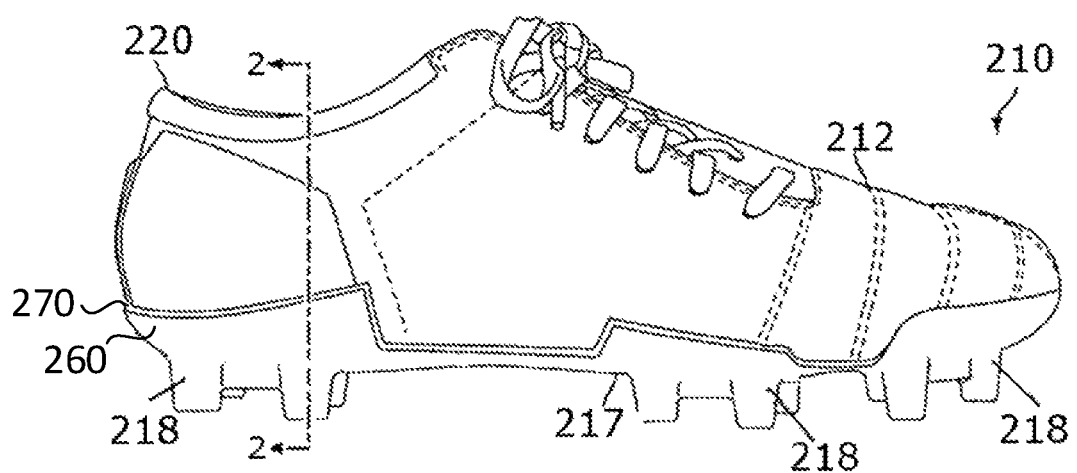
FIGS. 2A-2C depict an exemplary article of athletic footwear.
Figure 2B:
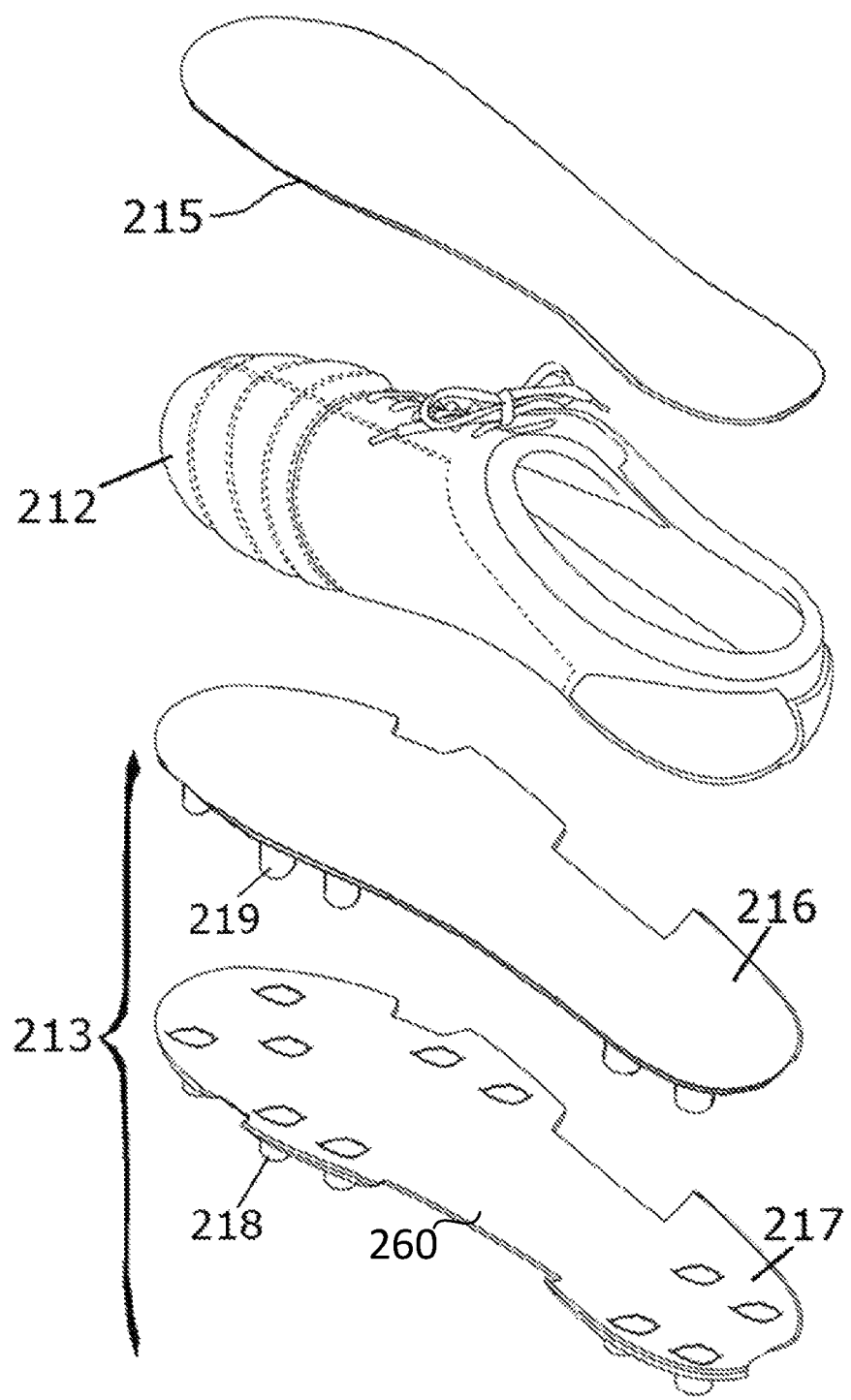
Figure 2C:
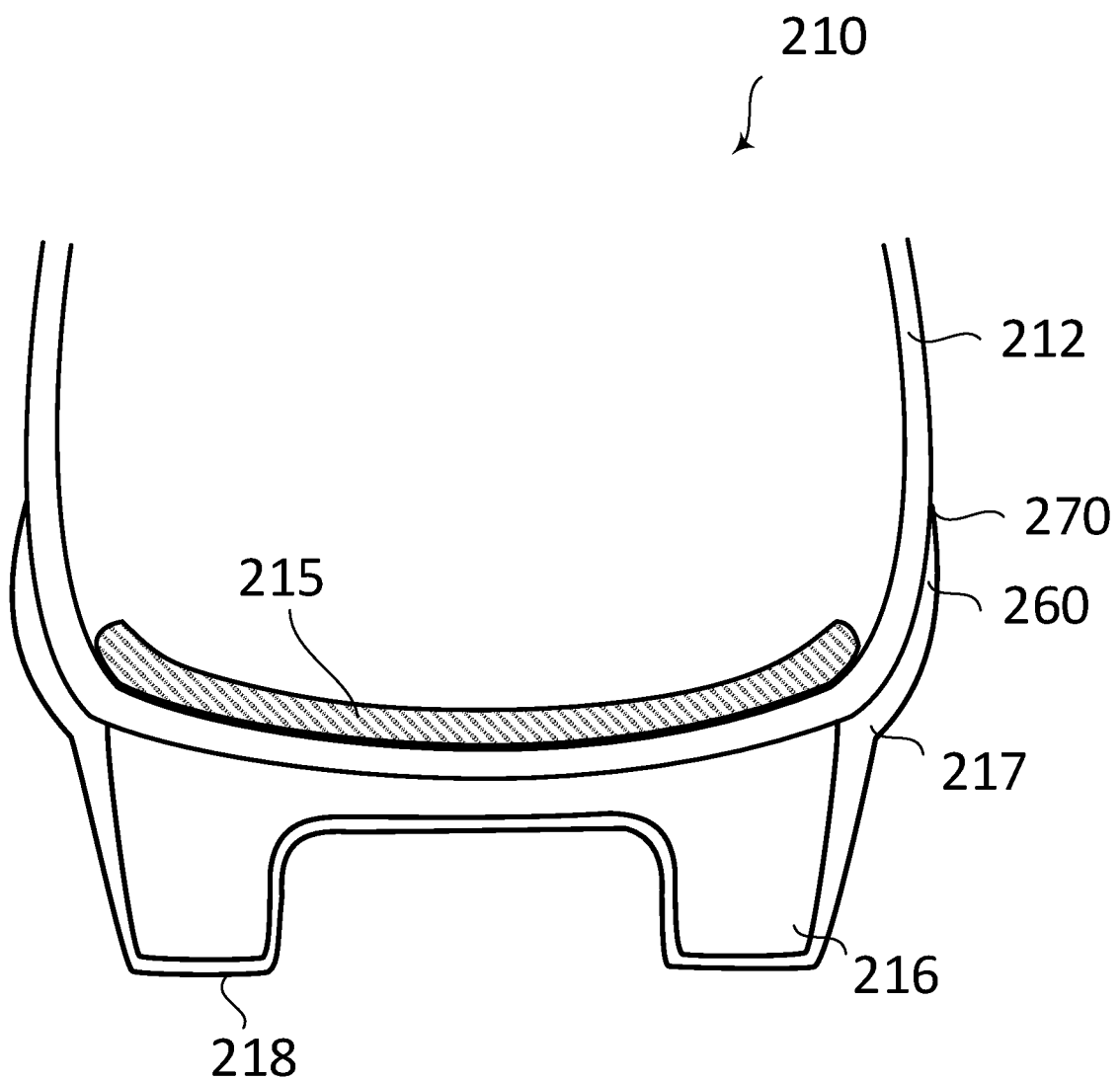

FIGS. 2A-2C depict a second exemplary article of athletic footwear. FIG. 2A is a lateral side elevational view of the exemplary article of athletic footwear. FIG. 2B is an exploded perspective view of the second exemplary article of athletic footwear. FIG. 2C is a sectional view along 2-2 of the second exemplary article of athletic footwear. FIG. 2A is a lateral side elevational view of an exemplary article of footwear 210 that does not have a textile. The article of footwear 210 includes an upper 212 and a sole structure 213 having a plate 216 and a chassis 217. Chassis 217 includes edge portion 260 that extends about the perimeter of plate 216 when the sole structure is assembled. Edge portion 260 may be formed integrally with the chassis 217, or it may be separately provided and combined or joined with the chassis 217. The chassis 217 includes multiple traction elements 218. The traction elements 218 can be formed entirely from the chassis 217 material or, as pictured in FIG. 2B, the traction elements 118 can have a corresponding inner traction element 219 that is formed in the plate 216 and encased by the chassis 217. Optionally, one or more of the traction elements 218 can include a traction element tip (not pictured) configured to be ground-contacting. The article of footwear 210 can include a lasting board member 215 which can extend substantially the entire length of the plate 216. Referring to FIG. 2C, when the sole structure 213 is incorporated into article of footwear 210 the upper 212 is bonded (e.g., adhesively, mechanically) to the plate 216 and chassis 217, including to edge portion 260. When the sole structure 213 is attached to the upper 212, as described herein, the edge portion 260 is disposed along biteline 270.

Figure 3A:
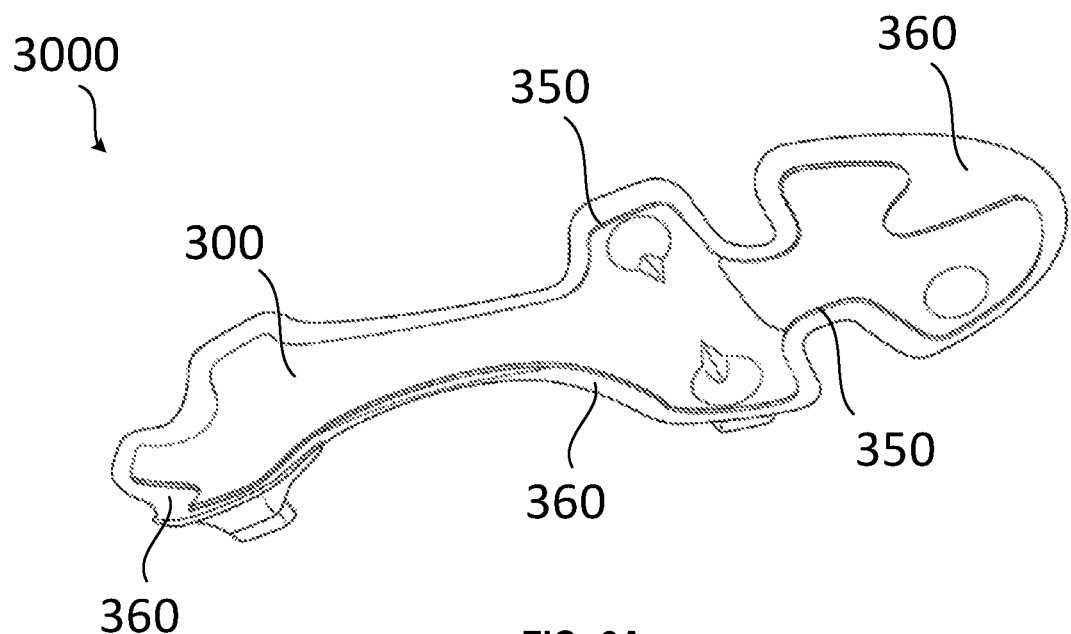
FIG. 3A depicts an exemplary sole structure having a rigid plate that provides rigidity, and a more flexible edge portion disposed about an outer perimeter of the rigid plate.
Figure 3B:
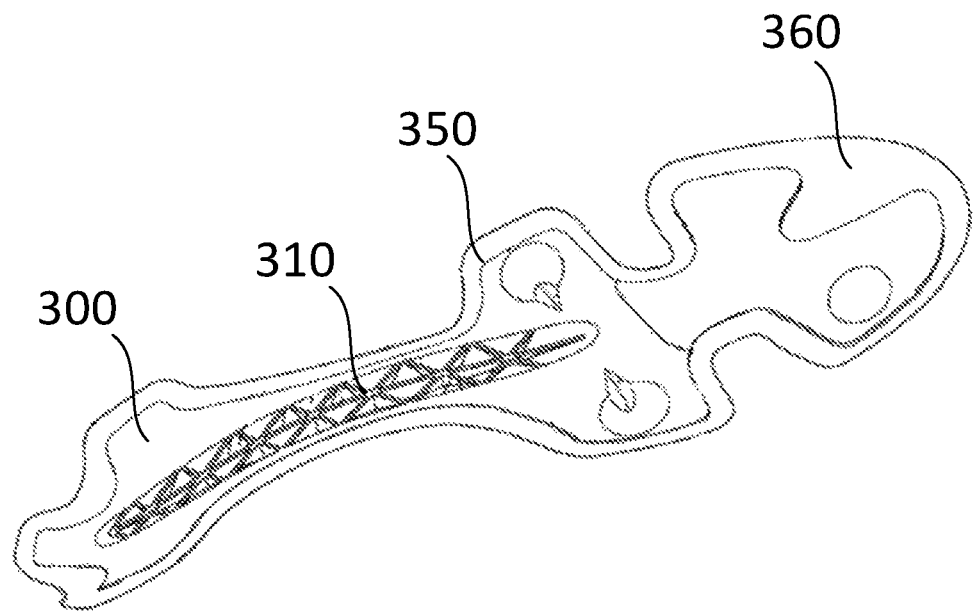
FIG. 3B depicts an exemplary sole structure having a rigid plate that provides rigidity and a more flexible edge portion disposed about an outer perimeter of the rigid plate, with a reinforcing rib extending longitudinally along the plate, providing rigidity without adding substantial amounts of extra material, and therefore maintaining a low weight.
Figure 3C:
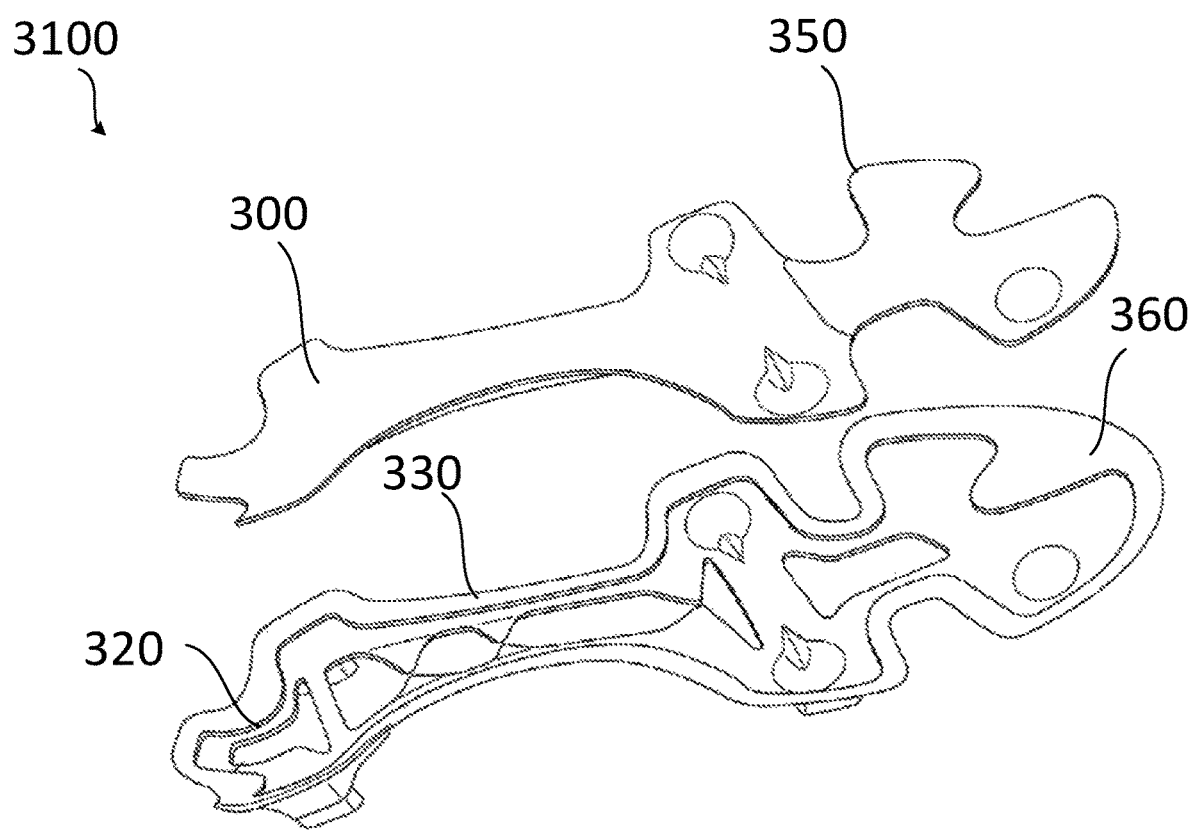
FIG. 3C depicts an exploded view of an exemplary sole structure having a rigid plate, and a chassis configured to receive the rigid plate, so that when the chassis and the rigid plate are operably coupled, the chassis provides a more flexible edge portion about the outer perimeter of the rigid plate.

In the various aspects, the edge portion can be coupled directly or indirectly with the perimeter of the plate. Exemplary sole structures are described with reference to FIGS. 3A-3C. In some aspects, the plate can provide rigidity, strength, and/or support to the sole structure without substantially adding weight. For example, some exemplary sole structure aspects may include a plate having certain features that provide resistance to vertical bending, lateral bending, and/or torsion. Referring to FIGS. 3A-3B, an exemplary sole structure 3000 includes a plate 300 which can optionally include a reinforcing rib 310 longitudinally along the plate. The reinforcing rib 310 can, for example, include a hollow structure, and thus, may provide rigidity without adding substantial amounts of extra material, and therefore maintains a low weight. The plate 300 has an outer perimeter 350. An edge portion 360 is operably coupled with the plate 300 on at least a portion of the perimeter 350 of the plate 300. According to the various embodiments, edge portion 360 is more flexible than the plate 300. For example, flexural modulus is one measure of flexibility. In some aspects, the edge portion 360 can be formed integrally with the plate, e.g., injection molded with the plate 300 or onto the perimeter 350 of the plate 300. In other aspects, the edge portion 360 can be separately provided, e.g., formed as a separate component that is combined or joined with plate 300. Referring to FIG. 3C, another exemplary sole structure 3100 includes plate 300 operably coupled with a chassis 330 that comprises the edge portion 360. For example, the chassis 330 may have a recess 320 in the chassis 330 that is configured to receive the plate 300, and an edge portion 360, disposed about the recess 320. Edge portion 360 may be formed integrally with the chassis 330, or it may be separately provided and combined or joined with the chassis 330. When the plate 300 is seated in the recess 320 of chassis 330 the edge portion 360 is disposed about the perimeter 350 of the plate 300.

Figure 4A:
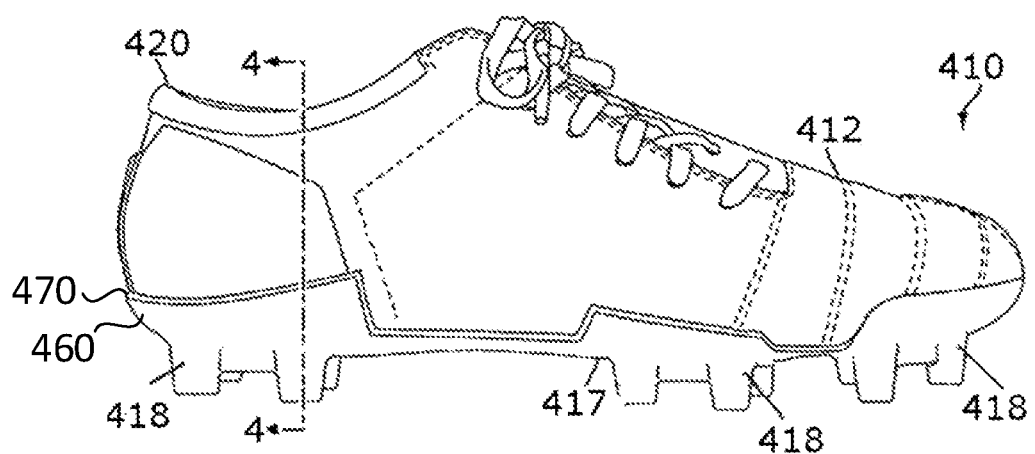
FIGS. 4A-4C depict an exemplary article of athletic footwear.
Figure 4B:
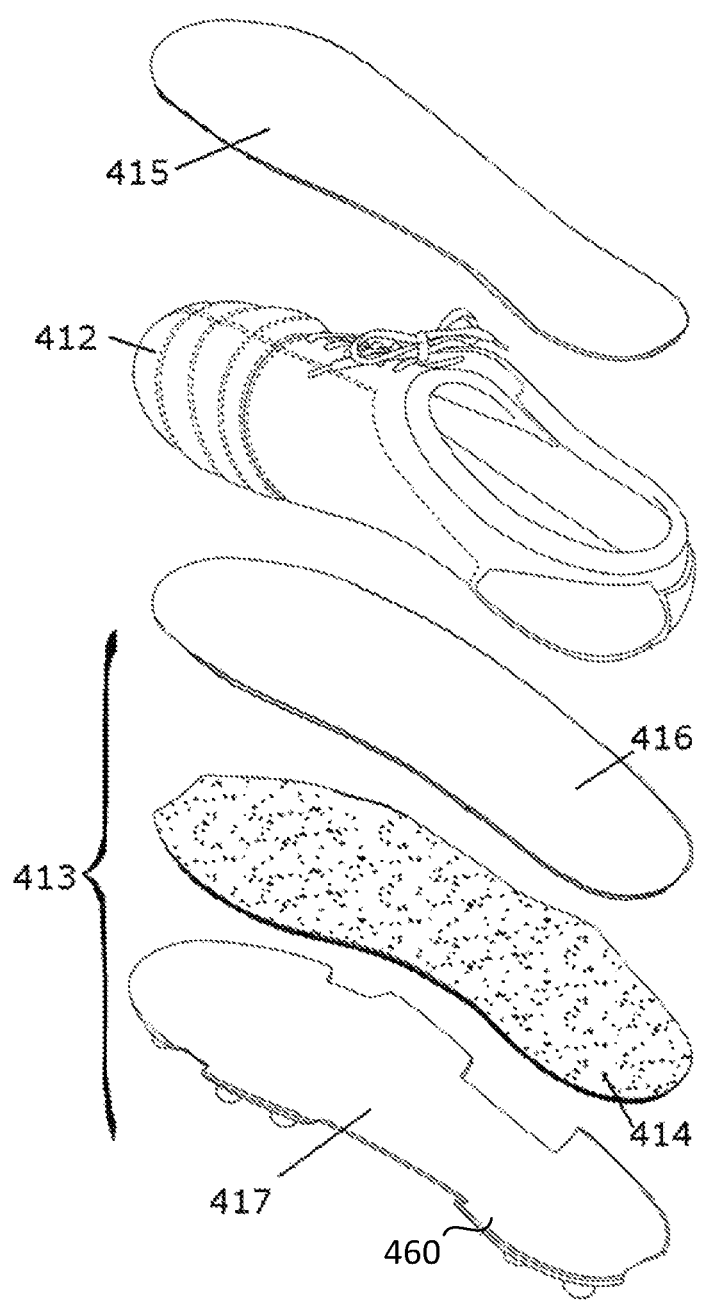
Figure 4C:
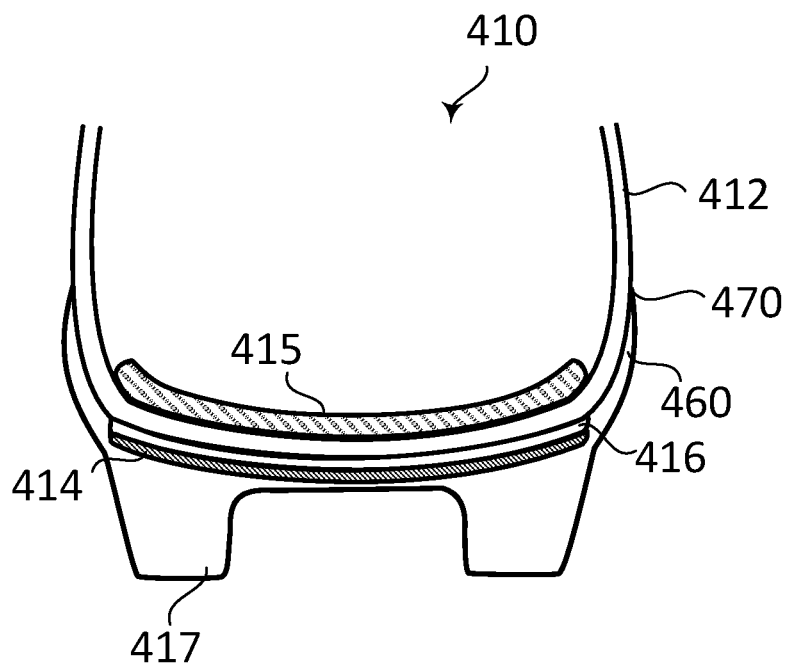

In some aspects, when the sole structure includes a plate and a chassis configured to wrap around the plate and to engage or be attached to an upper when the sole structure is a component of an article of footwear, the sole structure also includes one or more textiles. For example, a textile can be between the plate and the upper and can provide for improved bonding between the plate and the upper. A textile can also be positioned between the plate and the chassis. In aspects where the textile is between the plate and the chassis, the textile can provide for improved adhesion between the plate and the chassis and/or the textile can be a decorative or ornamental textile. In some aspects, the sole structure can include a decorative textile on the exterior or ground facing surface of the chassis. For example, as depicted in FIGS. 4A-4C, the article of footwear 410 includes an upper 412 and a sole structure 413 having a plate 416, a chassis 417, and edge portion 460. The chassis 417 includes multiple traction elements 418. The traction elements 418 can be formed entirely from the chassis 417 material as pictured. Optionally, one or more of the traction elements 418 can include a traction element tip (not pictured) configured to be ground-contacting. A textile 414 is positioned between the plate 416 and the chassis 417 and optionally edge portion 460. The article of footwear 410 can include a lasting board member 415 which can extend substantially the entire length of the plate 416. When the sole structure 413 is attached to the upper 412, as described herein, the edge portion 460 is disposed generally along the biteline 470.

Figure 5A:
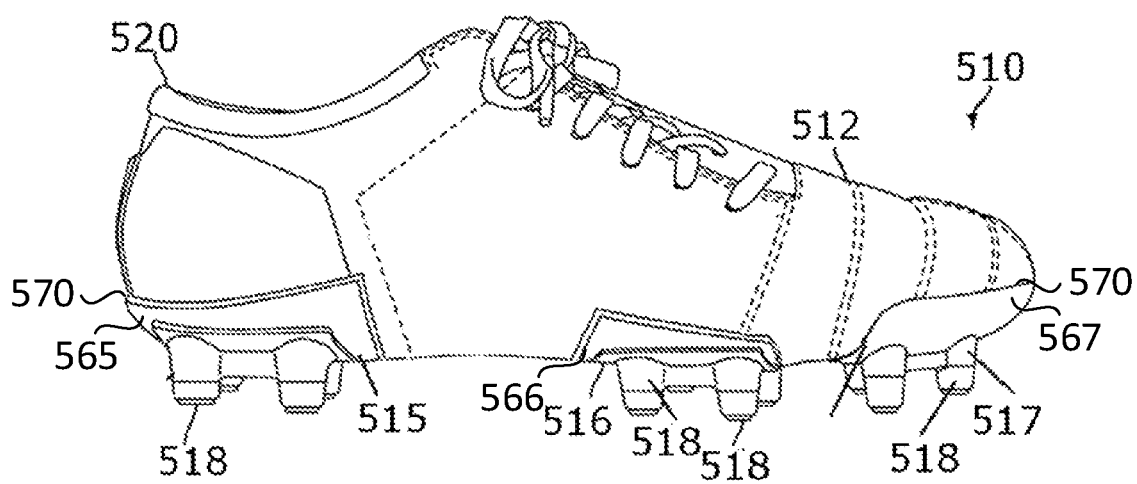
FIGS. 5A-5B depict an exemplary article of athletic footwear.
Figure 5B:
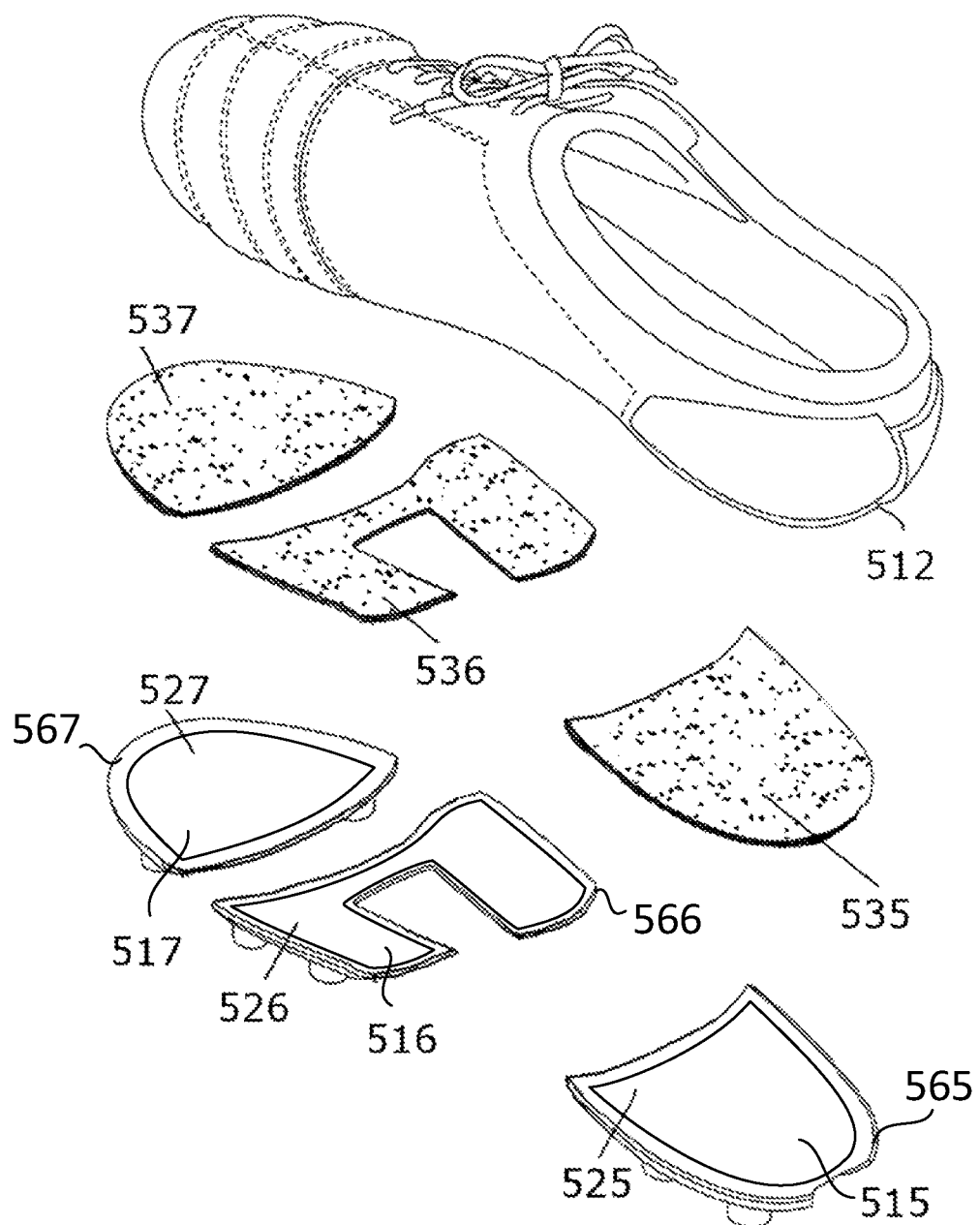

FIG. 5A is a lateral side elevational view of an exemplary article of footwear 510 including an upper 512, and separate heel plate 515, midfoot plate 516, and toe plate 517. An edge portion may extend around the outer perimeter of one or more of the plates, for example heel edge portion 565 may extend around at least a portion of the perimeter of heel plate 515, midfoot edge portion 566 may extend around at least a portion of the perimeter of midfoot plate 516, toe edge portion 567 may extend around at least a portion of the perimeter of toe plate 517, or any combination thereof. Each of the heel plate 515, midfoot plate 516, and toe plate 517 include multiple traction elements 518. When worn, traction elements 518 provide traction to a wearer so as to enhance stability. One or more of the traction elements 518 can be integrally formed with the heel plate 515, midfoot plate 516, and/or toe plate 517, as illustrated in FIG. 5A, or can be removable. FIG. 5B is an exploded perspective view of the article of footwear 510 showing upper 512, heel plate 515, midfoot plate 516, and toe plate 517. In this aspect, one or more textiles may be disposed between upper 512 and heel plate 515, midfoot plate 516, and/or toe plate 517, respectively. Optionally, the one or more textiles may be disposed between upper 512 and one or more of heel edge portion 565, midfoot edge portion 566, and/or toe edge portion 567 For example, a heel textile 535 may be disposed between upper 512 and the upper surface 525 of the heel plate 515 and, optionally, heel edge portion 565. Toe textile 537 may be disposed between upper 512 and the upper surface 527 of the toe plate 517 and, optionally, midfoot edge portion 567. Likewise, a midfoot textile 536 may be disposed between upper 512 and the upper surface 526 of the midfoot plate 516 and, optionally, midfoot edge portion 566. The textiles can provide for improved bonding between upper 512, heel plate 515, midfoot plate 516, and toe plate 517 (and optionally, the respective edge portions 565, 566, 567). When the sole structure is attached to the upper 512, as described herein, the heel edge portion 565, midfoot edge portion 566, and toe edge portion 567 are disposed along biteline 570.

In some aspects, at least a portion of the edge portion may extend vertically above the biteline where an outsole and upper are attached, providing an extended edge portion. An extended edge portion may be continuous around the upper, or around the periphery of an outsole element such as a plate, or may be discontinuous or located only in select areas. For example, the extended edge portion may extend around the entire outer periphery of the upper through each of the forefoot portion, the midfoot portion, and the heel portion. In other embodiments, an extended edge portion may be present only on the forefoot portion of the upper, or on the forefoot portion and the heel portion of the upper. Extended edge portion may have a width as measured from the perimeter of the biteline to the outer edge of the extended edge portion. For example, the extended edge portion may have a width of from about 0.25 millimeters to about 25 millimeters, or from about 0.5 millimeters to about 10 millimeters, or from about 1 millimeter to about 5 millimeters, or from about 1 millimeter to about 3 millimeters, as measured from the biteline to the perimeter of the extended edge portion.

Figure 7A:
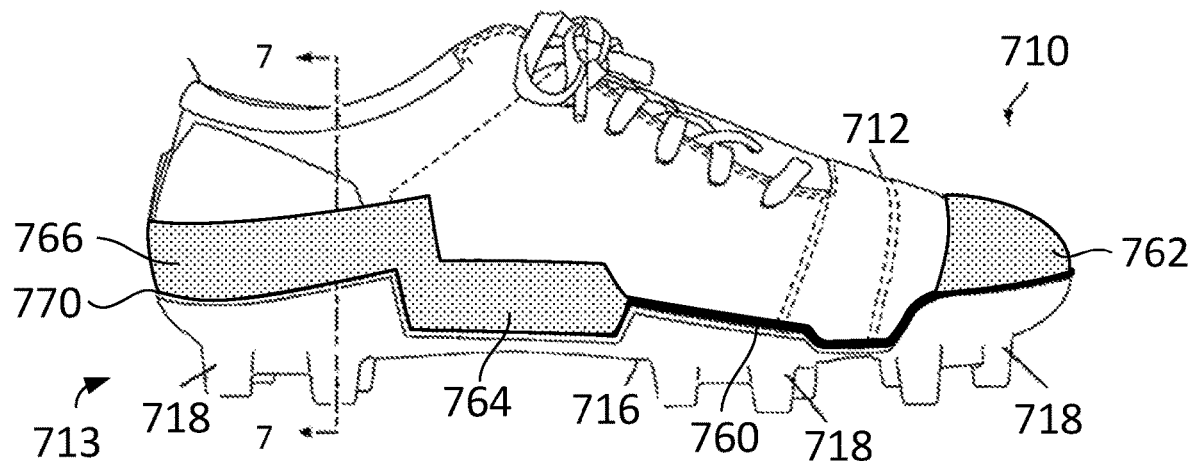
FIGS. 7A-7B depict an exemplary article of athletic footwear.
Figure 7B:
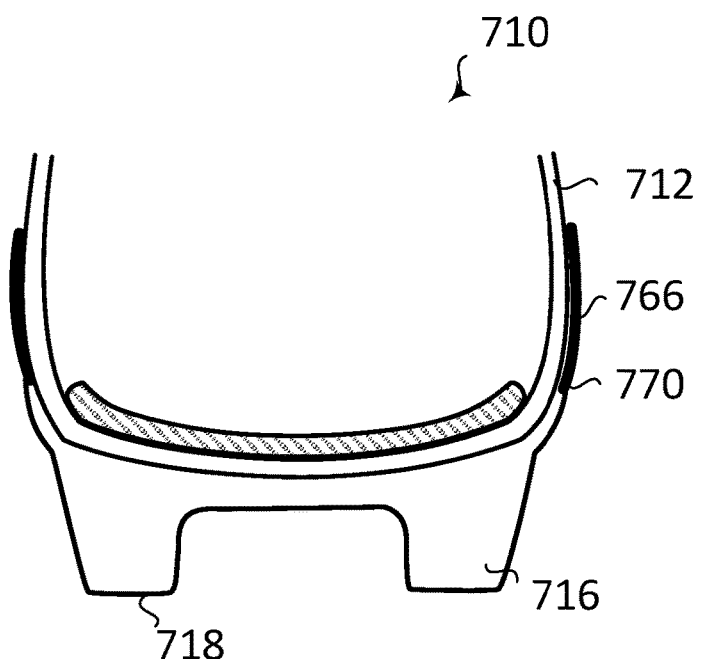

Referring to FIGS. 7A and 7B, in an aspect, an article of footwear 710 includes upper 712 operably coupled with sole structure 713. Sole structure 713 includes plate 716 with one or more traction elements 718, and edge portion 760 that extends about the perimeter of the plate 716. When assembled, biteline 770 is formed where perimeter of the plate 716 and upper 712 are joined. Edge portion 760 extends beyond biteline 770. In some aspects, edge portion 760 may have a substantially uniform height above the biteline 770 about the perimeter of the article of footwear 710, or it may have a height that varies about the perimeter of the article of footwear 710. For example, the edge portion 760 may have a greater height in the forefoot portion or in the heel portion of the article of footwear 710, as necessary or desired. In at least a portion of the article of footwear 710, the edge portion 760 optionally includes one or more extended edge portions that extend well beyond the biteline 770. For example, a first extended edge portion 762 may extend beyond the biteline 770, wrapping around at least a portion of the toe portion of the upper 712. In some aspects, a second extended edge portion 764 extends beyond the biteline 770, wrapping around at least a portion of the lateral portion of the upper 712. In some aspects, a third extended edge portion 766 extends beyond the biteline 770, wrapping around at least a portion of the heel portion of upper 712. Edge portion 760 has a certain thickness as measured from the surface of the upper to which it is attached. In some aspects, the thickness of the edge portion 760 may vary along the height of the edge portion 760. For example, the edge portion 760 may be tapered having a first thickness at the biteline 770 that is greater than a second thickness at the upper edge of the edge portion 760. Edge portion 760 may have a substantially uniform thickness about the perimeter of the article of footwear 710, or it may have a thickness that varies about the perimeter of the article of footwear 710. For example, the edge portion 760 may have a greater thickness in the forefoot portion or in the heel portion of the article of footwear 710, as necessary or desired. In some aspects, the edge portion 760 may have a thickness of about 0.25 millimeters to about 5 millimeters, or from about 0.25 millimeters to about 4 millimeters, or from about 0.25 millimeters to about 3 millimeters.

In some aspects, one or more of the extended edge portions 762, 764, 766 can include one or more decorative elements. For example, extended edge portion 762 can include a first decorative portion disposed on the toe portion of the article of footwear 710, extended edge portion 764 can include a second decorative portion 764 disposed on the medial portion of the article of footwear 710, extended edge portion 766 can include a third decorative portion disposed on the heel portion of the article of footwear 710, or a combination thereof. Each of the decorative portions can include printing, coloring, or a combination thereof. For example, the externally-facing or internally-facing sides of the extended edge portions 762, 764 and/or 766, can include printing directly on the edge portion, or can include a film (e.g., a printed film), or can include a textile (e.g., a printed textile). When the printing or film or textile is disposed on the externally-facing side (in the assembled article of footwear), it can provide a decorative feature to the article of footwear 710. When the printing or film or textile is disposed on the internally-facing side of the extended edge portion 760, and the edge portion 760 is at least partially transparent, it can provide a decorative feature which is visible through the edge portion 760

In some aspects, an article of footwear can have a rand operably coupled with the upper and the sole structure. Generally speaking, a rand is a component of an article of footwear that is disposed on an exterior surface of the article of footwear. The rand may be disposed on the upper, on the sole structure, or both. In some aspects, the rand may overlap the biteline where an outsole and upper are attached, and may extend vertically above and/or below the biteline. A rand may be continuous around the article of footwear, or may be discontinuous or located only in select areas. For example, a rand may extend around the entire outer periphery of the article through each of the forefoot portion, the midfoot portion, and the heel portion. In other embodiments, a rand may be present only on the forefoot portion of the upper, or on the forefoot portion and the heel portion of the article. A rand may comprise any material that provides properties and characteristics necessary or desirable for that area of the article of footwear, such as, for example, additional bonding strength between the upper and the sole structure, additional abrasion resistance, additional water resistance, or a combination thereof. In some aspects, the rand may have a decorative appearance, such as by coloring or printing. In some aspects, the rand may have a textured surface.

Figure 6A:
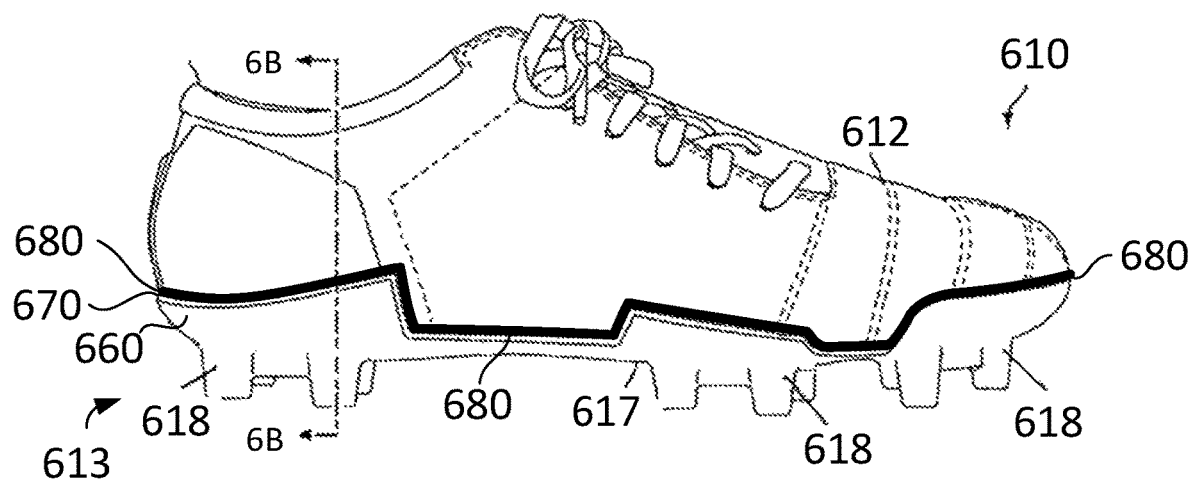
FIGS. 6A-6E depict an exemplary article of athletic footwear.
Figure 6B:
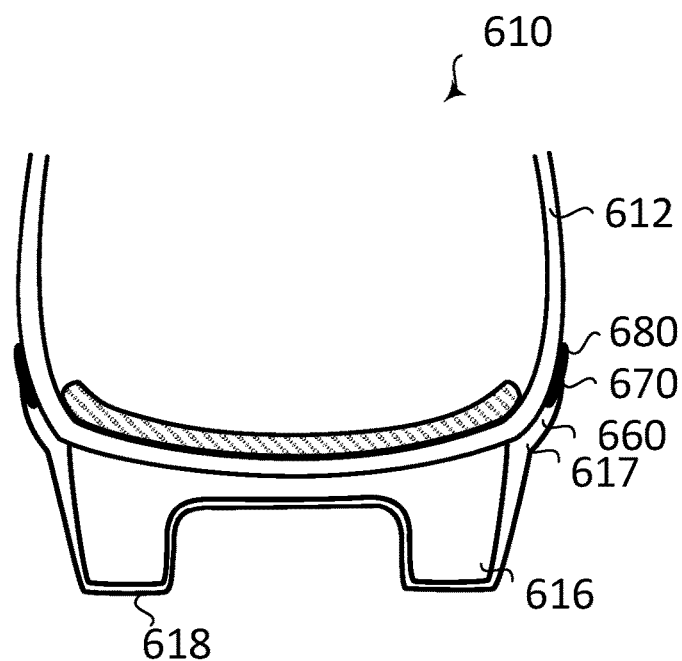
Figure 6C:
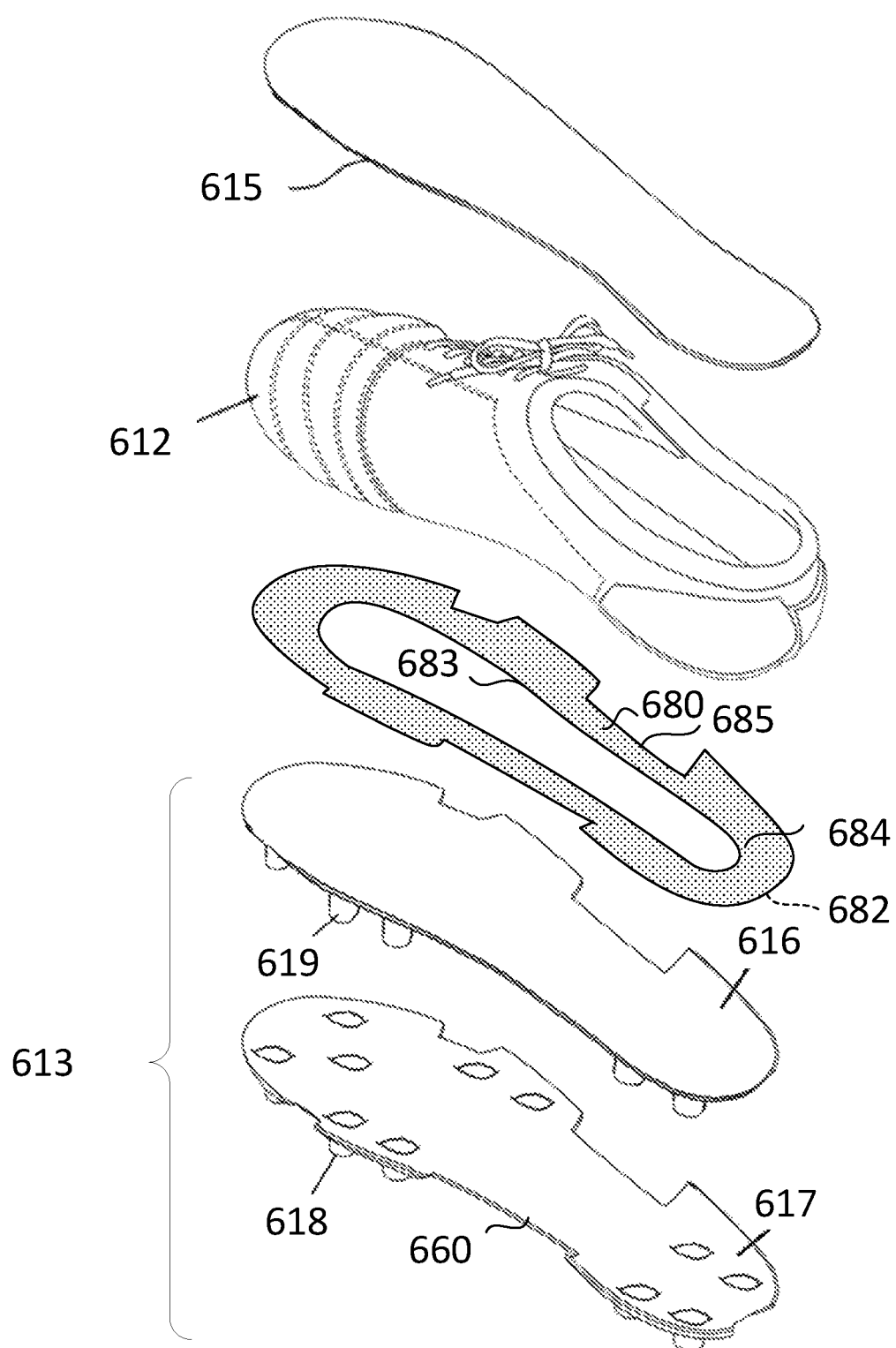
Figure 6D:
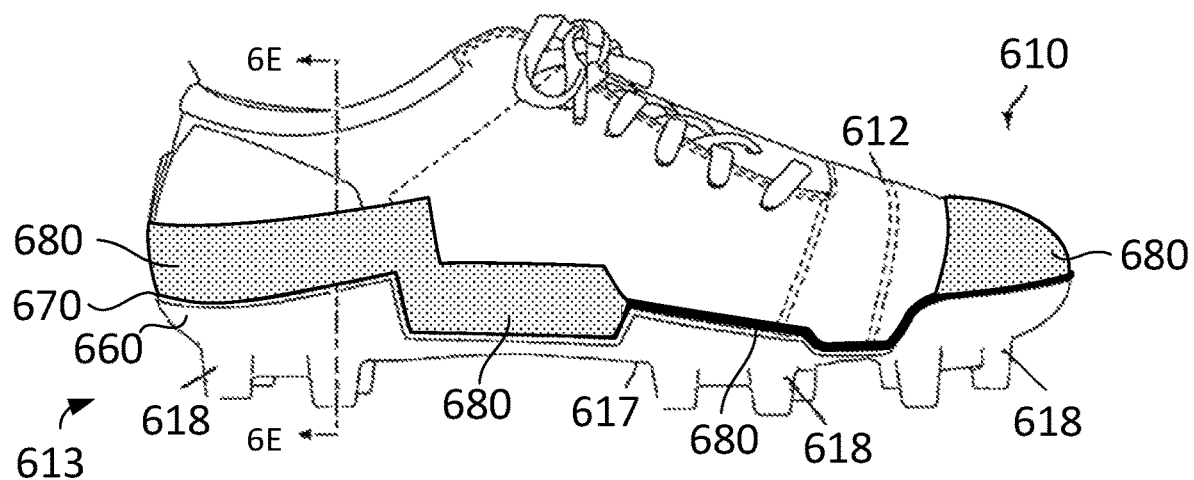
Figure 6E:
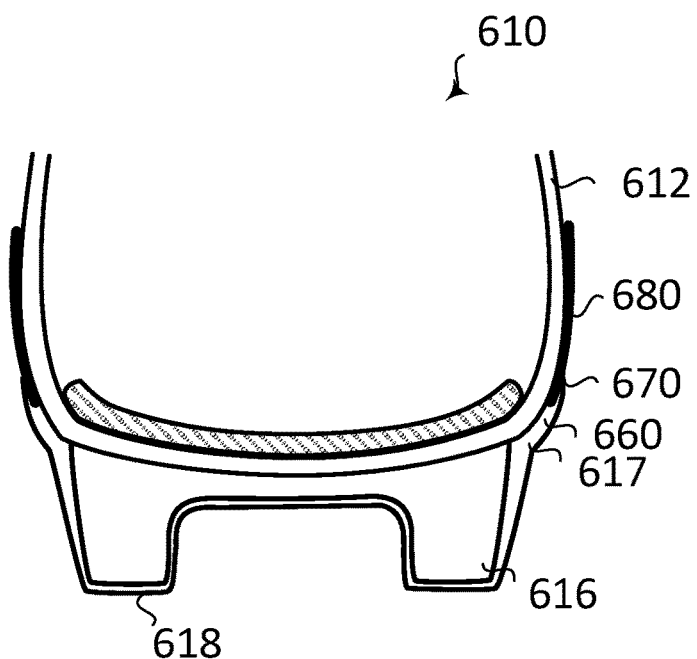
Figure 8A:
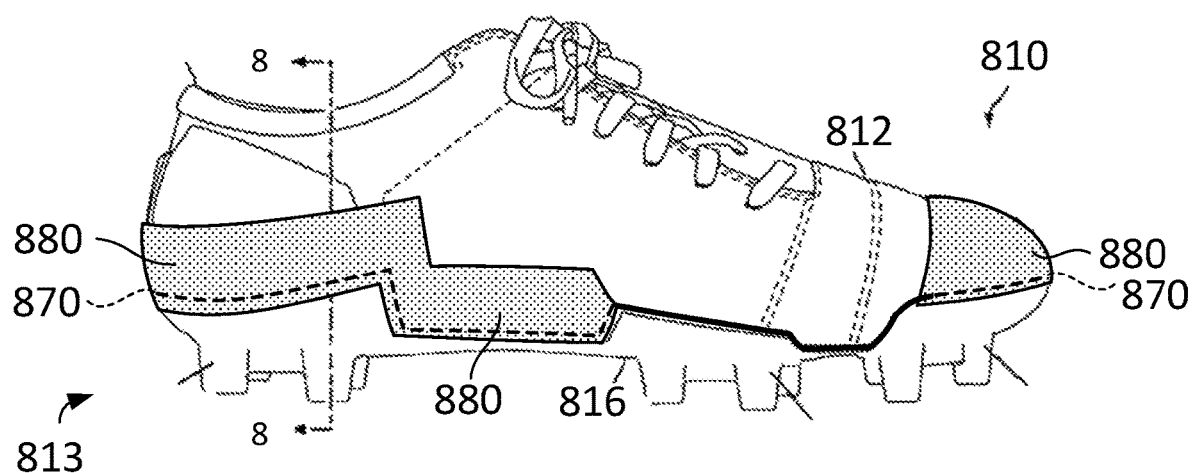
FIGS. 8A-8B depict an exemplary article of athletic footwear.
Figure 8B:
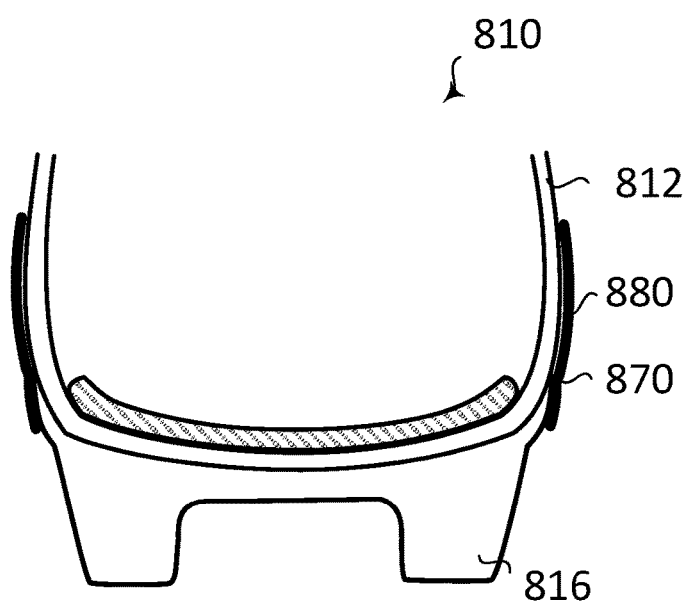

FIGS. 6A-6E depict another exemplary article of athletic footwear having a rand. FIG. 6A is a lateral side elevational view of an exemplary article of footwear 610 that has a rand 680. The article of footwear 610 includes an upper 612 and a sole structure 613. Sole structure 613 includes edge portion 660 that extends about the perimeter of plate 616 when the sole structure is assembled. Edge portion 660 may be formed integrally with the plate 616, or it may be separately provided and combined or joined with the plate 616. Rand 680 is attached to the upper 612, the sole structure 613, or both, extending about the perimeter of the plate 616 and/or edge portion 660, so that when the sole structure 613 is attached to the upper 612, the rand 680 extends past the biteline 670. Rand 680 may be disposed at least partially between plate 616 and upper 612, such as shown in FIGS. 6A to 6E, or it may be disposed on the exterior surface of the article of footwear (see FIGS. 8A and 8B).

In some aspects, rand 680 may be coated or printed onto the surface of the upper 612, the sole structure, or both. In some aspects the rand 680 can be mechanically bonded to the upper, to the plate, or both, for example, by melding polymers in the rand 680 to the surface of the plate and/or the upper. In some aspects, the rand 680 can be adhesively bonded to the upper, the plate, or both. In some aspects, the bonding can include both adhesive bonding and mechanical bonding. In some aspects, one or more additional materials may be provided between the rand 680 and the surface of the upper 612. For example, a textile or a film layer may be provided between the rand 680 and upper 612, to provide a better surface for bonding, e.g., using conventional footwear adhesives or polyolefin-compatible adhesives.

When the sole structure 613 is attached to the upper 612, rand 680 extends a certain height above biteline 670. Rand 680 may have a substantially uniform height above the biteline 670 about the perimeter of the article of footwear 610, or it may have a height that varies about the perimeter of the article of footwear 610 (see, e.g., FIG. 6D). For example, the rand 680 may have a greater height in the forefoot portion or in the heel portion of the article of footwear 610, as necessary or desired. Rand 680 has a certain thickness as measured from the surface of the upper to which it is attached. In some aspects, the thickness of the rand 680 may vary along the height of the rand 680. For example, the rand 680 may be tapered having a first thickness at the biteline 670 that is greater than a second thickness at the upper edge of the rand 680. Rand 680 may have a substantially uniform thickness about the perimeter of the article of footwear 610, or it may have a thickness that varies about the perimeter of the article of footwear 610. For example, the rand 680 may have a greater thickness in the forefoot portion or in the heel portion of the article of footwear 610, as necessary or desired. In some aspects, the rand 680 may have a thickness of about 0.25 millimeters to about 5 millimeters, or from about 0.25 millimeters to about 4 millimeters, or from about 0.25 millimeters to about 3 millimeters.

In some aspects, the rand may be disposed substantially entirely on the outer surface of the article of footwear. For example, referring to FIGS. 8A and 8B, article of footwear 810 includes an upper 812 and a sole structure 813, including plate 816. Rand 880 is attached to the upper 812, as well as the plate 816, so that when the sole structure 813 is attached to the upper 812, the rand 880 covers the biteline 870. Rand 880 may be provided about the entirety of perimeter of the article of footwear 810, or only about a portion of article of footwear 810.

In some aspects, at least a portion of the rand 880 can include one or more decorative elements. For example, rand 880 can include a first decorative portion disposed on the toe portion of the article of footwear 810, a second decorative portion disposed on the medial portion of the article of footwear 810, a third decorative portion disposed on the heel portion of the article of footwear 810, or a combination thereof. Each of the decorative portions can include printing, coloring, or a combination thereof. For example, the externally-facing or internally-facing sides of the rand 880, can include printing directly on the rand, or can include a film (e.g., a printed film), or can include a textile (e.g., a printed textile). When the printing or film or textile is disposed on the externally-facing side (in the assembled article of footwear), it can provide a decorative feature to the article of footwear 810. When the printing or film or textile is disposed on the internally-facing side of the rand 880, and the rand 880 is at least partially transparent, it can provide a decorative feature which is visible through the rand 880.

This disclosure provides a variety of sole structures including a polyolefin plate, i.e. including a plate containing a first polyolefin resin composition. The first polyolefin resin composition can include any of the polyolefin resin compositions described herein. The sole structures can also include an elastomeric material containing a cured rubber and a hydrogel material, wherein in the elastomeric material, the hydrogel material is distributed throughout the cured rubber, and at least a portion of the hydrogel material present in the elastomeric material is physically entrapped by the cured rubber. Such systems are described in U.S. provisional patent application 62/574,262 entitled "RUBBER COMPOSITIONS AND USES THEREOF" filed Oct. 19, 2017, the contents of which are incorporated in their entirety as if fully disclosed herein. The elastomeric materials can provide for anti-clog properties.

The sole structures include an edge portion disposed about an outer perimeter of the polyolefin plate. The edge portion is generally more flexible (e.g., greater flexural modulus) than the polyolefin plate, to provide a more flexible attachment to the upper at the biteline. The edge portion can be formed integrally with the plate, or can be separately provide and attached or bonded to the plate. The edge portion can have one or more extended portions that at least partially wrap about the surface of the upper. The edge portion includes a second resin that is different from the first polyolefin resin. In some aspect, the second resin can include a polyolefin resin composition similar to the first polyolefin resin composition of the plate, but with a greater amount of resin modifier to provide a more flexible material. Alternatively, the second resin composition can include any other resin composition as described herein. In general, the second resin can be any resin that is compatible with the first polyolefin resin and that has the necessary or desired durability and mechanical properties.

In some aspects, the edge portion or the rand or both may comprise a hydrogel material. In an aspect, the hydrogel material may be coated on a target surface of the edge portion or the rand or both. In an aspect, the edge portion or the rand, or both may comprise an elastomeric material containing a cured rubber and a hydrogel material, wherein in the elastomeric material, the hydrogel material is distributed throughout the cured rubber, and at least a portion of the hydrogel material present in the elastomeric material is physically entrapped by the cured rubber.

The article may optionally include a rand disposed about at least part of the plate and/or the edge portion. The optional rand overlaps and extends beyond the biteline when the sole structure is bonded to the upper. The rand can be separately provided and attached or bonded to the plate, edge portion, upper, or a combination thereof. The optional rand may comprise a material that provides properties and characteristics necessary or desirable for that area of the article of footwear, such as, for example, additional abrasion resistance or water resistance.

In some aspects, the sole structures can include a textile on one or more surfaces of the plate. For instance, when the plate has a first side and a second side, the first side can be configured to be ground-facing when the plate is a component of an article of footwear and the second side can be configured to be upward facing. In some aspects, the textile is on one or both of the first side and the second side. The textile can provide for improved bonding between the plate and other components of the sole structure, e.g. between the plate and a chassis. The textile can also provide for improved bonding between the plate and the upper when the sole structure is a component of an article of footwear. In some aspects, the textile is a patterned or decorative textile. In some aspects, the textile can extend beyond the perimeter of the plate, e.g., so that it overlaps the edge portion on the first side of the plate, the second side of the plate, or both.

In some aspects, the sole structures include a chassis. In some aspects, the chassis is in combination with one or more textiles in the sole structure, while in some aspects the sole structure includes a chassis and no textile. The chassis can be configured to be on the first side or ground facing side of the plate. In some aspects, the chassis is configured to wrap around the plate and to engage or be attached to an upper when the sole structure is a component of an article of footwear. The chassis can attach to the upper at the bite line. In some aspects, the chassis includes the edge portion, so that when the plate and the chassis are operably coupled, the edge portion is disposed about an outer perimeter of the plate.

In some aspects, the chassis can include a hydrogel material. In some aspects, the hydrogel material may be coated on a target surface of the chassis. In some aspects, the chassis can include an elastomeric material containing a cured rubber and a hydrogel material, wherein in the elastomeric material, the hydrogel material is distributed throughout the cured rubber, and at least a portion of the hydrogel material present in the elastomeric material is physically entrapped by the cured rubber.

In some aspects, the traction elements are made from the same or nearly the same resin composition as the plate, or as edge portion. In other aspects, the traction elements are made from a third resin that is different from the first polyolefin resin and the second resin. In some aspects, the sole structure includes a chassis and the chassis is made from the second resin or the third resin. The third resin can include a polystyrene, a polyethylene, an ethylene-α-olefin copolymer, an ethylene-propylene rubber (EPDM), a polybutene, a polyisobutylene, a poly-4-methylpent-1-ene, a polyisoprene, a polybutadiene, an ethylene-methacrylic acid copolymer, an olefin elastomer, a copolymer thereof, or a blend or mixture thereof. In some aspects, the third resin includes about 20 percent, about 10 percent, or less of a polyolefin. The third resin can include about 20 percent, about 10 percent, or less of polypropylene. The third resin can include an ethylene-propylene rubber (EPDM) dispersed in a polypropylene. The third resin can include a block copolymer comprising a polystyrene block. The block copolymer comprises can be, for example. a copolymer of styrene and one or both of ethylene and butylene. In general, the third resin can be any resin that is compatible with the polyolefin resin and that has the necessary or desired durability and mechanical properties.

In particular, the third resin (e.g. a polystyrene, a polyethylene, an ethylene-α-olefin copolymer, an ethylene-propylene rubber (EPDM), a polybutene, a polyisobutylene, a poly-4-methylpent-1-ene, a polyisoprene, a polybutadiene, an ethylene-methacrylic acid copolymer, an olefin elastomer, a copolymer thereof, or a blend or mixture thereof) have been found to bond well to the resin compositions of the present disclosure.

Additionally, third resin containing an ethylene-propylene rubber (EPDM) dispersed in a polypropylene, or containing a block copolymer having a polystyrene block; and wherein the block copolymer includes a copolymer of styrene and one or both of ethylene and butylene, have been found to be particularly useful in ground-contacting portions of traction elements, as these compositions both bond well to the resin compositions of the present disclosure, and can provide an even higher level of abrasion-resistance than the resin compositions of the present disclosure, which may be desired in the ground-contacting portions of traction elements.

In some aspects, it can be beneficial to include a clarifying agent in the plate (in the polyolefin resin), the edge portion, and/or, when a chassis is present, in the chassis. The clarifying agent can allow for clear visibility of a textile through the plate. The clarifying agent can be present in any suitable amount to provide sufficient optical clarity of the final plate or sole structure. In some aspects, the clarifying agent is present in an amount from about 0.5 percent by weight to about 5 percent by weight or about 1.5 percent by weight to about 2.5 percent by weight based upon a total weight of the polyolefin resin. The clarifying agent can include those selected from the group of substituted or unsubstituted dibenzylidene sorbitol, 1,3-O-2,4-bis(3,4-dimethylbenzylidene) sorbitol, 1,2,3-trideoxy-4,6:5,7-bis-O-[(4-propylphenyl)methylene], and a derivative thereof. The clarifying agent can include an acetal compound that is the condensation product of a polyhydric alcohol and an aromatic aldehyde. The polyhydric alcohol can include those selected from the group consisting of acyclic polyols such as xylitol and sorbitol and acyclic deoxy polyols such as 1,2,3-trideoxynonitol or 1,2,3-trideoxynon-1-enitol. The aromatic aldehyde can include those selected from the group consisting of benzaldehyde and substituted benzaldehydes.

Polyolefin Resin Compositions

According to the various articles and components, one or more of components of the sole component, including the plate, the edge portion, the rand, or a combination thereof, comprise a polyolefin resin composition, which is described here in more detail. Generally speaking, the polyolefin resin compositions described herein have a polyolefin copolymer and a polymeric resin modifier. The polyolefin resin composition comprises a polymeric component consisting of all the polymeric ingredients present in the composition. For example, the polymeric component includes one or more polyolefin and one or more polymeric resin modifiers. In some aspects, the polyolefin resin composition can further comprise one or more non-polymeric ingredients, such as, for example, colorants, fillers, processing aids, or any combination thereof. Two polyolefin resin compositions can have polymeric components with are substantially the same, in that both the polymeric components consist of substantially the same types of polymers in substantially the same concentrations. Two polyolefin resin compositions can have substantially similar polymeric components, in that both the polymeric components consist of substantially the same types of polymers but in substantially different concentrations (e.g., concentrations which differ by at least 2 weight percent). In both cases, the non-polymeric materials present in each of the polyolefin resin compositions may differ from each other. For example, the first of two polyolefin resin compositions sharing substantially the same polymeric components or substantially similar polymeric components may include a first pigment, and the second of the two polyolefin resin compositions may include a second pigment which is different from the first pigment and which is not present in the first polyolefin resin composition, or which is present in different concentrations in the first and second polyolefin resin compositions.

The disclosed polyolefin resin compositions can include any of a variety of polyolefin copolymers having the necessary or desired features. The copolymers can be alternating copolymers or random copolymers or block copolymers or graft copolymers. In some aspects, the copolymers are random copolymers. In some aspects, the copolymer includes a plurality of repeat units, with each of the plurality of repeat units individually derived from an alkene monomer having about 1 to about 6 carbon atoms. In other aspects, the copolymer includes a plurality of repeat units, with each of the plurality of repeat units individually derived from a monomer selected from the group consisting of ethylene, propylene, 4-methyl-1-pentene, 1-butene, 1-octene, and a combination thereof. In some aspects, the polyolefin copolymer includes a plurality of repeat units each individually selected from Formula 1A-1D. In some aspects, the polyolefin copolymer includes a first plurality of repeat units having a structure according to Formula 1A, and a second plurality of repeat units having a structure selected from Formula 1B-1D.

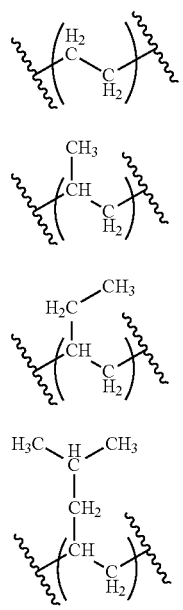

Formula 1A

Formula 1B

Formula 1C

Formula 1D

In some aspects, the polyolefin copolymer includes a plurality of repeat units each individually having a structure according to Formula 2

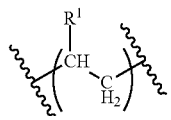

Formula 2 where $R^1$ is a hydrogen or a substituted or unsubstituted, linear or branched, $C_1$-$C_{12}$ alkyl. $C_1$-$C_6$ alkyl, $C_1$-$C_3$ alkyl, $C_1$-$C_{12}$ heteroalkyl, $C_1$-$C_6$ heteroalkyl, or $C_1$-$C_3$ heteroalkyl. In some aspects, each of the repeat units in the first plurality of repeat units has a structure according to Formula 1A above, and each of the repeat units in the second plurality of repeat units has a structure according to Formula 2 above.

In some aspects, the polyolefin copolymer is a random copolymer of a first plurality of repeat units and a second plurality of repeat units, and each repeat unit in the first plurality of repeat units is derived from ethylene and each repeat unit in the second plurality of repeat units is derived from a second olefin. In some aspects, the second olefin is an alkene monomer having about 1 to about 6 carbon atoms. In other aspects, the second olefin includes propylene, 4-methyl-1-pentene, 1-butene, or other linear or branched terminal alkenes having about 3 to 12 carbon atoms. In some aspects, the polyolefin copolymer contains about 80 percent to about 99 percent, about 85 percent to about 99 percent, about 90 percent to about 99 percent, or about 95 percent to about 99 percent polyolefin repeat units by weight based upon a total weight of the polyolefin copolymer. In some aspects, the polyolefin copolymer consists essentially of polyolefin repeat units. In some aspects, polymers in the polyolefin resin composition consist essentially of polyolefin copolymers.

The polyolefin copolymer can include ethylene, i.e. can include repeat units derived from ethylene such as those in Formula 1A. In some aspects, the polyolefin copolymer includes about 1 percent to about 5 percent, about 1 percent to about 3 percent, about 2 percent to about 3 percent, or about 2 percent to about 5 percent ethylene by weight based upon a total weight of the polyolefin copolymer.

The polyolefin resin compositions can be made without the need for polyurethanes and/or without the need for polyamides. For example, in some aspects the polyolefin copolymer is substantially free of polyurethanes. In some aspects, the polymer chains of the polyolefin copolymer are substantially free of urethane repeat units. In some aspects, the resin composition is substantially free of polymer chains including urethane repeat units. In some aspects, the polyolefin copolymer is substantially free of polyamide. In some aspects, the polymer chains of the polyolefin copolymer are substantially free of amide repeat units. In some aspects, the resin composition is substantially free of polymer chains including amide repeat units.

In some aspects, the polyolefin copolymer includes polypropylene or is a polypropylene copolymer. In some aspects, the polymeric component of the resin composition (i.e., the portion of the resin composition that is formed by all of the polymers present in the composition) consists essentially of polypropylene copolymers. In some aspects the resin composition is provided including a polypropylene copolymer, and an effective amount of a polymeric resin modifier, wherein the resin composition has an abrasion loss as described above, and wherein the effective amount of the polymeric resin modifier is an amount effective to allow the resin composition to pass a flex test pursuant to the Cold Ross Flex Test using the Plaque Sampling Procedure. In some aspects, the effective amount of the polymeric resin modifier is an amount effective to allow the resin composition to pass a flex test pursuant to the Cold Ross Flex Test using the Plaque Sampling Procedure without a significant change in an abrasion loss as compared to an abrasion loss of a second resin composition identical to the resin composition except without the polymeric resin modifier when measured pursuant to Abrasion Loss Test using the Neat Material Sampling Procedure.

The polypropylene copolymer can include a random copolymer, e.g. a random copolymer of ethylene and propylene. The polypropylene copolymer can include about 80 percent to about 99 percent, about 85 percent to about 99 percent, about 90 percent to about 99 percent, or about 95 percent to about 99 percent propylene repeat units by weight based upon a total weight of the polypropylene copolymer. In some aspects, the polypropylene copolymer includes about 1 percent to about 5 percent, about 1 percent to about 3 percent, about 2 percent to about 3 percent, or about 2 percent to about 5 percent ethylene by weight based upon a total weight of the polypropylene copolymer. In some aspects, the polypropylene copolymer is a random copolymer including about 2 percent to about 3 percent of a first plurality of repeat units by weight and about 80 percent to about 99 percent by weight of a second plurality of repeat units based upon a total weight of the polypropylene copolymer; wherein each of the repeat units in the first plurality of repeat units has a structure according to Formula 1A above and each of the repeat units in the second plurality of repeat units has a structure according to Formula 1B above.

The combination of abrasion resistance and flexural durability can be related to the overall crystallinity of the polyolefin resin composition. In some aspects, the resin composition has a percent crystallization (percent crystallization) of about 45 percent, about 40 percent, about 35 percent, about 30 percent, about 25 percent or less when measured according to the Crystallinity Test using the Neat Material Sampling Procedure. It has been found that adding the polymeric resin modifier to the resin composition in an amount which only slightly decreases the percent crystallinity of the resin composition as compared to an otherwise identical resin composition except without the polymeric resin modifier can result in resin compositions which are able to pass the Cold Ross Flex test while maintaining a relatively low abrasion loss. In some aspects, the polymeric resin modifier leads to a decrease in the percent crystallinity (percent crystallinity) of the resin composition. In some aspects, the resin composition has a percent crystallization (percent crystallization) that is at least 6, at least 5, at least 4, at least 3, or at least 2 percentage points less than a percent crystallization (percent crystallization) of the otherwise same resin composition except without the polymeric resin modifier when measured according to the Crystallinity Test using the Neat Material Sampling Procedure.

In some aspects, the effective amount of the polymeric resin modifier is about 5 percent to about 30 percent, about 5 percent to about 25 percent, about 5 percent to about 20 percent, about 5 percent to about 15 percent, about 5 percent to about 10 percent, about 10 percent to about 15 percent, about 10 percent to about 20 percent, about 10 percent to about 25 percent, or about 10 percent to about 30 percent by weight based upon a total weight of the resin composition. In some aspects, the effective amount of the polymeric resin modifier is about 20 percent, about 15 percent, about 10 percent, about 5 percent, or less by weight based upon a total weight of the resin composition.

The polymeric resin modifier can include any of a variety of exemplary resin modifiers described herein. In some aspects, the polymeric resin modifier is a metallocene catalyzed copolymer primarily composed of isotactic propylene repeat units with about 11 percent by weight-15 percent by weight of ethylene repeat units based on a total weight of metallocene catalyzed copolymer randomly distributed along the copolymer. In some aspects, the polymeric resin modifier includes about 10 percent to about 15 percent ethylene repeat units by weight based upon a total weight of the polymeric resin modifier. In some aspects, the polymeric resin modifier includes about 10 percent to about 15 percent repeat units according to Formula 1A above by weight based upon a total weight of the polymeric resin modifier. In some aspects, the polymeric resin modifier is a copolymer of repeat units according to Formula 1B above, and the repeat units according to Formula 1B are arranged in an isotactic stereochemical configuration.

In some aspects, the polymeric resin modifier is a copolymer containing isotactic propylene repeat units and ethylene repeat units. In some aspects, the polymeric resin modifier is a copolymer including a first plurality of repeat units and a second plurality of repeat units; wherein each of the repeat units in the first plurality of repeat units has a structure according to Formula 1A above and each of the repeat units in the second plurality of repeat units has a structure according to Formula 1B above, and wherein the repeat units in the second plurality of repeat units are arranged in an isotactic stereochemical configuration.

In some aspects, it can be beneficial to include a clarifying agent in the plate (in the polyolefin resin), in the edge portion, and/or, when a chassis is present, in the chassis. The clarifying agent can allow for clear visibility of a textile through the plate. The clarifying agent can be present in any suitable amount to provide sufficient optical clarity of the final plate or sole structure. In some aspects, the clarifying agent is present in an amount from about 0.5 percent by weight to about 5 percent by weight or about 1.5 percent by weight to about 2.5 percent by weight based upon a total weight of the polyolefin resin. The clarifying agent can include those selected from the group of substituted or unsubstituted dibenzylidene sorbitol, 1,3-O-2,4-bis(3,4-di-methylbenzylidene) sorbitol, 1,2,3-trideoxy-4,6:5,7-bis-O-[(4-propylphenyl)methylene], and a derivative thereof. The clarifying agent can include an acetal compound that is the condensation product of a polyhydric alcohol and an aromatic aldehyde. The polyhydric alcohol can include those selected from the group consisting of acyclic polyols such as xylitol and sorbitol and acyclic deoxy polyols such as 1,2,3-trideoxynonitol or 1,2,3-trideoxynon-1-enitol. The aromatic aldehyde can include those selected from the group consisting of benzaldehyde and substituted benzaldehydes.

Resin Composition—Plate

According to the various aspects, the disclosed plate compositionally comprises a first polyolefin composition. The first polyolefin resin composition can be any of a variety of polyolefin resin compositions described herein having the abrasion resistance and flexural durability suitable for use in the articles and components described herein. In some aspects, a first polyolefin resin composition includes a polyolefin copolymer, and an effective amount of a polymeric resin modifier. The effective amount of the resin modifier in the first polyolefin resin composition provides improved flexural durability while maintaining a suitable abrasion resistance. For example, in some aspects the effective amount of the polymeric resin modifier in the first polyolefin resin composition is an amount effective to allow the first polyolefin resin composition to pass a flex test pursuant to the Cold Ross Flex Test using the Plaque Sampling Procedure. At the same time, the first polyolefin resin composition can still have a suitable abrasion loss when measured pursuant to Abrasion Loss Test using the Neat Material Sampling Procedure. In some aspects, a comparable first polyolefin resin composition except without the polymeric resin modifier does not pass the cold Ross flex test using the Neat Material Sampling Procedure.

In some aspects, the effective amount of the polymeric resin modifier in the first polymeric resin composition is an amount that can provide improved flexural strength, toughness, creep resistance, or flexural durability without a significant loss in the abrasion resistance. In some aspects, the effective amount of the polymeric resin modifier is an amount effective to allow the first polyolefin resin composition to pass a flex test pursuant to the Cold Ross Flex Test using the Plaque Sampling Procedure without a significant change in an abrasion loss as compared to an abrasion loss of a second resin composition identical to the first polyolefin resin composition except without the polymeric resin modifier when measured pursuant to Abrasion Loss Test using the Neat Material Sampling Procedure. In other words, in some aspects, the effective amount of the polymeric resin modifier in the first polyolefin resin composition is an amount which is sufficient to produce a first polyolefin resin composition that does not stress whiten or crack during 150,000 flex cycles of the Cold Ross Flex test, while the abrasion resistance of the first polyolefin resin composition has not been significantly degraded and thus is not significantly different than the abrasion resistance of a comparable resin composition which is otherwise identical to the first polyolefin resin composition except that it is free of the polymeric resin modifier.

In some aspects, the first polyolefin resin composition has an abrasion loss of about 0.05 cubic centimeters ($cm^3$) to about 0.1 cubic centimeters ($cm^3$), about 0.07 cubic centimeters ($cm^3$) to about 0.1 cubic centimeters ($cm^3$), about 0.08 cubic centimeters ($cm^3$) to about 0.1 cubic centimeters ($cm^3$), or about 0.08 cubic centimeters ($cm^3$) to about 0.11 cubic centimeters ($cm^3$) pursuant to Abrasion Loss Test using the Neat Material Sampling Procedure. In some aspects, the first polyolefin resin composition has no significant change in the abrasion loss as compared to an abrasion loss of a second resin composition identical to the first polyolefin resin composition except without the polymeric resin modifier when measured pursuant to Abrasion Loss Test using the Neat Material Sampling Procedure. A change is abrasion loss, as used herein, is said to not be significant when the change is about 30 percent, about 25 percent, about 20 percent, about 15 percent, about 10 percent, or less when measured pursuant to Abrasion Loss Test using the Neat Material Sampling Procedure.

In some aspects, the effective amount of the polymeric resin modifier in the first polyolefin resin composition is about 5 percent to about 30 percent, about 5 percent to about 25 percent, about 5 percent to about 20 percent, about 5 percent to about 15 percent, about 5 percent to about 10 percent, about 10 percent to about 15 percent, about 10 percent to about 20 percent, about 10 percent to about 25 percent, or about 10 percent to about 30 percent by weight based upon a total weight of the first polyolefin resin composition. In some aspects, the effective amount of the polymeric resin modifier is about 20 percent, about 15 percent, about 10 percent, about 5 percent, or less by weight based upon a total weight of the first polyolefin resin composition.

Resin Composition—Edge Portion

According to various aspects, the edge portion comprises a second resin composition. The second resin composition is different from the first polyolefin resin composition and can be any of a variety of resin compositions that provide a higher degree of flexibility than the plate.

In some aspects, the second resin can be any of a variety of resin compositions providing necessary or desired properties to the edge portion. In some aspects, the edge portion has a lower flexural modulus than the plate. For example, in some aspects the edge portion has a flexural modulus that is at least 10 percent, or at least 15 percent, or at least 20 percent or at least 25 percent, or at least 30 percent or at least 35 percent lower than a flexural modulus of the plate. In some aspects, the edge portion has a lower Durometer hardness than the plate. For example, in some aspects, the edge portion has a Durometer hardness that is at least 10 percent, or at least 15 percent or at least 20 percent or at least 25 percent, or at least 30 percent or at least 35 percent lower than a Durometer hardness of the plate In some aspects, the second resin is any material that is compatible with one or more materials in the sole structure. In some aspects, the second resin is compatible with one or more materials in the article of footwear. For example, in an aspect, the second resin of the edge portion can be bonded to an upper using a conventional water-borne polyurethane shoe adhesive. In some aspects, the second resin is any material that can be any material that has a bonding score which is at least 20 percent greater, or at least 25 percent greater, or at least 30 percent greater than the bonding score of the first polyolefin resin when bonded to the material of the upper.

In some aspects, the second resin is a second polyolefin resin composition as described generally above. The second polyolefin resin composition can include a second polyolefin copolymer, and an effective amount of a polymeric resin modifier. The second polyolefin copolymer can comprise any of the exemplary polyolefin copolymers described herein. The second polyolefin copolymer may be the same as or different than the first polyolefin copolymer. The polymeric resin modifier of the second polyolefin composition can include any of the exemplary resin modifiers described herein. For the edge portion, the effective amount of the resin modifier is that which provides greater flexibility or lower rigidity as compared to the first polyolefin resin composition. Flexural modulus is an example of a measure of flexibility. Durometer hardness is an example of rigidity.

In some aspects, the second resin comprises a second polyolefin resin composition that is the same or substantially the same as the first polyolefin resin composition, except that it has a greater amount of polymeric resin modifier.

In some aspects, the effective amount of the polymeric resin modifier in the second polyolefin composition is at least 2 weight percent greater than the amount of the polymeric resin modifier in the first polyolefin composition. The effective amount of the polymeric resin modifier in the second polyolefin composition can be at least 5 weight percent, or at least 10 weight percent, or at least 15 weight percent greater than the amount of the polymeric resin modifier in the first polyolefin composition, based on a total weight of each composition. For example, the effective amount of the polymeric resin modifier in the second polyolefin composition is at least 5 weight percent, or at least 10 weight percent, or at least 20 weight percent, or at least 30 weight percent. The effective amount of the polymeric resin modifier in the second polyolefin composition can range from about 5 weight percent to about 50 weight percent, about 5 weight percent to about 40 weight percent, about 5 weight percent to about 30 weight percent, about 5 weight percent to about 20 weight percent, about 5 weight percent to about 15 weight percent, about 10 weight percent to about 30 weight percent, about 10 weight percent to about 25 weight percent, about 10 weight percent to about 20 weight percent, or about 10 weight percent to about 15 weight percent, based upon a total weight of the second resin composition.

In some aspects, the sole structure includes one or more traction elements, and the one or more traction elements include the second resin composition. In some aspects, the sole structure includes a chassis and the chassis includes the second resin.

In some aspects, the second resin can include a polystyrene, a polyethylene, an ethylene-α-olefin copolymer, an ethylene-propylene rubber (EPDM), a polybutene, a polyisobutylene, a poly-4-methylpent-1-ene, a polyisoprene, a polybutadiene, an ethylene-methacrylic acid copolymer, an olefin elastomer, a copolymer thereof, or a blend or mixture thereof. In some aspects, the second resin includes about 20 percent, about 10 percent, or less of a polyolefin. The second resin can include about 20 percent, about 10 percent, or less of polypropylene. The second resin can include an ethylene-propylene rubber (EPDM) dispersed in a polypropylene. The second resin can include a block copolymer comprising a polystyrene block. The block copolymer comprises can be, for example. a copolymer of styrene and one or both of ethylene and butylene. In general, the second resin can be any resin that is compatible with the polyolefin resin and that has the appropriate durability and mechanical properties.

In particular, the second resin (e.g. a polystyrene, a polyethylene, an ethylene-α-olefin copolymer, an ethylene-propylene rubber (EPDM), a polybutene, a polyisobutylene, a poly-4-methylpent-1-ene, a polyisoprene, a polybutadiene, an ethylene-methacrylic acid copolymer, an olefin elastomer, a copolymer thereof, or a blend or mixture thereof) have been found to bond well to the resin compositions of the present disclosure.

Rand Polymeric Material

According to various aspects, the optional rand comprises a rand polymeric material. The rand polymeric material can comprise a resin composition that is the same or different from the first polyolefin resin composition. The rand polymeric material can be any of a variety of polymeric materials that provide a desired property to the article of footwear, e.g., increased abrasion resistance. In some aspects, the rand polymeric material is any material that is compatible with one or more materials in the article of footwear. For example, in an aspect, the rand polymeric material can be bonded to an upper using a conventional water-borne polyurethane shoe adhesive.

In some aspects, the rand polymeric material is a polyolefin resin composition as described generally herein. The polyolefin resin composition can include a polyolefin copolymer, and an effective amount of a polymeric resin modifier. The polyolefin copolymer can comprise any of the exemplary polyolefin compositions described herein. The polyolefin copolymer may be the same as or different than the first polyolefin copolymer. In some aspects, the rand polymeric material can include a polypropylene, polystyrene, a polyethylene, an ethylene-α-olefin copolymer, an ethylene-propylene rubber (EPDM), a polybutene, a polyisobutylene, a poly-4-methylpent-1-ene, a polyisoprene, a polybutadiene, an ethylene-methacrylic acid copolymer, an olefin elastomer, a copolymer thereof, or a blend or mixture thereof.

In some aspects, the rand polymeric material is an elastomeric material. In some aspects, the rand polymeric material is a foamed material.

Hydrogel Materials

In an aspect, the hydrogel material comprises a polyurethane hydrogel. The hydrogel material can comprise a polyamide hydrogel, a polyurea hydrogel, a polyester hydrogel, a polycarbonate hydrogel, a polyetheramide hydrogel, a hydrogel formed of addition polymers of ethylenically unsaturated monomers, copolymers thereof (e.g., co-polyesters, co-polyethers, co-polyamides, co-polyurethanes, co-polyolefins), and combinations thereof. Additional details are provided herein.

The term "externally facing" as used in "externally facing layer" refers to the position the element is intended to be in when the element is present in an article during normal use. If the article is footwear, the element is positioned toward the ground during normal use by a wearer when in a standing position, and thus can contact the ground including unpaved surfaces when the footwear is used in a conventional manner, such as standing, walking or running on an unpaved surface. In other words, even though the element may not necessarily be facing the ground during various steps of manufacturing or shipping, if the element is intended to face the ground during normal use by a wearer, the element is understood to be externally-facing or more specifically for an article of footwear, ground-facing. In some circumstances, due to the presence of elements such as traction elements, the externally facing (e.g., ground-facing) surface can be positioned toward the ground during conventional use but may not necessarily come into contact the ground. For example, on hard ground or paved surfaces, the terminal ends of traction elements on the outsole may directly contact the ground, while portions of the outsole located between the traction elements do not. As described in this example, the portions of the outsole located between the traction elements are considered to be externally facing (e.g., ground-facing) even though they may not directly contact the ground in all circumstances.

It has been found the hydrogel material and articles incorporating the hydrogel material (e.g. footwear) can prevent or reduce the accumulation of soil on the externally-facing layer of the material during wear on unpaved surfaces. As used herein, the term "soil" can include any of a variety of materials commonly present on a ground or playing surface and which might otherwise adhere to an outsole or exposed midsole of a footwear article. Soil can include inorganic materials such as mud, sand, dirt, and gravel; organic matter such as grass, turf, leaves, other vegetation, and excrement; and combinations of inorganic and organic materials such as clay. Additionally, soil can include other materials such as pulverized rubber which may be present on or in an unpaved surface.

While not wishing to be bound by theory, it is believed that the hydrogel material in accordance with the present disclosure, when sufficiently wet with water (including water containing dissolved, dispersed or otherwise suspended materials) can provide compressive compliance and/or expulsion of uptaken water. In particular, it is believed that the compressive compliance of the wet hydrogel material, the expulsion of liquid from the wet material, or both in combination, can disrupt the adhesion of soil on or at the outsole, or the cohesion of the particles to each other, or can disrupt both the adhesion and cohesion. This disruption in the adhesion and/or cohesion of soil is believed to be a responsible mechanism for preventing (or otherwise reducing) the soil from accumulating on the footwear outsole (due to the presence of the wet material).

This disruption in the adhesion and/or cohesion of soil is believed to be a responsible mechanism for preventing (or otherwise reducing) the soil from accumulating on the footwear outsole (due to the presence of the hydrogel material). As can be appreciated, preventing soil from accumulating on the bottom of footwear can improve the performance of traction elements present on the outsole during wear on unpaved surfaces, can prevent the footwear from gaining weight due to accumulated soil during wear, can preserve ball handling performance of the footwear, and thus can provide significant benefits to wearer as compared to an article of footwear without the material present on the outsole.

In aspects where the hydrogel material (e.g., layered material) swells, the swelling of the material can be observed as an increase in material thickness from the dry-state thickness of the material, through a range of intermediate-state thicknesses as additional water is absorbed, and finally to a saturated-state thickness material, which is an average thickness of the material when fully saturated with water. For example, the saturated-state thickness for the fully saturated material can be greater than 150 percent, greater than 200 percent, greater than 250 percent, greater than 300 percent, greater than 350 percent, greater than 400 percent, or greater than 500 percent, of the dry-state thickness for the same material (e.g., the hydrogel material), as characterized by the Swelling Capacity Test. In some aspects, the saturated-state thickness for the fully saturated material can be about 150 percent to 500 percent, about 150 percent to 400 percent, about 150 percent to 300 percent, or about 200 percent to 300 percent of the dry-state thickness for the same material. Examples of suitable average thicknesses for the material in a wet state (referred to as a saturated-state thickness) can be about 0.2 millimeters to 10 millimeters, about 0.2 millimeters to 5 millimeters, about 0.2 millimeters to 2 millimeters, about 0.25 millimeters to 2 millimeters, or about 0.5 millimeters to 1 millimeter.

In particular aspects, the hydrogel material or layered material in neat form can have an increase in thickness at 1 hour of about 35 percent to 400 percent, about 50 percent to 300 percent, or about 100 percent to 200 percent, as characterized by the Swelling Capacity Test. In some further embodiments, the material in neat form can have an increase in thickness at 24 hours of about 45 percent to 500 percent, about 100 percent to 400 percent, or about 150 percent to 300 percent. Correspondingly, the outsole film in neat form can have an increase in film volume at 1 hour of about 50 percent to 500 percent, about 75 percent to 400 percent, or about 100 percent to 300 percent.

In particular aspects, the hydrogel material can quickly take up water that is in contact with the material. For instance, the hydrogel material can take up water from mud and wet grass, such as during a warmup period prior to a competitive match. Alternatively (or additionally), the hydrogel material can be pre-conditioned with water so that the material is partially or fully saturated, such as by spraying or soaking the material with water prior to use.

In particular aspects, the hydrogel material can exhibit an overall water uptake capacity of about 25 percent to 225 percent as measured in the Water Uptake Capacity Test over a soaking time of 24 hours using the Component Sampling Procedure, as will be defined below. Alternatively, the overall water uptake capacity exhibited by the hydrogel material is in the range of about 30 percent to about 200 percent; alternatively, about 50 percent to about 150 percent; alternatively, about 75 percent to about 125 percent. For the purpose of this disclosure, the term "overall water uptake capacity" is used to represent the amount of water by weight taken up by the hydrogel material as a percentage by weight of dry hydrogel material. The procedure for measuring overall water uptake capacity includes measurement of the "dry" weight of the hydrogel material, immersion of the hydrogel material in water at ambient temperature (~23 degrees Celsius) for a predetermined amount of time, followed by re-measurement of the weight of the hydrogel material when "wet". The procedure for measuring the overall weight uptake capacity according to the Water Uptake Capacity Test using the Component Sampling Procedure is described below.

In an aspect, the hydrogel material can also be characterized by a water uptake rate of 10 $g/m^2/\sqrt{min}$ to 120 $g/m^2/\sqrt{min}$ as measured in the Water Uptake Rate Test using the Neat Material Sampling Procedure. The water uptake rate is defined as the weight (in grams) of water absorbed per square meter ($m^2$) of the elastomeric material over the square root of the soaking time ($\sqrt{min}$). Alternatively, the water uptake rate ranges from about 12 $g/m^2/\sqrt{min}$ to about 100 $g/m^2/\sqrt{min}$; alternatively, from about 25 $g/m^2/\sqrt{min}$ to about 90 $g/m^2/\sqrt{min}$; alternatively, up to about 60 $g/m^2/\sqrt{min}$.

In an aspect, the overall water uptake capacity and the water uptake rate can be dependent upon the amount of the hydrogel material that is present in the material (e.g., layered material). The hydrogel material can be characterized by a water uptake capacity of 50 percent to 2000 percent as measured according to the Water Uptake Capacity Test using the Neat Material Sampling Procedure. In this case, the water uptake capacity of the hydrogel material is determined based on the amount of water by weight taken up by the hydrogel material as a percentage by weight of dry hydrogel material. Alternatively, the water uptake capacity exhibited by the hydrogel material is in the range of about 100 percent to about 1500 percent; alternatively, in the range of about 300 percent to about 1200 percent.

As also discussed above, in some aspects, the surface of the hydrogel material (e.g., layered material) preferably exhibits hydrophilic properties. The hydrophilic properties of the layered material surface can be characterized by determining the static sessile drop contact angle of the layered material's surface. Accordingly, in some examples, the material's surface in a dry state has a static sessile drop contact angle (or dry-state contact angle) of less than 105°, or less than 95°, less than 85°, as characterized by the Contact Angle Test. The Contact Angle Test can be conducted on a sample obtained in accordance with the Component Sampling Procedure or the Neat Material Sampling Procedure. In some further examples, the hydrogel material in a dry state has a static sessile drop contact angle ranging from 60° to 100°, from 70° to 100°, or from 65° to 95°.

In other examples, the surface of the hydrogel material (e.g., layered material) in a wet state has a static sessile drop contact angle (or wet-state contact angle) of less than 90°, less than 80°, less than 70°, or less than 60°. In some further examples, the surface in a wet state has a static sessile drop contact angle ranging from 45° to 75°. In some cases, the dry-state static sessile drop contact angle of the surface is greater than the wet-state static sessile drop contact angle of the surface by at least 10°, at least 15°, or at least 20°, for example from 10° to 40°, from 10° to 30°, or from 10° to 20°.

The surface of the hydrogel material (e.g., layered material), including the surface of an article can also exhibit a low coefficient of friction when the material is wet. Examples of suitable coefficients of friction for the hydrogel material in a dry state (or dry-state coefficient of friction) are less than 1.5, for instance ranging from 0.3 to 1.3, or from 0.3 to 0.7, as characterized by the Coefficient of Friction Test. The Coefficient of Friction Test can be conducted on a sample obtained in accordance with the Component Sampling Procedure, or the Neat material Sampling Procedure. Examples of suitable coefficients of friction for the hydrogel material in a wet state (or wet-state coefficient of friction) are less than 0.8 or less than 0.6, for instance ranging from 0.05 to 0.6, from 0.1 to 0.6, or from 0.3 to 0.5. Furthermore, the hydrogel material can exhibit a reduction in its coefficient of friction from its dry state to its wet state, such as a reduction ranging from 15 percent to 90 percent, or from 50 percent to 80 percent. In some cases, the dry-state coefficient of friction is greater than the wet-state coefficient of friction for the material, for example being higher by a value of at least 0.3 or 0.5, such as 0.3 to 1.2 or 0.5 to 1.

Furthermore, the compliance of the hydrogel material, including an article comprising the material, can be characterized by based on the hydrogel material's storage modulus in the dry state (when equilibrated at 0 percent relative humidity (RH)), and in a partially wet state (e.g., when equilibrated at 50 percent RH or at 90 percent RH), and by reductions in its storage modulus between the dry and wet states. In particular, the hydrogel material can have a reduction in storage modulus ($\Delta E'$) from the dry state relative to the wet state. A reduction in storage modulus as the water concentration in the hydrogel-containing material increases corresponds to an increase in compliance, because less stress is required for a given strain/deformation.

In some aspects, the hydrogel material exhibits a reduction in the storage modulus from its dry state to its wet state (50 percent RH) of more than 20 percent, more than 40 percent, more than 60 percent, more than 75 percent, more than 90 percent, or more than 99 percent, relative to the storage modulus in the dry state, and as characterized by the Storage Modulus Test with the Neat Material Sampling Process.

In some further aspects, the dry-state storage modulus of the hydrogel material is greater than its wet-state (50 percent RH) storage modulus by more than 25 megaPascals (MPa), by more than 50 megapascals, by more than 100 megapascals, by more than 300 megapascals, or by more than 500 megapascals, for example ranging from 25 megapascals to 800 megapascals, from 50 megapascals to 800 megapascals, from 100 megapascals to 800 megapascals, from 200 megapascals to 800 megapascals, from 400 megapascals to 800 megapascals, from 25 megapascals to 200 megapascals, from 25 megapascals to 100 megapascals, or from 50 megapascals to 200 megapascals. Additionally, the dry-state storage modulus can range from 40 megapascals to 800 megapascals, from 100 megapascals to 600 megapascals, or from 200 megapascals to 400 megapascals, as characterized by the Storage Modulus Test. Additionally, the wet-state storage modulus can range from 0.003 megapascals to 100 megapascals, from 1 megapascals to 60 megapascals, or from 20 megapascals to 40 megapascals.

In other aspects, the hydrogel material exhibits a reduction in the storage modulus from its dry state to its wet state (90 percent RH) of more than 20 percent, more than 40 percent, more than 60 percent, more than 75 percent, more than 90 percent, or more than 99 percent, relative to the storage modulus in the dry state, and as characterized by the Storage Modulus Test with the Neat Material Sampling Procedure. In further aspects, the dry-state storage modulus of the hydrogel material is greater than its wet-state (90 percent RH) storage modulus by more than 25 megaPascals (MPa), by more than 50 megapascals, by more than 100 megapascals, by more than 300 megapascals, or by more than 500 megapascals, for example ranging from 25 megapascals to 800 megapascals, from 50 megapascals to 800 megapascals, from 100 megapascals to 800 megapascals, from 200 megapascals to 800 megapascals, from 400 megapascals to 800 megapascals, from 25 megapascals to 200 megapascals, from 25 megapascals to 100 megapascals, or from 50 megapascals to 200 megapascals. Additionally, the dry-state storage modulus can range from 40 megapascals to 800 megapascals, from 100 megapascals to 600 megapascals, or from 200 megapascals to 400 megapascals, as characterized by the Storage Modulus Test. Additionally, the wet-state storage modulus can range from 0.003 megapascals to 100 megapascals, from 1 megapascals to 60 megapascals, or from 20 megapascals to 40 megapascals.

In addition to a reduction in storage modulus, the hydrogel material can also exhibit a reduction in its glass transition temperature from the dry state (when equilibrated at 0 percent relative humidity (RH) to the wet state (when equilibrated at 90 percent RH). While not wishing to be bound by theory, it is believed that the water taken up by the hydrogel material plasticizes the material, which reduces its storage modulus and its glass transition temperature, rendering the hydrogel material more compliant (e.g., compressible, expandable, and stretchable).

In some aspects, the hydrogel material can exhibit a reduction in glass transition temperature ($\Delta T_g$) from its dry-state (0 percent RH) glass transition temperature to its wet-state glass transition (90 percent RH) temperature of more than a 5 degrees Celsius difference, more than a 6 degrees Celsius difference, more than a 10 degrees Celsius difference, or more than a 15 degrees Celsius difference, as characterized by the Glass Transition Temperature Test with the Neat Material Sampling Procedure. For instance, the reduction in glass transition temperature ($\Delta T_g$) can range from more than a 5 degrees Celsius difference to a 40 degrees Celsius difference, from more than a 6 degrees Celsius difference to a 50 degrees Celsius difference, form more than a 10 degrees Celsius difference to a 30 degrees Celsius difference, from more than a 30 degrees Celsius difference to a 45 degrees Celsius difference, or from a 15 degrees Celsius difference to a 20 degrees Celsius difference. The hydrogel material can also exhibit a dry glass transition temperature ranging from −40 degrees Celsius to −80 degrees Celsius, or from −40 degrees Celsius to −60 degrees Celsius.

Alternatively (or additionally), the reduction in glass transition temperature ($\Delta T_g$) can range from a 5 degrees Celsius difference to a 40 degrees Celsius difference, form a 10 degrees Celsius difference to a 30 degrees Celsius difference, or from a 15 degrees Celsius difference to a 20 degrees Celsius difference. The hydrogel material can also exhibit a dry glass transition temperature ranging from −40 degrees Celsius to −80 degrees Celsius, or from −40 degrees Celsius to −60 degrees Celsius.

The total amount of water that the hydrogel material can take up depends on a variety of factors, such as its composition (e.g., its hydrophilicity), its cross-linking density, its thickness, and the like. The water uptake capacity and the water uptake rate of the hydrogel material are dependent on the size and shape of its geometry, and are typically based on the same factors. Conversely, the water uptake rate is transient and can be defined kinetically. The three primary factors for water uptake rate for hydrogel material present given part geometry include time, thickness, and the exposed surface area available for taking up water.

Even though the hydrogel material can swell as it takes up water and transitions between the different material states with corresponding thicknesses, the saturated-state thickness of the hydrogel material preferably remains less than the length of the traction element. This selection of the hydrogel material and its corresponding dry and saturated thicknesses ensures that the traction elements can continue to provide ground-engaging traction during use of the footwear, even when the hydrogel material is in a fully swollen state. For example, the average clearance difference between the lengths of the traction elements and the saturated-state thickness of the hydrogel material is desirably at least 8 millimeters. For example, the average clearance distance can be at least 9 millimeters, 10 millimeters, or more.

As also mentioned above, in addition to swelling, the compliance of the hydrogel material can also increase from being relatively stiff (i.e., dry-state) to being increasingly stretchable, compressible, and malleable (i.e., wet-state). The increased compliance accordingly can allow the hydrogel material to readily compress under an applied pressure (e.g., during a foot strike on the ground), and in some aspects, to quickly expel at least a portion of its retained water (depending on the extent of compression). While not wishing to be bound by theory, it is believed that this compressive compliance alone, water expulsion alone, or both in combination can disrupt the adhesion and/or cohesion of soil, which prevents or otherwise reduces the accumulation of soil.

In addition to quickly expelling water, in particular examples, the compressed hydrogel material is capable of quickly re-absorbing water when the compression is released (e.g., liftoff from a foot strike during normal use). As such, during use in a wet or damp environment (e.g., a muddy or wet ground), the hydrogel material can dynamically expel and repeatedly take up water over successive foot strikes, particularly from a wet surface. As such, the hydrogel material can continue to prevent soil accumulation over extended periods of time (e.g., during an entire competitive match), particularly when there is ground water available for re-uptake.

In addition to being effective at preventing soil accumulation, the hydrogel material has also been found to be sufficiently durable for its intended use on the ground-contacting side of the article of footwear. In various aspects, the useful life of the hydrogel material (and footwear containing it) is at least 10 hours, 20 hours, 50 hours, 100 hours, 120 hours, or 150 hours of wear.

As used herein, the terms "take up", "taking up", "uptake", "uptaking", and the like refer to the drawing of a liquid (e.g., water) from an external source into the hydrogel material, such as by absorption, adsorption, or both. Furthermore, as briefly mentioned above, the term "water" refers to an aqueous liquid that can be pure water, or can be an aqueous carrier with lesser amounts of dissolved, dispersed or otherwise suspended materials (e.g., particulates, other liquids, and the like).

As described herein, the externally facing layer includes the first material. In an aspect, the first material comprises a hydrogel material. The hydrogel material can comprise a polymeric hydrogel. In aspect, the polymeric hydrogel can comprise or consist essentially of a polyurethane hydrogel. Polyurethane hydrogels are prepared from one or more diisocyanate and one or more hydrophilic diol. The polymer may also include a hydrophobic diol in addition to the hydrophilic diol. The polymerization is normally carried out using roughly an equivalent amount of the diol and diisocyanate. Examples of hydrophilic diols are polyethylene glycols or copolymers of ethylene glycol and propylene glycol. The diisocyanate can be selected from a wide variety of aliphatic or aromatic diisocyanates. The hydrophobicity of the resulting polymer is determined by the amount and type of the hydrophilic diols, the type and amount of the hydrophobic diols, and the type and amount of the diisocyanates. Additional details regarding polyurethane are provided herein.

In an aspect, the polymeric hydrogel can comprise or consist essentially of a polyurea hydrogel. Polyurea hydrogels are prepared from one or more diisocyanate and one or more hydrophilic diamine. The polymer may also include a hydrophobic diamine in addition to the hydrophilic diamines. The polymerization is normally carried out using roughly an equivalent amount of the diamine and diisocyanate. Typical hydrophilic diamines are amine-terminated polyethylene oxides and amine-terminated copolymers of polyethylene oxide/polypropylene. Examples are Jeffamine® diamines sold by Huntsman (The Woodlands, Tex., USA). The diisocyanate can be selected from a wide variety of aliphatic or aromatic diisocyanates. The hydrophobicity of the resulting polymer is determined by the amount and type of the hydrophilic diamine, the type and amount of the hydrophobic amine, and the type and amount of the diisocyanate. Additional details regarding polyurea are provided herein.

In an aspect, the polymeric hydrogel can comprise or consist essentially of a polyester hydrogel. Polyester hydrogels can be prepared from dicarboxylic acids (or dicarboxylic acid derivatives) and diols where part or all of the diol is a hydrophilic diol. Examples of hydrophilic diols are polyethylene glycols or copolymers of ethylene glycol and propylene glycol. A second hydrophobic diol can also be used to control the polarity of the final polymer. One or more diacid can be used which can be either aromatic or aliphatic. Of particular interest are block polyesters prepared from hydrophilic diols and lactones of hydroxyacids. The lactone is polymerized on each end of the hydrophilic diol to produce a triblock polymer. In addition, these triblock segments can be linked together to produce a multiblock polymer by reaction with a dicarboxylic acid. Additional details regarding polyurea are provided herein.

In an aspect, the polymeric hydrogel can comprise or consist essentially of a polycarbonate hydrogel. Polycarbonates are typically prepared by reacting a diol with phosgene or a carbonate diester. A hydrophilic polycarbonate is produced when part or all of the diol is a hydrophilic diol. Examples of hydrophilic diols are hydroxyl terminated polyethers of ethylene glycol or polyethers of ethylene glycol with propylene glycol. A second hydrophobic diol can also be included to control the polarity of the final polymer. Additional details regarding polycarbonate are provided herein.

In an embodiment, the polymeric hydrogel can comprise or consist essentially of a polyetheramide hydrogel. Polyetheramides are prepared from dicarboxylic acids (or dicarboxylic acid derivatives) and polyether diamines (a polyether terminated on each end with an amino group). Hydrophilic amine-terminated polyethers produce hydrophilic polymers that will swell with water. Hydrophobic diamines can be used in conjunction with hydrophilic diamines to control the hydrophilicity of the final polymer. In addition, the type dicarboxylic acid segment can be selected to control the polarity of the polymer and the physical properties of the polymer. Typical hydrophilic diamines are amine-terminated polyethylene oxides and amine-terminated copolymers of polyethylene oxide/polypropylene. Examples are Jeffamine® diamines sold by Huntsman (The Woodlands, Tex., USA). Additional details regarding polyetheramide are provided herein.

In an aspect, the polymeric hydrogel can comprise or consist essentially of a hydrogel formed of addition polymers of ethylenically unsaturated monomers. The addition polymers of ethylenically unsaturated monomers can be random polymers. Polymers prepared by free radical polymerization of one of more hydrophilic ethylenically unsaturated monomer and one or more hydrophobic ethylenically unsaturated monomers. Examples of hydrophilic monomers are acrylic acid, methacrylic acid, 2-acrylamido-2-methylpropane sulphonic acid, vinyl sulphonic acid, sodium p-styrene sulfonate, [3-(methacryloylamino)propyl]trimethylammonium chloride, 2-hydroxyethyl methacrylate, acrylamide, N,N-dimethylacrylamide, 2-vinylpyrrolidone, (meth)acrylate esters of polyethylene glycol, and (meth)acrylate esters of polyethylene glycol monomethyl ether. Examples of hydrophobic monomers are (meth)acrylate esters of C1 to C4 alcohols, polystyrene, polystyrene methacrylate macromonomer and mono(meth)acrylate esters of siloxanes. The water uptake and physical characteristics can be tuned by selection of the monomer and the amounts of each monomer type. Additional details regarding ethylenically unsaturated monomers are provided herein.

The addition polymers of ethylenically unsaturated monomers can be comb polymers. Comb polymers are produced when one of the monomers is a macromer (an oligomer with an ethylenically unsaturated group one end). In one case the main chain is hydrophilic while the side chains are hydrophobic. Alternatively the comb backbone can be hydrophobic while the side chains are hydrophilic. An example is a backbone of a hydrophobic monomer such as styrene with the methacrylate monoester of polyethylene glycol.

The addition polymers of ethylenically unsaturated monomers can be block polymers. Block polymers of ethylenically unsaturated monomers can be prepared by methods such as anionic polymerization or controlled free radical polymerization. Hydrogels are produced when the polymer has both hydrophilic blocks and hydrophobic blocks. The polymer can be a diblock polymer (A-B) polymer, triblock polymer (A-B-A) or multiblock polymer. Triblock polymers with hydrophobic end blocks and a hydrophilic center block are most useful for this application. Block polymers can be prepared by other means as well. Partial hydrolysis of polyacrylonitrile polymers produces multiblock polymers with hydrophilic domains (hydrolyzed) separated by hydrophobic domains (unhydrolyzed) such that the partially hydrolyzed polymer acts as a hydrogel. The hydrolysis converts acrylonitrile units to hydrophilic acrylamide or acrylic acid units in a multiblock pattern.

The polymeric hydrogel can comprise or consist essentially of a hydrogel formed of copolymers. Copolymers combine two or more types of polymers within each polymer chain to achieve the desired set of properties. Of particular interest are polyurethane/polyurea copolymers, polyurethane/polyester copolymers, polyester/polycarbonate copolymers.

In some aspects, the hydrogel may be combined with an elastomeric material such as rubber. In an aspect, the hydrogel is provided as a coating on another material, such as an elastomeric material. In an aspect, the hydrogel is provided as a mixture or dispersion with an elastomeric material. In an aspect, a first elastomeric material includes a mixture of a first cured rubber and a first polymeric hydrogel. The first polymeric hydrogel can be a first polyurethane hydrogel. The first elastomeric material can comprise a first concentration of the first polymeric hydrogel of from about 30 weight percent to about 70 weight percent based on the total weight of the first elastomeric material. In some aspects, the first polymeric hydrogel is distributed throughout and entrapped by a first polymeric network including the first rubber.

In some aspects, an elastomeric material includes: a rubber; and a polymeric hydrogel; wherein, in the composition, the polymeric hydrogel is distributed throughout the rubber. The rubber can be an uncured rubber or cured rubber. In some examples, at least a portion of the polymeric hydrogel in the elastomeric material is entrapped by the cured rubber. In the elastomeric material, the polymeric hydrogel can be physically entrapped by the cured rubber. In the elastomeric material, the polymeric hydrogel can be chemically entrapped by the cured rubber through chemical bonds such as crosslinking bonds. In the elastomeric material, the polymeric hydrogel can be both physically entrapped by and chemically bonded to the cured rubber.

Now having described aspects of the hydrogel material, the elastomer material, the thermoplastic hot melt adhesive, and the tie layer, additional details are provided regarding the thermoplastic polymer. In aspects, thermoplastic polymer can include polymers of the same or different types of monomers (e.g., homopolymers and copolymers, including terpolymers). In certain aspects, the thermoplastic polymer can include different monomers randomly distributed in the polymer (e.g., a random co-polymer). The term "polymer" refers to a polymerized molecule having one or more monomer species that can be the same or different. When the monomer species are the same, the polymer can be termed homopolymer and when the monomers are different, the polymer can be referred to as a copolymer. The term "copolymer" is a polymer having two or more types of monomer species, and includes terpolymers (i.e., copolymers having three monomer species). In an aspect, the "monomer" can include different functional groups or segments, but for simplicity is generally referred to as a monomer.

For example, the thermoplastic polymer can be a polymer having repeating polymeric units of the same chemical structure (segments) which are relatively harder (hard segments), and repeating polymeric segments which are relatively softer (soft segments). In various aspects, the polymer has repeating hard segments and soft segments, physical crosslinks can be present within the segments or between the segments or both within and between the segments. Particular examples of hard segments include isocyanate segments. Particular examples of soft segments include an alkoxy group such as polyether segments and polyester segments. As used herein, the polymeric segment can be referred to as being a particular type of polymeric segment such as, for example, an isocyanate segment (e.g., diisocyanate segment), an alkoxy polyamide segment (e.g., a polyether segment, a polyester segment), and the like. It is understood that the chemical structure of the segment is derived from the described chemical structure. For example, an isocyanate segment is a polymerized unit including an isocyanate functional group. When referring to polymeric segments of a particular chemical structure, the polymer can contain up to 10 mol percent of segments of other chemical structures. For example, as used herein, a polyether segment is understood to include up to 10 mol percent of non-polyether segments.

In certain aspects, the thermoplastic polymer can be a thermoplastic polyurethane (also referred to as "TPU"). In aspects, the thermoplastic polyurethane can be a thermoplastic polyurethane polymer. In such aspects, the thermoplastic polyurethane polymer can include hard and soft segments. In aspects, the hard segments can comprise or consist of isocyanate segments (e.g., diisocyanate segments). In the same or alternative aspects, the soft segments can comprise or consist of alkoxy segments (e.g., polyether segments, or polyester segments, or a combination of polyether segments and polyester segments). In a particular aspect, the thermoplastic material can comprise or consist essentially of an elastomeric thermoplastic polyurethane having repeating hard segments and repeating soft segments.

Thermoplastic Polyurethanes

In aspects, one or more of the thermoplastic polyurethanes can be produced by polymerizing one or more isocyanates with one or more polyols to produce polymer chains having carbamate linkages (—N(CO)O—) as illustrated below in Formula 1, where the isocyanate(s) each preferably include two or more isocyanate (—NCO) groups per molecule, such as 2, 3, or 4 isocyanate groups per molecule (although, single-functional isocyanates can also be optionally included, e.g., as chain terminating units).

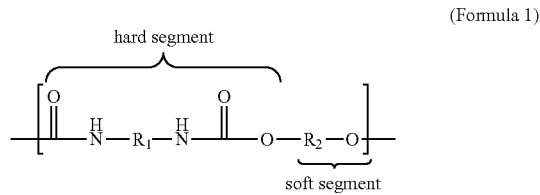
(Formula 1)

In these embodiments, each $R_1$ and $R_2$ independently is an aliphatic or aromatic segment. Optionally, each $R_2$ can be a hydrophilic segment.

Additionally, the isocyanates can also be chain extended with one or more chain extenders to bridge two or more isocyanates. This can produce polyurethane polymer chains as illustrated below in Formula 2, where $R_3$ includes the chain extender. As with each $R_1$ and $R_3$, each $R_3$ independently is an aliphatic or aromatic segment.

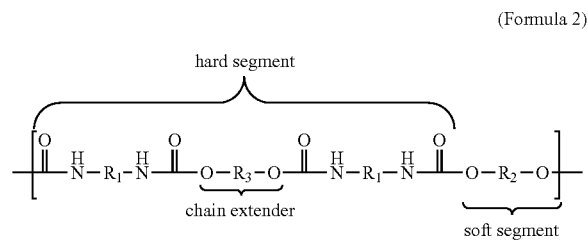
(Formula 2)

Each segment $R_1$, or the first segment, in Formulas 1 and 2 can independently include a linear or branched $C_{3-30}$ segment, based on the particular isocyanate(s) used, and can be aliphatic, aromatic, or include a combination of aliphatic portions(s) and aromatic portion(s). The term "aliphatic" refers to a saturated or unsaturated organic molecule that does not include a cyclically conjugated ring system having delocalized pi electrons. In comparison, the term "aromatic" refers to a cyclically conjugated ring system having delocalized pi electrons, which exhibits greater stability than a hypothetical ring system having localized pi electrons.

Each segment $R_1$ can be present in an amount of 5 percent to 85 percent by weight, from 5 percent to 70 percent by weight, or from 10 percent to 50 percent by weight, based on the total weight of the reactant monomers.

In aliphatic embodiments (from aliphatic isocyanate(s)), each segment $R_1$ can include a linear aliphatic group, a branched aliphatic group, a cycloaliphatic group, or combinations thereof. For instance, each segment $R_1$ can include a linear or branched $C_{3-20}$ alkanediyl segment (e.g., $C_{4-15}$ alkanediyl or $C_{6-10}$ alkanediyl), one or more $C_{3-8}$ cycloalkanediyl segments (e.g., cyclopropyl, cyclobutyl, cyclopentyl, cyclohexyl, cycloheptyl, or cyclooctyl), and combinations thereof.

Examples of suitable aliphatic diisocyanates for producing the polyurethane polymer chains include hexamethylene diisocyanate (HDI), isophorone diisocyanate (IPDI), butylenediisocyanate (BDI), bisisocyanatocyclohexylmethane (HMDI), 2,2,4-trimethylhexamethylene diisocyanate (TMDI), bisisocyanatomethylcyclohexane, bisisocyanatomethyltricyclodecane, norbornane diisocyanate (NDI), cyclohexane diisocyanate (CHDI), 4,4'-dicyclohexylmethane diisocyanate (H12MDI), diisocyanatododecane, lysine diisocyanate, and combinations thereof.

In an aspect, the diisocyanate segments can include aliphatic diisocyanate segments. In one aspect, a majority of the diisocyanate segments comprise the aliphatic diisocyanate segments. In an aspect, at least 90 percent of the diisocyanate segments are aliphatic diisocyanate segments. In an aspect, the diisocyanate segments consist essentially of aliphatic diisocyanate segments. In an aspect, the aliphatic diisocyanate segments are substantially (e.g., about 50 percent or more, about 60 percent or more, about 70 percent or more, about 80 percent or more, about 90 percent or more) linear aliphatic diisocyanate segments. In an aspect, at least 80 percent of the aliphatic diisocyanate segments are aliphatic diisocyanate segments that are free of side chains. In an aspect, the aliphatic diisocyanate segments include $C_2$-$C_{10}$ linear aliphatic diisocyanate segments.

In aromatic embodiments (from aromatic isocyanate(s)), each segment $R_1$ can include one or more aromatic groups, such as phenyl, naphthyl, tetrahydronaphthyl, phenanthrenyl, biphenylenyl, indanyl, indenyl, anthracenyl, and fluorenyl. Unless otherwise indicated, an aromatic group can be an unsubstituted aromatic group or a substituted aromatic group, and can also include heteroaromatic groups. "Heteroaromatic" refers to monocyclic or polycyclic (e.g., fused bicyclic and fused tricyclic) aromatic ring systems, where one to four ring atoms are selected from oxygen, nitrogen, or sulfur, and the remaining ring atoms are carbon, and where the ring system is joined to the remainder of the molecule by any of the ring atoms. Examples of suitable heteroaryl groups include pyridyl, pyrazinyl, pyrimidinyl, pyrrolyl, pyrazolyl, imidazolyl, thiazolyl, tetrazolyl, oxazolyl, isooxazolyl, thiadiazolyl, oxadiazolyl, furanyl, quinolinyl, isoquinolinyl, benzoxazolyl, benzimidazolyl, and benzothiazolyl.

Examples of suitable aromatic diisocyanates for producing the polyurethane polymer chains include toluene diisocyanate (TDI), TDI adducts with trimethyloylpropane (TMP), methylene diphenyl diisocyanate (MDI), xylene diisocyanate (XDI), tetramethylxylylene diisocyanate (TMXDI), hydrogenated xylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4,4'-diisocyanate (DDDI), 4,4'-dibenzyl diisocyanate (DBDI), 4-chloro-1,3-phenylene diisocyanate, and combinations thereof. In some embodiments, the polymer chains are substantially free of aromatic groups.

In particular aspects, the polyurethane polymer chains are produced from diisocynates including HMDI, TDI, MDI, $H_{12}$ aliphatics, and combinations thereof. For example, the low processing temperature polymeric composition of the present disclosure can comprise one or more polyurethane polymer chains are produced from diisocyanates including HMDI, TDI, MDI, $H_{12}$ aliphatics, and combinations thereof.

In certain aspects, polyurethane chains which are crosslinked (e.g., partially crosslinked polyurethane polymers which retain thermoplastic properties) or which can be crosslinked, can be used in accordance with the present disclosure. It is possible to produce crosslinked or crosslinkable polyurethane polymer chains using multi-functional isocyantes. Examples of suitable triisocyanates for producing the polyurethane polymer chains include TDI, HDI, and IPDI adducts with trimethyloylpropane (TMP), uretdiones (i.e., dimerized isocyanates), polymeric MDI, and combinations thereof.

Segment $R_3$ in Formula 2 can include a linear or branched $C_2$-$C_{10}$ segment, based on the particular chain extender polyol used, and can be, for example, aliphatic, aromatic, or polyether. Examples of suitable chain extender polyols for producing the polyurethane polymer chains include ethylene glycol, lower oligomers of ethylene glycol (e.g., diethylene glycol, triethylene glycol, and tetraethylene glycol), 1,2-propylene glycol, 1,3-propylene glycol, lower oligomers of propylene glycol (e.g., dipropylene glycol, tripropylene glycol, and tetrapropylene glycol), 1,4-butylene glycol, 2,3-butylene glycol, 1,6-hexanediol, 1,8-octanediol, neopentyl glycol, 1,4-cyclohexanedimethanol, 2-ethyl-1,6-hexanediol, 1-methyl-1,3-propanediol, 2-methyl-1,3-propanediol, di hydroxyalkylated aromatic compounds (e.g., bis(2-hydroxyethyl) ethers of hydroquinone and resorcinol, xylene-a,a-diols, bis(2-hydroxyethyl) ethers of xylene-a,a-diols, and combinations thereof.

Segment $R_2$ in Formula 1 and 2 can include a polyether group, a polyester group, a polycarbonate group, an aliphatic group, or an aromatic group. Each segment $R_2$ can be present in an amount of 5 percent to 85 percent by weight, from 5 percent to 70 percent by weight, or from 10 percent to 50 percent by weight, based on the total weight of the reactant monomers.

In some examples, at least one $R_2$ segment of the thermoplastic polyurethane includes a polyether segment (i.e., a segment having one or more ether groups). Suitable polyethers include, but are not limited to, polyethylene oxide (PEO), polypropylene oxide (PPO), polytetrahydrofuran (PTHF), polytetramethylene oxide (PTMOTMO), and combinations thereof. The term "alkyl" as used herein refers to straight chained and branched saturated hydrocarbon groups containing one to thirty carbon atoms, for example, one to twenty carbon atoms, or one to ten carbon atoms. The term $C_n$ means the alkyl group has "n" carbon atoms. For example, $C_4$ alkyl refers to an alkyl group that has 4 carbon atoms. $C_{1-7}$ alkyl refers to an alkyl group having a number of carbon atoms encompassing the entire range (i.e., 1 to 7 carbon atoms), as well as all subgroups (e.g., 1-6, 2-7, 1-5, 3-6, 1, 2, 3, 4, 5, 6, and 7 carbon atoms). Non-limiting examples of alkyl groups include, methyl, ethyl, n-propyl, isopropyl, n-butyl, sec-butyl (2-methylpropyl), t-butyl (1,1-dimethylethyl), 3,3-dimethylpentyl, and 2-ethylhexyl. Unless otherwise indicated, an alkyl group can be an unsubstituted alkyl group or a substituted alkyl group.

In some examples of the thermoplastic polyurethane, the at least one $R_2$ segment includes a polyester segment. The polyester segment can be derived from the polyesterification of one or more dihydric alcohols (e.g., ethylene glycol, 1,3-propylene glycol, 1,2-propylene glycol, 1,4-butanediol, 1,3-butanediol, 2-methylpentanediol-1,5,diethylene glycol, 1,5-pentanediol, 1,5-hexanediol, 1,2-dodecanediol, cyclohexanedimethanol, and combinations thereof) with one or more dicarboxylic acids (e.g., adipic acid, succinic acid, sebacic acid, suberic acid, methyladipic acid, glutaric acid, pimelic acid, azelaic acid, thiodipropionic acid and citraconic acid and combinations thereof). The polyester also can be derived from polycarbonate prepolymers, such as poly (hexamethylene carbonate) glycol, poly(propylene carbonate) glycol, poly(tetramethylene carbonate)glycol, and poly (nonanemethylene carbonate) glycol. Suitable polyesters can include, for example, polyethylene adipate (PEA), poly (1,4-butylene adipate), poly(tetramethylene adipate), poly (hexamethylene adipate), polycaprolactone, polyhexamethylene carbonate, poly(propylene carbonate), poly (tetramethylene carbonate), poly(nonanemethylene carbonate), and combinations thereof.

In various of the thermoplastic polyurethanes, at least one $R_2$ segment includes a polycarbonate segment. The polycarbonate segment can be derived from the reaction of one or more dihydric alcohols (e.g., ethylene glycol, 1,3-propylene glycol, 1,2-propylene glycol, 1,4-butanediol, 1,3-butanediol, 2-methylpentanediol-1,5, diethylene glycol, 1,5-pentanediol, 1,5-hexanediol, 1,2-dodecanediol, cyclohexanedimethanol, and combinations thereof) with ethylene carbonate.

In various examples, the aliphatic group is linear and can include, for example, a $C_{1-20}$ alkanediyl chain or a $C_{1-20}$ alkenylene chain (e.g., methylene, ethylene, propylene, butylene, pentylene, hexylene, heptylene, octylene, nonylene, decylene, undecylene, dodecylene, tridecylene, ethenylene, propenylene, butenylene, pentenylene, hexenylene, heptenylene, octenylene, nonenylene, decenylene, undecenylene, dodecenylene, tridecenylene). The term "alkanediyl" or "alkylene" refers to a bivalent hydrocarbon. The term $C_n$ means the alkanediyl group has "n" carbon atoms. For example, $C_{1-6}$ alkanediyl refers to an alkanediyl group having, e.g., 1, 2, 3, 4, 5, or 6 carbon atoms. The term "alkenylene" refers to a bivalent hydrocarbon having at least one double bond.

In various aspects, the aliphatic and aromatic groups can be substituted with one or more pendant relatively hydrophilic and/or charged groups. In some aspects, the pendant hydrophilic group includes one or more (e.g., 2, 3, 4, 5, 6, 7, 8, 9, 10 or more) hydroxyl groups. In various aspects, the pendant hydrophilic group includes one or more (e.g., 2, 3, 4, 5, 6, 7, 8, 9, 10 or more) amino groups. In some cases, the pendant hydrophilic group includes one or more (e.g., 2, 3, 4, 5, 6, 7, 8, 9, 10 or more) carboxylate groups. For example, the aliphatic group can include one or more polyacrylic acid group. In some cases, the pendant hydrophilic group includes one or more (e.g., 2, 3, 4, 5, 6, 7, 8, 9, 10 or more) sulfonate groups. In some cases, the pendant hydrophilic group includes one or more (e.g., 2, 3, 4, 5, 6, 7, 8, 9, 10 or more) phosphate groups. In some examples, the pendant hydrophilic group includes one or more ammonium groups (e.g., tertiary and/or quaternary ammonium). In other examples, the pendant hydrophilic group includes one or more zwitterionic groups (e.g., a betaine, such as poly (carboxybetaine (pCB) and ammonium phosphonate groups such as a phosphatidylcholine group).

In some aspects, the $R_2$ segment can include charged groups that are capable of binding to a counterion to ionically crosslink the thermoplastic polymer and form ionomers. In these aspects, for example, $R_2$ is an aliphatic or aromatic group having pendant amino, carboxylate, sulfonate, phosphate, ammonium, or zwitterionic groups, or combinations thereof.

In various cases when a pendant hydrophilic group is present, the pendant "hydrophilic" group is at least one polyether group, such as two polyether groups. In other cases, the pendant hydrophilic group is at least one polyester. In various cases, the pendant hydrophilic group is polylactone group (e.g., polyvinylpyrrolidone). Each carbon atom of the pendant hydrophilic group can optionally be substituted with, e.g., a $C_{1-6}$ alkyl group. In some of these aspects, the aliphatic and aromatic groups can be graft polymeric groups, wherein the pendant groups are homopolymeric groups (e.g., polyether groups, polyester groups, polyvinylpyrrolidone groups).

In some aspects, the pendant hydrophilic group is a polyether group (e.g., a polyethylene oxide group, a polyethylene glycol group), a polyvinylpyrrolidone group, a polyacrylic acid group, or combinations thereof.

The pendant hydrophilic group can be bonded to the aliphatic group or aromatic group through a linker. The linker can be any bifunctional small molecule (e.g., $C_{1-20}$) capable of linking the pendant hydrophilic group to the aliphatic or aromatic group. For example, the linker can include a diisocyanate group, as previously described herein, which when linked to the pendant hydrophilic group and to the aliphatic or aromatic group forms a carbamate bond. In some aspects, the linker can be 4,4'-diphenylmethane diisocyanate (MDI), as shown below.

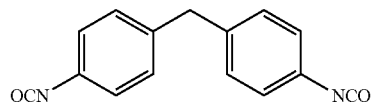

(Formula 3)

In some exemplary aspects, the pendant hydrophilic group is a polyethylene oxide group and the linking group is MDI, as shown below.

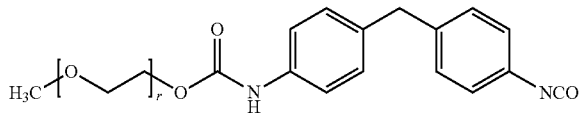

(Formula 4)

In some cases, the pendant hydrophilic group is functionalized to enable it to bond to the aliphatic or aromatic group, optionally through the linker. In various aspects, for example, when the pendant hydrophilic group includes an alkene group, which can undergo a Michael addition with a sulfhydryl-containing bifunctional molecule (i.e., a molecule having a second reactive group, such as a hydroxyl group or amino group), to result in a hydrophilic group that can react with the polymer backbone, optionally through the linker, using the second reactive group. For example, when the pendant hydrophilic group is a polyvinylpyrrolidone group, it can react with the sulfhydryl group on mercaptoethanol to result in hydroxyl-functionalized polyvinylpyrrolidone, as shown below.

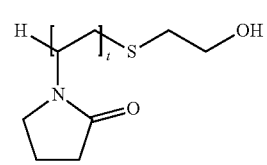

(Formula 5)

In some of the aspects disclosed herein, at least one $R_2$ segment includes a polytetramethylene oxide group. In other exemplary aspects, at least one $R_2$ segment can include an aliphatic polyol group functionalized with a polyethylene oxide group or polyvinylpyrrolidone group, such as the polyols described in E.P. Patent No. 2 462 908. For example, the $R_2$ segment can be derived from the reaction product of a polyol (e.g., pentaerythritol or 2,2,3-trihydroxypropanol) and either MDI-derivatized methoxypolyethylene glycol (to obtain compounds as shown in Formulas 6 or 7) or with MDI-derivatized polyvinylpyrrolidone (to obtain compounds as shown in Formulas 8 or 9) that had been previously been reacted with mercaptoethanol, as shown below.

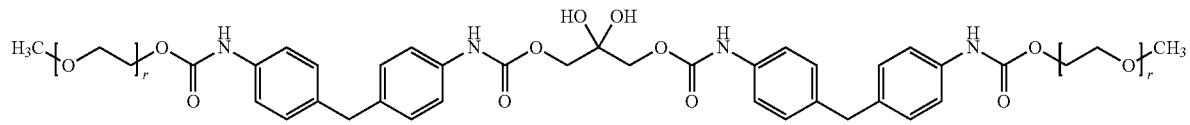

(Formula 6)

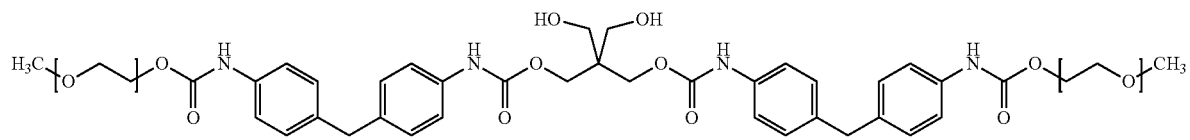

(Formula 7)

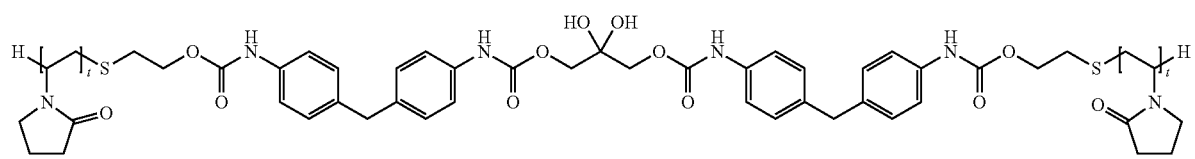

(Formula 8)

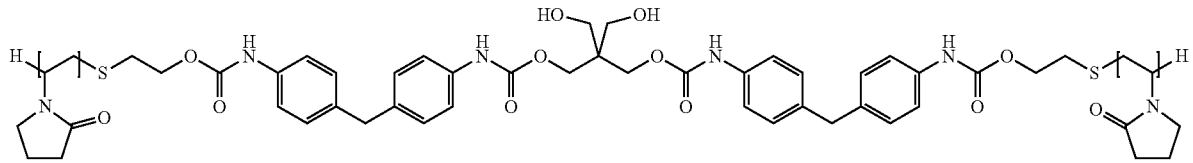

(Formula 9)

In various cases, at least one $R_2$ is a polysiloxane. In these cases, $R_2$ can be derived from a silicone monomer of Formula 10, such as a silicone monomer disclosed in U.S. Pat. No. 5,969,076, which is hereby incorporated by reference:

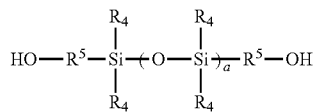

(Formula 10)

wherein: a is 1 to 10 or larger (e.g., 1, 2, 3, 4, 5, 6, 7, 8, 9, or 10); each $R_4$ independently is hydrogen, $C_{1-18}$ alkyl, $C_{2-18}$ alkenyl, aryl, or polyether; and each $R_5$ independently is $C_{1-10}$ alkanediyl, polyether, or polyurethane.

In some aspects, each $R_4$ independently is a H, $C_{1-10}$ alkyl, $C_{2-10}$ alkenyl, $C_{1-6}$ aryl, polyethylene, polypropylene, or polybutylene group. For example, each $R_4$ can independently be selected from the group consisting of methyl, ethyl, n-propyl, isopropyl, n-butyl, isobutyl, s-butyl, t-butyl, ethenyl, propenyl, phenyl, and polyethylene groups.

In various aspects, each $R^5$ independently includes a $C_{1-10}$ alkanediyl group (e.g., a methylene, ethylene, propylene, butylene, pentylene, hexylene, heptylene, octylene, nonylene, or decylene group). In other cases, each $R^5$ is a polyether group (e.g., a polyethylene, polypropylene, or polybutylene group). In various cases, each R5 is a polyurethane group.

Optionally, in some aspects, the polyurethane can include an at least partially crosslinked polymeric network that includes polymer chains that are derivatives of polyurethane. In such cases, it is understood that the level of crosslinking is such that the polyurethane retains thermoplastic properties (i.e., the crosslinked thermoplastic polyurethane can be softened or melted and re-solidified under the processing conditions described herein). This crosslinked polymeric network can be produced by polymerizing one or more isocyanates with one or more polyamino compounds, polysulfhydryl compounds, or combinations thereof, as shown in Formulas 11 and 12, below:

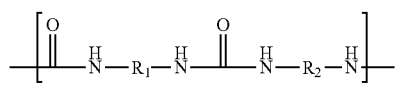

(Formula 11)

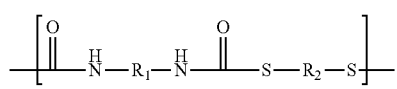

(Formula 12)

wherein the variables are as described above. Additionally, the isocyanates can also be chain extended with one or more polyamino or polythiol chain extenders to bridge two or more isocyanates, such as previously described for the polyurethanes of Formula 2.

As described herein, the thermoplastic polyurethane can be physically crosslinked through e.g., nonpolar or polar interactions between the urethane or carbamate groups on the polymers (the hard segments. In these aspects, component $R_1$ in Formula 1, and components $R_1$ and $R_3$ in Formula 2, forms the portion of the polymer often referred to as the "hard segment", and component $R_2$ forms the portion of the polymer often referred to as the "soft segment". In these aspects, the soft segment can be covalently bonded to the hard segment. In some examples, the thermoplastic polyurethane having physically crosslinked hard and soft segments can be a hydrophilic thermoplastic polyurethane (i.e., a thermoplastic polyurethane including hydrophilic groups as disclosed herein).

Thermoplastic Polyamides

In various aspects, the thermoplastic polymer can comprise a thermoplastic polyamide. The thermoplastic polyamide can be a polyamide homopolymer having repeating polyamide segments of the same chemical structure. Alternatively, the polyamide can comprise a number of polyamide segments having different polyamide chemical structures (e.g., polyamide 6 segments, polyamide 11 segments, polyamide 12 segments, polyamide 66 segments, etc.). The polyamide segments having different chemical structure can be arranged randomly, or can be arranged as repeating blocks.

In aspects, the thermoplastic polymers can be a block co-polyamide. For example, the block co-polyamide can have repeating hard segments, and repeating soft segments. The hard segments can comprise polyamide segments, and the soft segments can comprise non-polyamide segments. The thermoplastic polymers can be an elastomeric thermoplastic co-polyamide comprising or consisting of block co-polyamides having repeating hard segments and repeating soft segments. In block co-polymers, including block co-polymers having repeating hard segments and soft segments, physical crosslinks can be present within the segments or between the segments or both within and between the segments.

The thermoplastic polyamide can be a co-polyamide (i.e., a co-polymer including polyamide segments and non-polyamide segments). The polyamide segments of the co-polyamide can comprise or consist of polyamide 6 segments, polyamide 11 segments, polyamide 12 segments, polyamide 66 segments, or any combination thereof. The polyamide segments of the co-polyamide can be arranged randomly, or can be arranged as repeating segments. In a particular example, the polyamide segments can comprise or consist of polyamide 6 segments, or polyamide 12 segments, or both polyamide 6 segment and polyamide 12 segments. In the example where the polyamide segments of the co-polyamide include of polyamide 6 segments and polyamide 12 segments, the segments can be arranged randomly. The non-polyamide segments of the co-polyamide can comprise or consist of polyether segments, polyester segments, or both polyether segments and polyester segments. The co-polyamide can be a co-polyamide, or can be a random co-polyamide. The thermoplastic copolyamide can be formed from the polycondensation of a polyamide oligomer or prepolymer with a second oligomer prepolymer to form a copolyamide (i.e., a co-polymer including polyamide segments. Optionally, the second prepolymer can be a hydrophilic prepolymer.

In some aspects, the thermoplastic polyamide itself, or the polyamide segment of the thermoplastic copolyamide can be derived from the condensation of polyamide prepolymers, such as lactams, amino acids, and/or diamino compounds with dicarboxylic acids, or activated forms thereof. The resulting polyamide segments include amide linkages (—(CO)NH—). The term "amino acid" refers to a molecule having at least one amino group and at least one carboxyl group. Each polyamide segment of the thermoplastic polyamide can be the same or different.

In some aspects, the thermoplastic polyamide or the polyamide segment of the thermoplastic copolyamide is derived from the polycondensation of lactams and/or amino acids, and includes an amide segment having a structure shown in Formula 13, below, wherein $R_6$ is the segment of the polyamide derived from the lactam or amino acid.

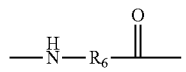

(Formula 13)

In some aspects, $R_6$ is derived from a lactam. In some cases, $R_6$ is derived from a 03-20 lactam, or a $C_{4-18}$ lactam, or a $C_{6-12}$ lactam. For example, $R_6$ can be derived from caprolactam or laurolactam. In some cases, $R_6$ is derived from one or more amino acids. In various cases, $R_6$ is derived from a $C_{4-25}$ amino acid, or a $C_{8-20}$ amino acid, or a $C_{8-18}$ amino acid. For example, $R_6$ can be derived from 12-aminolauric acid or 11-aminoundecanoic acid.

Optionally, in order to increase the relative degree of hydrophilicity of the thermoplastic copolyamide, Formula 13 can include a polyamide-polyether block copolymer segment, as shown below:

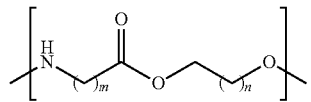

(Formula 14)

wherein m is 3-20, and n is 1-8. In some exemplary aspects, m is 4-15, or 6-12 (e.g., 6, 7, 8, 9, 10, 11, or 12), and n is 1, 2, or 3. For example, m can be 11 or 12, and n can be 1 or 3. In various aspects, the thermoplastic polyamide or the polyamide segment of the thermoplastic co-polyamide is derived from the condensation of diamino compounds with dicarboxylic acids, or activated forms thereof, and includes an amide segment having a structure shown in Formula 15, below, wherein $R_7$ is the segment of the polyamide derived from the diamino compound, $R_8$ is the segment derived from the dicarboxylic acid compound:

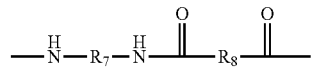

(Formula 15)

In some aspects, $R_7$ is derived from a diamino compound that includes an aliphatic group having $C_{4-15}$ carbon atoms, or $C_{5-10}$ carbon atoms, or $C_{6-9}$ carbon atoms. In some aspects, the diamino compound includes an aromatic group, such as phenyl, naphthyl, xylyl, and tolyl. Suitable diamino compounds from which $R_7$ can be derived include, but are not limited to, hexamethylene diamine (HMD), tetramethylene diamine, trimethyl hexamethylene diamine ($T_mD$), m-xylylene diamine (MXD), and 1,5-pentamine diamine. In various aspects, $R_8$ is derived from a dicarboxylic acid or activated form thereof, includes an aliphatic group having $C_{4-15}$ carbon atoms, or $C_{5-12}$ carbon atoms, or $C_{6-10}$ carbon atoms. In some cases, the dicarboxylic acid or activated form thereof from which $R_8$ can be derived includes an aromatic group, such as phenyl, naphthyl, xylyl, and tolyl groups. Suitable carboxylic acids or activated forms thereof from which $R_8$ can be derived include, but are not limited to adipic acid, sebacic acid, terephthalic acid, and isophthalic acid. In some aspects, the polymer chains are substantially free of aromatic groups.

In some aspects, each polyamide segment of the thermoplastic polyamide (including the thermoplastic copolyamide) is independently derived from a polyamide prepolymer selected from the group consisting of 12-aminolauric acid, caprolactam, hexamethylene diamine and adipic acid.

In some aspects, the thermoplastic polyamide comprises or consists of a thermoplastic poly(ether-block-amide). The thermoplastic poly(ether-block-amide) can be formed from the polycondensation of a carboxylic acid terminated polyamide prepolymer and a hydroxyl terminated polyether prepolymer to form a thermoplastic poly(ether-block-amide), as shown in Formula 16:

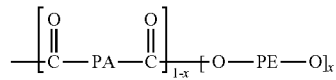

(Formula 16)

In various aspects, a disclosed poly(ether block amide) polymer is prepared by polycondensation of polyamide blocks containing reactive ends with polyether blocks containing reactive ends. Examples include, but are not limited to: 1) polyamide blocks containing diamine chain ends with polyoxyalkanediyl blocks containing carboxylic chain ends; 2) polyamide blocks containing dicarboxylic chain ends with polyoxyalkylene blocks containing diamine chain ends obtained by cyanoethylation and hydrogenation of aliphatic dihydroxylated alpha-omega polyoxyalkylenes known as polyether diols; 3) polyamide blocks containing dicarboxylic chain ends with polyether diols, the products obtained in this particular case being polyetheresteramides. The polyamide block of the thermoplastic poly(ether-block-amide) can be derived from lactams, amino acids, and/or diamino compounds with dicarboxylic acids as previously described. The polyether block can be derived from one or more polyethers selected from the group consisting of polyethylene oxide (PEO), polypropylene oxide (PPO), polytetrahydrofuran (PTHF), polytetramethylene oxide (PTMO), and combinations thereof.

Disclosed poly(ether block amide) polymers include those comprising polyamide blocks comprising dicarboxylic chain ends derived from the condensation of α, ω-aminocarboxylic acids, of lactams or of dicarboxylic acids and diamines in the presence of a chain-limiting dicarboxylic acid. In poly(ether block amide) polymers of this type, a α, ω-aminocarboxylic acid such as aminoundecanoic acid can be used; a lactam such as caprolactam or lauryllactam can be used; a dicarboxylic acid such as adipic acid, decanedioic acid or dodecanedioic acid can be used; and a diamine such as hexamethylenediamine can be used; or various combinations of any of the foregoing. In various aspects, the copolymer comprises polyamide blocks comprising polyamide 12 or of polyamide 6.

Disclosed poly(ether block amide) polymers include those comprising polyamide blocks derived from the condensation of one or more α, ω-aminocarboxylic acids and/or of one or more lactams containing from 6 to 12 carbon atoms in the presence of a dicarboxylic acid containing from 4 to 12 carbon atoms, and are of low mass, i.e., they have a number-average molecular weight ($M_n$) of from 400 to 1000. In poly(ether block amide) polymers of this type, a α, ω-aminocarboxylic acid such as aminoundecanoic acid or aminododecanoic acid can be used; a dicarboxylic acids such as adipic acid, sebacic acid, isophthalic acid, butanedioic acid, 1,4-cyclohexyldicarboxylic acid, terephthalic acid, the sodium or lithium salt of sulphoisophthalic acid, dimerized fatty acids (these dimerized fatty acids have a dimer content of at least 98 percent and are preferably hydrogenated) and dodecanedioic acid HOOC—$(CH_2)_{10}$—COOH can be used; and a lactam such as caprolactam and lauryllactam can be used; or various combinations of any of the foregoing. In various aspects, the copolymer comprises polyamide blocks obtained by condensation of lauryllactam in the presence of adipic acid or dodecanedioic acid and with a $M_n$ of 750 have a melting point of 127-130 degrees Celsius. In a further aspect, the various constituents of the polyamide block and their proportion can be chosen in order to obtain a melting point of less than 150° C. and advantageously between 90° C. and 135° C.

Disclosed poly(ether block amide) polymers include those comprising polyamide blocks derived from the condensation of at least one α, ω-aminocarboxylic acid (or a lactam), at least one diamine and at least one dicarboxylic acid. In copolymers of this type, a α,ω-aminocarboxylic acid, the lactam and the dicarboxylic acid can be chosen from those described herein above and the diamine such as an aliphatic diamine containing from 6 to 12 atoms and can be arylic and/or saturated cyclic such as, but not limited to, hexamethylenediamine, piperazine, 1-aminoethyl piperazine, bisaminopropylpiperazine, tetramethylenediamine, octamethylene-diamine, decamethylenediamine, dodecamethylenediamine, 1,5-diaminohexane, 2,2,4-trimethyl-1,6-diaminohexane, diamine polyols, isophoronediamine (IPD), methylpentamethylenediamine (MPDM), bis(aminocyclohexyl)methane (BACM) and bis(3-methyl-4-aminocyclohexyl)methane (BMACM) can be used.

In various aspects, the constituents of the polyamide block and their proportion can be chosen in order to obtain a melting point of less than 150 degrees Celsius and advantageously between 90 degrees Celsius and 135 degrees Celsius. In a further aspect, the various constituents of the polyamide block and their proportion can be chosen in order to obtain a melting point of less than 150 degrees Celsius and advantageously between 90 degrees Celsius and 135 degrees Celsius.

In an aspect, the number average molar mass of the polyamide blocks can be from about 300 grams per mole and about 15,000 grams per mole, from about 500 grams per mole and about 10,000 grams per mole, from about 500 grams per mole and about 6,000 grams per mole, from about 500 grams per mole to 5,000 grams per mole, and from about 600 grams per mole and about 5,000 grams per mole. In a further aspect, the number average molecular weight of the polyether block can range from about 100 grams per mole to about 6,000 grams per mole, from about 400 grams per mole to 3000 grams per mole and from about 200 grams per mole to about 3,000 grams per mole. In a still further aspect, the polyether (PE) content (x) of the poly(ether block amide) polymer can be from about 0.05 to about 0.8 (i.e., from about 5 mol percent to about 80 mol percent). In a yet further aspect, the polyether blocks can be present from about 10 percent by weight to about 50 percent by weight, from about 20 percent by weight to about 40 percent by weight, and from about 30 percent by weight to about 40 percent by weight. The polyamide blocks can be present from about 50 percent by weight to about 90 percent by weight, from about 60 percent by weight to about 80 percent by weight, and from about 70 percent by weight to about 90 percent by weight.

In an aspect, the polyether blocks can contain units other than ethylene oxide units, such as, for example, propylene oxide or polytetrahydrofuran (which leads to polytetramethylene glycol sequences). It is also possible to use simultaneously PEG blocks, i.e. those consisting of ethylene oxide units, PPG blocks, i.e. those consisting of propylene oxide units, and P $T_m$G blocks, i.e. those consisting of tetramethylene glycol units, also known as polytetrahydrofuran. PPG or P $T_m$G blocks are advantageously used. The amount of polyether blocks in these copolymers containing polyamide and polyether blocks can be from about 10 percent by weight to about 50 percent by weight of the copolymer and from about 35 percent by weight to about 50 percent by weight.

The copolymers containing polyamide blocks and polyether blocks can be prepared by any means for attaching the polyamide blocks and the polyether blocks. In practice, two processes are essentially used, one being a 2-step process and the other a one-step process.

In the two-step process, the polyamide blocks having dicarboxylic chain ends are prepared first, and then, in a second step, these polyamide blocks are linked to the polyether blocks. The polyamide blocks having dicarboxylic chain ends are derived from the condensation of polyamide precursors in the presence of a chain-stopper dicarboxylic acid. If the polyamide precursors are only lactams or α,ω-aminocarboxylic acids, a dicarboxylic acid is added. If the precursors already comprise a dicarboxylic acid, this is used in excess with respect to the stoichiometry of the diamines. The reaction usually takes place between 180 and 300 degrees Celsius, preferably 200 to 290 degrees Celsius, and the pressure in the reactor is set between 5 and 30 bar and maintained for approximately 2 to 3 hours. The pressure in the reactor is slowly reduced to atmospheric pressure and then the excess water is distilled off, for example for one or two hours.

Once the polyamide having carboxylic acid end groups has been prepared, the polyether, the polyol and a catalyst are then added. The total amount of polyether can be divided and added in one or more portions, as can the catalyst. In an aspect, the polyether is added first and the reaction of the OH end groups of the polyether and of the polyol with the COOH end groups of the polyamide starts, with the formation of ester linkages and the elimination of water. Water is removed as much as possible from the reaction mixture by distillation and then the catalyst is introduced in order to complete the linking of the polyether blocks to the polyether blocks. This second step takes place with stirring, preferably under a vacuum of at least 50 mbar (5000 Pa) at a temperature such that the reactants and the copolymers obtained are in the molten state. By way of example, this temperature can be between 100 and 400 degrees Celsius and usually between 200 and 250 degrees Celsius. The reaction is monitored by measuring the torque exerted by the polymer melt on the stirrer or by measuring the electric power consumed by the stirrer. The end of the reaction is determined by the value of the torque or of the target power. The catalyst is defined as being any product which promotes the linking of the polyamide blocks to the polyether blocks by esterification. Advantageously, the catalyst is a derivative of a metal (M) chosen from the group formed by titanium, zirconium and hafnium. In an aspect, the derivative can be prepared from a tetraalkoxides consistent with the general formula $M(OR)_4$, in which M represents titanium, zirconium or hafnium and R, which can be identical or different, represents linear or branched alkyl radicals having from 1 to 24 carbon atoms.

In a further aspect, the catalyst can comprise a salt of the metal (M), particularly the salt of (M) and of an organic acid and the complex salts of the oxide of (M) and/or the hydroxide of (M) and an organic acid. In a still further aspect, the organic acid can be formic acid, acetic acid, propionic acid, butyric acid, valeric acid, caproic acid, caprylic acid, lauric acid, myristic acid, palmitic acid, stearic acid, oleic acid, linoleic acid, linolenic acid, cyclohexanecarboxylic acid, phenylacetic acid, benzoic acid, salicylic acid, oxalic acid, malonic acid, succinic acid, glutaric acid, adipic acid, maleic acid, fumaric acid, phthalic acid and crotonic acid. Acetic and propionic acids are particularly preferred. In some aspects, M is zirconium and such salts are called zirconyl salts, e.g., the commercially available product sold under the name zirconyl acetate.

In an aspect, the weight proportion of catalyst varies from about 0.01 to about 5 percent of the weight of the mixture of the dicarboxylic polyamide with the polyetherdiol and the polyol. In a further aspect, the weight proportion of catalyst varies from about 0.05 to about 2 percent of the weight of the mixture of the dicarboxylic polyamide with the polyetherdiol and the polyol.

In the one-step process, the polyamide precursors, the chain stopper and the polyether are blended together; what is then obtained is a polymer having essentially polyether blocks and polyamide blocks of very variable length, but also the various reactants that have reacted randomly, which are distributed randomly along the polymer chain. They are the same reactants and the same catalyst as in the two-step process described above. If the polyamide precursors are only lactams, it is advantageous to add a little water. The copolymer has essentially the same polyether blocks and the same polyamide blocks, but also a small portion of the various reactants that have reacted randomly, which are distributed randomly along the polymer chain. As in the first step of the two-step process described above, the reactor is closed and heated, with stirring. The pressure established is between 5 and 30 bar. When the pressure no longer changes, the reactor is put under reduced pressure while still maintaining vigorous stirring of the molten reactants. The reaction is monitored as previously in the case of the two-step process.

The proper ratio of polyamide to polyether blocks can be found in a single poly(ether block amide), or a blend of two or more different composition poly(ether block amide)s can be used with the proper average composition. In one aspect, it can be useful to blend a block copolymer having a high level of polyamide groups with a block copolymer having a higher level of polyether blocks, to produce a blend having an average level of polyether blocks of about 20 to 40 percent by weight of the total blend of poly(amid-block-ether) copolymers, and preferably about 30 to 35 percent by weight. In a further aspect, the copolymer comprises a blend of two different poly(ether-block-amide)s comprising at least one block copolymer having a level of polyether blocks below about 35 percent by weight, and a second poly(ether-block-amide) having at least about 45 percent by weight of polyether blocks.

In various aspects, the thermoplastic polymer is a polyamide or a poly(ether-block-amide) with a melting temperature ($T_m$) from about 90 degrees Celsius to about 120 degrees Celsius when determined in accordance with Melting Temperature And Glass Transition Temperature Test (Using ASTM D3418-97) as described herein below. In a further aspect, the thermoplastic polymer is a polyamide or a poly(ether-block-amide) with a melting temperature ($T_m$) from about 93 degrees Celsius to about 99 degrees Celsius when determined in accordance with Melting Temperature And Glass Transition Temperature Test (Using ASTM D3418-97) as described herein below. In a still further aspect, the thermoplastic polymer is a polyamide or a poly(ether-block-amide) with a melting temperature ($T_m$) from about 112 degrees Celsius to about 118 degrees Celsius when determined in accordance with Melting Temperature And Glass Transition Temperature Test (Using ASTM D3418-97) as described herein below. In some aspects, the thermoplastic polymer is a polyamide or a poly(ether-block-amide) with a melting temperature of about 90 degrees Celsius, about 91 degrees Celsius, about 92 degrees Celsius, about 93 degrees Celsius, about 94 degrees Celsius, about 95 degrees Celsius, about 96 degrees Celsius, about 97 degrees Celsius, about 98 degrees Celsius, about 99 degrees Celsius, about 100 degrees Celsius, about 101 degrees Celsius, about 102 degrees Celsius, about 103 degrees Celsius, about 104 degrees Celsius, about 105 degrees Celsius, about 106 degrees Celsius, about 107 degrees Celsius, about 108 degrees Celsius, about 109 degrees Celsius, about 110 degrees Celsius, about 111 degrees Celsius, about 112 degrees Celsius, about 113 degrees Celsius, about 114 degrees Celsius, about 115 degrees Celsius, about 116 degrees Celsius, about 117 degrees Celsius, about 118 degrees Celsius, about 119 degrees Celsius, about 120 degrees Celsius, any range of melting temperature ($T_m$) values encompassed by any of the foregoing values, or any combination of the foregoing melting temperature ($T_m$) values, when determined in accordance with Melting Temperature And Glass Transition Temperature Test (Using ASTM D3418-97) as described herein below.

In various aspects, the thermoplastic polymer is a polyamide or a poly(ether-block-amide) with a glass transition temperature ($T_g$) from about −20 degrees Celsius to about 30 degrees Celsius when determined in accordance with Melting Temperature And Glass Transition Temperature Test (Using ASTM D3418-97) as described herein below. In a further aspect, the thermoplastic polymer is a polyamide or a poly(ether-block-amide) with a glass transition temperature ($T_g$) from about −13 degrees Celsius to about −7 degrees Celsius when determined in accordance with Melting Temperature And Glass Transition Temperature Test (Using ASTM D3418-97) as described herein below. In a still further aspect, the thermoplastic polymer is a polyamide or a poly(ether-block-amide) with a glass transition temperature ($T_g$) from about 17 degrees Celsius to about 23 degrees Celsius when determined in accordance with Melting Temperature And Glass Transition Temperature Test (Using ASTM D3418-97) as described herein below. In some aspects, the thermoplastic polymer is a polyamide or a poly(ether-block-amide) with a glass transition temperature ($T_g$) of about −20 degrees Celsius, about −19 degrees Celsius, about −18 degrees Celsius, about −17 degrees Celsius, about −16 degrees Celsius, about −15 degrees Celsius, about −14 degrees Celsius, about −13 degrees Celsius, about −12 degrees Celsius, about −10 degrees Celsius, about −9 degrees Celsius, about −8 degrees Celsius, about −7 degrees Celsius, about −6 degrees Celsius, about −5 degrees Celsius, about −4 degrees Celsius, about −3 degrees Celsius, about −2 degrees Celsius, about −1 degrees Celsius, about 0 degrees Celsius, about 1 degrees Celsius, about 2 degrees Celsius, about 3 degrees Celsius, about 4 degrees Celsius, about 5 degrees Celsius, about 6 degrees Celsius, about 7 degrees Celsius, about 8 degrees Celsius, about 9 degrees Celsius, about 10 degrees Celsius, about 11 degrees Celsius, about 12 degrees Celsius, about 13 degrees Celsius, about 14 degrees Celsius, about 15 degrees Celsius, about 16 degrees Celsius, about 17 degrees Celsius, about 18 degrees Celsius, about 19 degrees Celsius, about 20 degrees Celsius, any range of glass transition temperature values encompassed by any of the foregoing values, or any combination of the foregoing glass transition temperature values, when determined in accordance with Melting Temperature And Glass Transition Temperature Test (Using ASTM D3418-97) as described herein below.

In various aspects, the thermoplastic polymer is a polyamide or a poly(ether-block-amide) with a melt flow index from about 10 cubic centimeters per 10 minutes to about 30 cubic centimeters per 10 minutes when tested in accordance with Melt Flow Index Test as described herein below at 160 degrees Celsius using a weight of 2.16 kilograms. In a further aspect, the thermoplastic polymer is a polyamide or a poly(ether-block-amide) with a melt flow index from about 22 cubic centimeters per 10 minutes to about 28 cubic centimeters per 10 minutes when tested in accordance with Melt Flow Index Test as described herein below at 160 degrees Celsius using a weight of 2.16 kilograms. In some aspects, the thermoplastic polymer is a polyamide or a poly(ether-block-amide) with a melt flow index of about 10 cubic centimeters per 10 minutes, about 11 cubic centimeters per 10 minutes, about 12 cubic centimeters per 10 minutes, about 13 cubic centimeters per 10 minutes, about 14 cubic centimeters per 10 minutes, about 15 cubic centimeters per 10 minutes, about 16 cubic centimeters per 10 minutes, about 17 cubic centimeters per 10 minutes, of about 18 cubic centimeters per 10 minutes, about 19 cubic centimeters per 10 minutes, of about 20 cubic centimeters per 10 minutes, about 21 cubic centimeters per 10 minutes, about 22 cubic centimeters per 10 minutes, about 23 cubic centimeters per 10 minutes, about 24 cubic centimeters per 10 minutes, about 25 cubic centimeters per 10 minutes, about 26 cubic centimeters per 10 minutes, about 27 cubic centimeters per 10 minutes, of about 28 cubic centimeters per 10 minutes, about 29 cubic centimeters per 10 minutes, of about 30 cubic centimeters per 10 minutes, any range of melt flow index values encompassed by any of the foregoing values, or any combination of the foregoing melt flow index values, when determined in accordance with Melt Flow Index Test as described herein below at 160 degrees Celsius using a weight of 2.16 kilograms.

In various aspects, the thermoplastic polymer is a polyamide or a poly(ether-block-amide) with a cold Ross flex test result of about 120,000 to about 180,000 when tested on a thermoformed plaque of the polyamide or the poly(ether-block-amide) in accordance with the cold Ross flex test as described herein below. In a further aspect, the thermoplastic polymer is a polyamide or a poly(ether-block-amide) with a cold Ross flex test result of about 140,000 to about 160,000 when tested on a thermoformed plaque of the polyamide or the poly(ether-block-amide) in accordance with the cold Ross flex test as described herein below. In a still further aspect, the thermoplastic polymer is a polyamide or a poly(ether-block-amide) with a cold Ross flex test result of about 130,000 to about 170,000 when tested on a thermoformed plaque of the polyamide or the poly(ether-block-amide) in accordance with the cold Ross flex test as described herein below. In some aspects, the thermoplastic polymer is a polyamide or a poly(ether-block-amide) with a cold Ross flex test result of about 120,000, about 125,000, about 130,000, about 135,000, about 140,000, about 145,000, about 150,000, about 155,000, about 160,000, about 165,000, about 170,000, about 175,000, about 180,000, any range of cold Ross flex test values encompassed by any of the foregoing values, or any combination of the foregoing cold Ross flex test values, when tested on a thermoformed plaque of the polyamide or the poly(ether-block-amide) in accordance with the cold Ross flex test as described herein below.

In various aspects, the thermoplastic polymer is a polyamide or a poly(ether-block-amide) with a modulus from about 5 megapascals to about 100 megapascals when determined on a thermoformed plaque in accordance with The Modulus Test with modifications described herein below. In a further aspect, the thermoplastic polymer is a polyamide or a poly(ether-block-amide) with a modulus from about 20 megapascals to about 80 megapascals when determined on a thermoformed plaque in accordance with The Modulus Test with modifications described herein below. In some aspects, the thermoplastic polymer is a polyamide or a poly(ether-block-amide) with a modulus of about 5 megapascals, about 10 megapascals, about 15 megapascals, about 20 megapascals, about 25 megapascals, about 30 megapascals, about 35 megapascals, about 40 megapascals, about 45 megapascals, about 50 megapascals, about 55 megapascals, about 60 megapascals, about 65 megapascals, about 70 megapascals, about 75 megapascals, about 80 megapascals, about 85 megapascals, about 90 megapascals, about 95 megapascals, about 100 megapascals, any range of modulus values encompassed by any of the foregoing values, or any combination of the foregoing modulus values, when tested on a thermoformed plaque of the polyamide or the poly(ether-block-amide) in accordance with The Modulus Test with modifications described herein below.

In various aspects, the thermoplastic polymer is a polyamide or a poly(ether-block-amide) with a melting temperature ($T_m$) of about 115 degrees Celsius when determined in accordance with Melting Temperature And Glass Transition Temperature Test (Using ASTM D3418-97) as described herein below; a glass transition temperature ($T_g$) of about −10 degrees Celsius when determined in accordance with Melting Temperature And Glass Transition Temperature Test (Using ASTM D3418-97) as described herein below; a melt flow index of about 25 cubic centimeters per 10 minutes when tested in accordance with Melt Flow Index Test as described herein below at 160 degrees Celsius using a weight of 2.16 kilograms; a cold Ross flex test result of about 150,000 when tested on a thermoformed plaque in accordance with the cold Ross flex test as described herein below; and a modulus from about 25 megapascals to about 70 megapascals when determined on a thermoformed plaque in accordance with The Modulus Test with modifications described herein below.

In various aspects, the thermoplastic polymer is a polyamide or a poly(ether-block-amide) with a melting temperature ($T_m$) of about 96 degrees Celsius when determined in accordance with Melting Temperature And Glass Transition Temperature Test (Using ASTM D3418-97) as described herein below; a glass transition temperature ($T_g$) of about 20 degrees Celsius when determined in accordance with Melting Temperature And Glass Transition Temperature Test (Using ASTM D3418-97) as described herein below; a cold Ross flex test result of about 150,000 when tested on a thermoformed plaque in accordance with the cold Ross flex test as described herein below; and a modulus of less than or equal to about 10 megapascals a when determined on a thermoformed plaque in accordance with The Modulus Test with modifications described herein below.

In various aspects, the thermoplastic polymer is a polyamide or a poly(ether-block-amide) is a mixture of a first polyamide or a poly(ether-block-amide) with a melting temperature ($T_m$) of about 115 degrees Celsius when determined in accordance with Melting Temperature And Glass Transition Temperature Test (Using ASTM D3418-97) as described herein below; a glass transition temperature ($T_g$) of about −10 degrees Celsius when determined in accordance with Melting Temperature And Glass Transition Temperature Test (Using ASTM D3418-97) as described herein below; a melt flow index of about 25 cubic centimeters per 10 minutes when tested in accordance with Melt Flow Index Test as described herein below at 160 degrees Celsius using a weight of 2.16 kilograms; a cold Ross flex test result of about 150,000 when tested on a thermoformed plaque in accordance with the cold Ross flex test as described herein below; and a modulus from about 25 megapascals to about 70 megapascals when determined on a thermoformed plaque in accordance with The Modulus Test with modifications described herein below; and a second polyamide or a poly(ether-block-amide) with a melting temperature ($T_m$) of about 96 degrees Celsius when determined in accordance with Melting Temperature And Glass Transition Temperature Test (Using ASTM D3418-97) as described herein below; a glass transition temperature ($T_g$) of about 20 degrees Celsius when determined in accordance with Melting Temperature And Glass Transition Temperature Test (Using ASTM D3418-97) as described herein below; a cold Ross flex test result of about 150,000 when tested on a thermoformed plaque in accordance with the cold Ross flex test as described herein below; and a modulus of less than or equal to about 10 megapascals a when determined on a thermoformed plaque in accordance with The Modulus Test with modifications described herein below.

Exemplary commercially available copolymers include, but are not limited to, those available under the tradenames of VESTAMID® (Evonik Industries); PLATAMID® (Arkema), e.g., product code H2694; PEBAX® (Arkema), e.g., product code "PEBAX MH1657" and "PEBAX MV1074"; PEBAX® RNEW (Arkema); GRILAMID® (EMS-Chemie AG), or also to other similar materials produced by various other suppliers.

In some examples, the thermoplastic polyamide is physically crosslinked through, e.g., nonpolar or polar interactions between the polyamide groups of the polymers. In examples where the thermoplastic polyamide is a thermoplastic copolyamide, the thermoplastic copolyamide can be physically crosslinked through interactions between the polyamide groups, an optionally by interactions between the copolymer groups. When the thermoplastic copolyamide is physically crosslinked thorough interactions between the polyamide groups, the polyamide segments can form the portion of the polymer referred to as the "hard segment", and copolymer segments can form the portion of the polymer referred to as the "soft segment". For example, when the thermoplastic copolyamide is a thermoplastic poly(ether-block-amide), the polyamide segments form the hard segment portion of the polymer, and polyether segments can form the soft segment portion of the polymer. Therefore, in some examples, the thermoplastic polymer can include a physically crosslinked polymeric network having one or more polymer chains with amide linkages.

In some aspects, the polyamide segment of the thermoplastic co-polyamide includes polyamide-11 or polyamide-12 and the polyether segment is a segment selected from the group consisting of polyethylene oxide, polypropylene oxide, and polytetramethylene oxide segments, and combinations thereof.

Optionally, the thermoplastic polyamide can be partially covalently crosslinked, as previously described herein. In such cases, it is to be understood that the degree of crosslinking present in the thermoplastic polyamide is such that, when it is thermally processed in the form of a yarn or fiber to form the articles of footwear of the present disclosure, the partially covalently crosslinked thermoplastic polyamide retains sufficient thermoplastic character that the partially covalently crosslinked thermoplastic polyamide is softened or melted during the processing and re-solidifies.

Thermoplastic Polyesters

In aspects, the thermoplastic polymers can comprise a thermoplastic polyester. The thermoplastic polyester can be formed by reaction of one or more carboxylic acids, or its ester-forming derivatives, with one or more bivalent or multivalent aliphatic, alicyclic, aromatic or araliphatic alcohols or a bisphenol. The thermoplastic polyester can be a polyester homopolymer having repeating polyester segments of the same chemical structure. Alternatively, the polyester can comprise a number of polyester segments having different polyester chemical structures (e.g., polyglycolic acid segments, polylactic acid segments, polycaprolactone segments, polyhydroxyalkanoate segments, polyhydroxybutyrate segments, etc.). The polyester segments having different chemical structure can be arranged randomly, or can be arranged as repeating blocks.

Exemplary carboxylic acids that that can be used to prepare a thermoplastic polyester include, but are not limited to, adipic acid, pimelic acid, suberic acid, azelaic acid, sebacic acid, nonane dicarboxylic acid, decane dicarboxylic acid, undecane dicarboxylic acid, terephthalic acid, isophthalic acid, alkyl-substituted or halogenated terephthalic acid, alkyl-substituted or halogenated isophthalic acid, nitroterephthalic acid, 4,4'-diphenyl ether dicarboxylic acid, 4,4'-diphenyl thioether dicarboxylic acid, 4,4'-diphenyl sulfonedicarboxylic acid, 4,4'-diphenyl alkylenedicarboxylic acid, naphthalene-2,6-dicarboxylic acid, cyclohexane-1,4-dicarboxylic acid and cyclohexane-1,3-dicarboxylic acid. Exemplary diols or phenols suitable for the preparation of the thermoplastic polyester include, but are not limited to, ethylene glycol, diethylene glycol, 1,3-propanediol, 1,4-butanediol, 1,6-hexanediol, 1,8-octanediol, 1,10-decanediol, 1,2-propanediol, 2,2-dimethyl-1,3-propanediol, 2,2,4-trimethylhexanediol, p-xylenediol, 1,4-cyclohexanediol, 1,4-cyclohexane dimethanol, and bis-phenol A.

In some aspects, the thermoplastic polyester is a polybutylene terephthalate (PBT), a polytrimethylene terephthalate, a polyhexamethylene terephthalate, a poly-1,4-dimethylcyclohexane terephthalate, a polyethylene terephthalate (PET), a polyethylene isophthalate (PEI), a polyarylate (PAR), a polybutylene naphthalate (PBN), a liquid crystal polyester, or a blend or mixture of two or more of the foregoing.

The thermoplastic polyester can be a co-polyester (i.e., a co-polymer including polyester segments and non-polyester segments). The co-polyester can be an aliphatic co-polyester (i.e., a co-polyester in which both the polyester segments and the non-polyester segments are aliphatic). Alternatively, the co-polyester can include aromatic segments. The polyester segments of the co-polyester can comprise or consist of polyglycolic acid segments, polylactic acid segments, polycaprolactone segments, polyhydroxyalkanoate segments, polyhydroxybutyrate segments, or any combination thereof. The polyester segments of the co-polyester can be arranged randomly, or can be arranged as repeating blocks.

For example, the thermoplastic polyester can be a block co-polyester having repeating blocks of polymeric units of the same chemical structure (segments) which are relatively harder (hard segments), and repeating blocks of polymeric segments which are relatively softer (soft segments). In block co-polyesters, including block co-polyesters having repeating hard segments and soft segments, physical cross-links can be present within the blocks or between the blocks or both within and between the blocks. In a particular example, the thermoplastic material can comprise or consist essentially of an elastomeric thermoplastic co-polyester having repeating blocks of hard segments and repeating blocks of soft segments.

The non-polyester segments of the co-polyester can comprise or consist of polyether segments, polyamide segments, or both polyether segments and polyamide segments. The co-polyester can be a block co-polyester, or can be a random co-polyester. The thermoplastic co-polyester can be formed from the polycodensation of a polyester oligomer or prepolymer with a second oligomer prepolymer to form a block copolyester. Optionally, the second prepolymer can be a hydrophilic prepolymer. For example, the co-polyester can be formed from the polycondensation of terephthalic acid or naphthalene dicarboxylic acid with ethylene glycol, 1,4-butanediol, or 1-3 propanediol. Examples of co-polyesters include polyethelene adipate, polybutylene succinate, poly(3-hydroxbutyrate-co-3-hydroxyvalerate), polyethylene terephthalate, polybutylene terephthalate, polytrimethylene terephthalate, polyethylene napthalate, and combinations thereof. In a particular example, the co-polyamide can comprise or consist of polyethylene terephthalate.

In some aspects, the thermoplastic polyester is a block copolymer comprising segments of one or more of polybutylene terephthalate (PBT), a polytrimethylene terephthalate, a polyhexamethylene terephthalate, a poly-1,4-dimethylcyclohexane terephthalate, a polyethylene terephthalate (PET), a polyethylene isophthalate (PEI), a polyarylate (PAR), a polybutylene naphthalate (PBN), and a liquid crystal polyester. For example, a suitable thermoplastic polyester that is a block copolymer can be a PET/PEI copolymer, a polybutylene terephthalate/tetraethylene glycol copolymer, a polyoxyalkylenediimide diacid/polybutylene terephthalate copolymer, or a blend or mixture of any of the foregoing.

In some aspects, the thermoplastic polyester is a biodegradable resin, for example, a copolymerized polyester in which poly(a-hydroxy acid) such as polyglycolic acid or polylactic acid is contained as principal repeating units.

The disclosed thermoplastic polyesters can be prepared by a variety of polycondensation methods known to the skilled artisan, such as a solvent polymerization or a melt polymerization process.

Thermoplastic Polyolefins

In some aspects, the thermoplastic polymers can comprise or consist essentially of a thermoplastic polyolefin. Exemplary of thermoplastic polyolefins useful can include, but are not limited to, polyethylene, polypropylene, and thermoplastic olefin elastomers (e.g., metallocene-catalyzed block copolymers of ethylene and α-olefins having 4 to about 8 carbon atoms). In a further aspect, the thermoplastic polyolefin is a polymer comprising a polyethylene, an ethylene-α-olefin copolymer, an ethylene-propylene rubber (EPDM), a polybutene, a polyisobutylene, a poly-4-methylpent-1-ene, a polyisoprene, a polybutadiene, an ethylene-methacrylic acid copolymer, and an olefin elastomer such as a dynamically cross-linked polymer obtained from polypropylene (PP) and an ethylene-propylene rubber (EPDM), and blends or mixtures of the foregoing. Further exemplary thermoplastic polyolefins useful in the disclosed compositions, yarns, and fibers are polymers of cycloolefins such as cyclopentene or norbornene.

It is to be understood that polyethylene, which optionally can be crosslinked, is inclusive a variety of polyethylenes, including, but not limited to, low density polyethylene (LDPE), linear low density polyethylene (LLDPE), (VLDPE) and (ULDPE), medium density polyethylene (MDPE), high density polyethylene (HDPE), high density and high molecular weight polyethylene (HDPE-HMW), high density and ultrahigh molecular weight polyethylene (HDPE-UHMW), and blends or mixtures of any the foregoing polyethylenes. A polyethylene can also be a polyethylene copolymer derived from monomers of monoolefins and diolefins copolymerized with a vinyl, acrylic acid, methacrylic acid, ethyl acrylate, vinyl alcohol, and/or vinyl acetate. Polyolefin copolymers comprising vinyl acetate-derived units can be a high vinyl acetate content copolymer, e.g., greater than about 50 percent by weight vinyl acetate-derived composition.

In some aspects, the thermoplastic polyolefin, as disclosed herein, can be formed through free radical, cationic, and/or anionic polymerization by methods well known to those skilled in the art (e.g., using a peroxide initiator, heat, and/or light). In a further aspect, the disclosed thermoplastic polyolefin can be prepared by radical polymerization under high pressure and at elevated temperature. Alternatively, the thermoplastic polyolefin can be prepared by catalytic polymerization using a catalyst that normally contains one or more metals from group IVb, Vb, VIb or VIII metals. The catalyst usually has one or more than one ligand, typically oxides, halides, alcoholates, esters, ethers, amines, alkyls, alkenyls and/or aryls that can be either p- or s-coordinated complexed with the group IVb, Vb, VIb or VIII metal. In various aspects, the metal complexes can be in the free form or fixed on substrates, typically on activated magnesium chloride, titanium(III) chloride, alumina or silicon oxide. It is understood that the metal catalysts can be soluble or insoluble in the polymerization medium. The catalysts can be used by themselves in the polymerization or further activators can be used, typically a group Ia, IIa and/or IIIa metal alkyls, metal hydrides, metal alkyl halides, metal alkyl oxides or metal alkyloxanes. The activators can be modified conveniently with further ester, ether, amine or silyl ether groups.

Suitable thermoplastic polyolefins can be prepared by polymerization of monomers of monoolefins and diolefins as described herein. Exemplary monomers that can be used to prepare disclosed thermoplastic polyolefin include, but are not limited to, ethylene, propylene, 1-butene, 1-pentene, 1-hexene, 2-methyl-1-propene, 3-methyl-1-pentene, 4-methyl-1-pentene, 5-methyl-1-hexene and mixtures thereof.

Suitable ethylene-α-olefin copolymers can be obtained by copolymerization of ethylene with an α-olefin such as propylene, butene-1, hexene-1, octene-1,4-methyl-1-pentene or the like having carbon numbers of 3 to 12.

Suitable dynamically cross-linked polymers can be obtained by cross-linking a rubber component as a soft segment while at the same time physically dispersing a hard segment such as PP and a soft segment such as EPDM by using a kneading machine such as a Banbbury mixer and a biaxial extruder.

In some aspects, the thermoplastic polyolefin can be a mixture of thermoplastic polyolefins, such as a mixture of two or more polyolefins disclosed herein above. For example, a suitable mixture of thermoplastic polyolefins can be a mixture of polypropylene with polyisobutylene, polypropylene with polyethylene (for example PP/HDPE, PP/LDPE) or mixtures of different types of polyethylene (for example LDPE/HDPE).

In some aspects, the thermoplastic polyolefin can be a copolymer of suitable monoolefin monomers or a copolymer of a suitable monoolefin monomer and a vinyl monomer. Exemplary thermoplastic polyolefin copolymers include, but are not limited to, ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

In some aspects, the thermoplastic polyolefin can be a polypropylene homopolymer, a polypropylene copolymers, a polypropylene random copolymer, a polypropylene block copolymer, a polyethylene homopolymer, a polyethylene random copolymer, a polyethylene block copolymer, a low density polyethylene (LDPE), a linear low density polyethylene (LLDPE), a medium density polyethylene, a high density polyethylene (HDPE), or blends or mixtures of one or more of the preceding polymers.

In some aspects, the polyolefin is a polypropylene. The term "polypropylene," as used herein, is intended to encompass any polymeric composition comprising propylene monomers, either alone or in mixture or copolymer with other randomly selected and oriented polyolefins, dienes, or other monomers (such as ethylene, butylene, and the like). Such a term also encompasses any different configuration and arrangement of the constituent monomers (such as atactic, syndiotactic, isotactic, and the like). Thus, the term as applied to fibers is intended to encompass actual long strands, tapes, threads, and the like, of drawn polymer. The polypropylene can be of any standard melt flow (by testing); however, standard fiber grade polypropylene resins possess ranges of Melt Flow Indices between about 1 and 1000.

In some aspects, the polyolefin is a polyethylene. The term "polyethylene," as used herein, is intended to encompass any polymeric composition comprising ethylene monomers, either alone or in mixture or copolymer with other randomly selected and oriented polyolefins, dienes, or other monomers (such as propylene, butylene, and the like). Such a term also encompasses any different configuration and arrangement of the constituent monomers (such as atactic, syndiotactic, isotactic, and the like). Thus, the term as applied to fibers is intended to encompass actual long strands, tapes, threads, and the like, of drawn polymer. The polyethylene can be of any standard melt flow (by testing); however, standard fiber grade polyethylene resins possess ranges of Melt Flow Indices between about 1 and 1000.

Methods of Making Resin Compositions

According to various aspects, this disclosure also provides a method for making a resin composition, such as one or more of the disclosed resin compositions.

Generally speaking, a method for making a polyolefin resin composition includes blending a polyolefin copolymer with an effective amount of a polymeric resin modifier. The resin compositions provided herein can be made by blending an effective amount of a polymeric resin modifier and a polyolefin copolymer to form a blended resin composition, wherein the effective amount is as described herein. Methods of blending polymers can include film blending in a press, blending in a mixer (e.g. mixers commercially available under the tradename "HAAKE" from Thermo Fisher Scientific, Waltham, Mass.), solution blending, hot melt blending, and extruder blending. In some aspects, the polymeric resin modifier and polyolefin copolymer are miscible such that they can be readily mixed by the screw in the injection barrel during injection molding, e.g. without the need for a separate blending step.

In one aspect, a method for making a first polyolefin resin composition includes blending a polypropylene copolymer and an effective amount of a polymeric resin modifier, wherein the effective amount of the polymeric resin modifier is effective to allow the resin composition to pass a flex test pursuant to the Cold Ross Flex Test using the Plaque Sampling Procedure.

In another aspect, a method for making a first polyolefin resin composition includes blending a polypropylene copolymer and an effective amount of a polymeric resin modifier, wherein the effective amount of the polymeric resin modifier is effective to allow the resin composition to pass a flex test pursuant to the Cold Ross Flex Test using the Plaque Sampling Procedure without a significant change in abrasion loss when measured pursuant to Abrasion Loss Test using the Neat Material Sampling Procedure.

The polyolefin resin compositions provided herein can be made by blending an effective amount of an isotactic polyolefin copolymer resin modifier. For example, in a method of making a first polyolefin resin composition, the effective amount is an amount effective to allow the resin composition to pass a flex test pursuant to the Cold Ross Flex Test using the Plaque Sampling Procedure, where a comparable resin composition identical to the first polyolefin resin composition except without the isotactic polyolefin copolymer resin modifier fails the flex test pursuant to the Cold Ross Flex Test using the Plaque Sampling Procedure. In a method of making a first polyolefin resin composition, the effective amount can be an amount effective to maintain an abrasion loss of the resin composition within about 20 percent of an abrasion loss of the comparable resin composition as measured pursuant to Abrasion Loss Test using the Neat Material Sampling Procedure. The effective amount can be the effective amount of the isotactic polyolefin copolymer resin modifier is an amount effective to decrease a percent crystallization of the resin composition by at least 4 percentage points as compared to a percent crystallization of the comparable resin composition when measured according to the Crystallinity Test using the Neat Material Sampling Procedure.

The methods can further include extruding the blended resin composition to form an extruded resin composition. The methods of extruding the blended resin can include manufacturing long products of relatively constant cross-section (rods, sheets, pipes, films, wire insulation coating). The methods of extruding the blended resin can include conveying a softened blended resin composition through a die with an opening. The blended resin can be conveyed forward by a feeding screw and forced through the die. Heating elements, placed over the barrel, can soften and melt the blended resin. The temperature of the material can be controlled by thermocouples. The product going out of the die can be cooled by blown air or in a water bath to form the extruded resin composition. Alternatively, the product going out of the die can be pelletized with little cooling as described below.

The method can further include pelletizing the extruded resin composition to form a pelletized resin composition. Methods of pelletizing can include melt pelletizing (hot cut) whereby the melt coming from a die is almost immediately cut into pellets that are conveyed and cooled by liquid or gas. Methods of pelletizing can include strand pelletizing (cold cut) whereby the melt coming from the die head is converted into strands (the extruded resin composition) that are cut into pellets after cooling and solidification.

The method can further include injection molding the pelletized resin composition to form an article. The injection molding can include the use of a non-rotating, cold plunger to force the pelletized resin through a heated cylinder wherein the resin composition is heated by heat conducted from the walls of the cylinder to the resin composition. The injection molding can include the use of a rotating screw, disposed co-axially of a heated barrel, for conveying the pelletized resin composition toward a first end of the screw and to heat the resin composition by the conduction of heat from the heated barrel to the resin composition. As the resin composition is conveyed by the screw mechanism toward the first end, the screw is translated toward the second end so as to produce a reservoir space at the first end. When sufficient melted resin composition is collected in the reservoir space, the screw mechanism can be pushed toward the first end so as to inject the material into a selected mold.

Methods of Making Components and Articles

The disclosure provides several methods for making components and articles described herein. The methods can include injection molding a resin composition described herein. The disclosure provides methods for manufacturing a component for an article of footwear or sporting equipment, by injection molding a resin composition described herein.

In certain aspects, the methods comprise operably coupling the described plate and edge portion. In some aspects, the edge portion and plate are formed integrally. For example, the first polyolefin resin and the second resin can be injection molded simultaneously to provide a unitary component having a plate and an edge portion. In this aspect, a mold can be provided having a first mold portion having a first surface, a second surface, and an outer perimeter. The mold also has a second mold portion disposed at least about a portion of the outer perimeter of the first portion. The first polyolefin resin can be injected to the first portion of the mold, while the second resin can be injected to the second portion of the mold. Inside the mold, the first polyolefin resin and the second resin contact each other at the outer perimeter of the first mold portion. The resultant injection-molded component is a unitary component, comprising both the plate and the edge portion. In some aspects, the plate can be formed and the edge portion can be injection-molded directly onto the plate. For example, after the plate has been formed, the plate can be introduced to another mold configured to receive the plate, and having a mold portion configured to form an edge portion on a target surface of the plate. The second resin can be injected to the mold portion, where the edge portion is formed directly on the target surface of the plate, such as at or near the outer perimeter of the plate.

In some aspects, the edge portion and plate are provided separately, and affixed, combined or joined so as to be operably coupled. For example, an adhesive can be provided between the edge portion and the plate, to provide an adhesive bond between the edge portion and the plate. Any suitable adhesive that is compatible with both the edge portion and the plate can be used.

In other aspects, affixing the edge portion to the plate can include forming a mechanical bond between the plate and the edge portion. Affixing the plate to the edge portion can include (i) increasing a temperature of the first polyolefin resin composition to a first temperature above a melting or softening point of the first polyolefin resin composition, (ii) contacting the plate and the edge portion while the first polyolefin resin composition is at the first temperature, and (iii) keeping the plate and the edge portion in contact with each other while decreasing the temperature of the first polyolefin resin composition to a second temperature below the melting or softening point of the first polyolefin resin composition, forming a mechanical bond between the plate and the edge portion.

In other aspects, affixing the edge portion to the plate can include (i) increasing a temperature of the second resin composition of the edge material to a first temperature above a melting or softening point of the second resin composition, (ii) contacting the edge portion to the plate while the second resin composition is at the first temperature, and (iii) keeping the edge portion and plate in contact with each other while decreasing the temperature of the second resin composition to a second temperature below the melting or softening point of the second resin composition forming a mechanical bond between the resin composition and the second element.

In other aspects, affixing the edge portion to the plate can include (i) increasing a temperature of both the first polyolefin resin composition and the second resin composition to a first temperature above both a melting or softening point of the first polyolefin composition and a melting or softening point of the second resin composition, (ii) contacting the plate and the edge portion while both the first polyolefin resin composition and the second resin composition are at the first temperature, and (iii) keeping the plate and edge portion in contact with each other while decreasing the temperature of both the first polyolefin resin composition and the second resin composition to a second temperature below both the melting or softening point of the first polyolefin resin composition and the melting or softening point of the second resin composition, melding at least a portion of the resin material and the thermoplastic polymeric material with each other, thereby forming a mechanical bond between the resin composition and the second element.

In yet other aspects, the edge portion can be provided as part of a chassis, and the chassis can be coupled with the plate so as to provide the edge portion about the outer perimeter of the plate. In some aspects, the edge portion can be integrally formed with the chassis, such as using any one or more of the methods described herein. In some aspects, the edge portion and the chassis can be provided separately, and affixed, combined or joined so as to be operably coupled, such as using any one or more of the methods described herein.

The methods can further include providing a component containing a resin composition, and providing a second element, and affixing the component to the second element. The second element can include a textile or multilayer film. For example, the second element can include an upper. The second element can include one or both of polyolefin fibers and polyolefin yarns.

In some aspects, polyolefin is present on a side or outer layer of the second element, and the method includes affixing the polyolefins together. The second element can include a yarn, a textile, a film, or some other element. Affixing the component to the second element can include directly injecting the resin composition onto the second element. Affixing the component to the second element can include forming a mechanical bond between the resin composition and the second element. Affixing the component to the second element can include (i) increasing a temperature of the resin composition to a first temperature above a melting or softening point of the resin composition, (ii) contacting the resin composition and the second element while the resin composition is at the first temperature, and (iii) keeping the resin composition and the second element in contact with each other while decreasing the temperature of the resin composition to a second temperature below the melting or softening point of the resin composition, forming a mechanical bond between the resin composition and the second element.

The second element can be a thermoplastic polymeric material, and affixing the component to the second element can include (i) increasing a temperature of the thermoplastic polymeric material to a first temperature above a melting or softening point of the thermoplastic polymeric material, (ii) contacting the resin composition and the second element while the thermoplastic polymeric material is at the first temperature, and (iii) keeping the resin composition and the second element in contact with each other while decreasing the temperature of the thermoplastic polymeric material to a second temperature below the melting or softening point of the thermoplastic polymeric material, forming a mechanical bond between the resin composition and the second element.

The second element can include a thermoplastic polymeric material, and affixing the component to the second element can include (i) increasing a temperature of both the resin composition and the thermoplastic polymeric material to a first temperature above both a melting or softening point of the resin composition and a melting or softening point of the thermoplastic polymeric material, (ii) contacting the resin composition and the second element while both the resin composition and the thermoplastic polymeric material are at the first temperature, and (iii) keeping the resin composition and the second element in contact with each other while decreasing the temperature of both the resin composition and the thermoplastic polymeric material to a second temperature below both the melting or softening point of the resin composition and the melting or softening point of the thermoplastic polymeric material, melding at least a portion of the resin material and the thermoplastic polymeric material with each other, thereby forming a mechanical bond between the resin composition and the second element.

In certain aspects, the article is an article of footwear including a sole structure comprising the described plate, that is operably coupled with an upper. In some aspects, the methods comprise operably coupling or affixing a rand with the upper, the plate, or both. For example, the method may comprise directly bonding (e.g., via mechanical or adhesive bond) the rand to the surface of the upper, the surface of the plate, or both. In an aspect, the method may comprise affixing the rand to the upper, and then operably coupling the upper and affixed rand with the sole structure. In an aspect, the method includes operably coupling the upper and the sole structure, and then affixing the rand to the upper, the sole structure, or both.

In some aspects, the method may include coating or printing the rand directly onto the surface of the upper, the surface of the plate, or both. In an aspect, the method may include (i) increasing a temperature of the rand polymeric material to a first temperature above a melting or softening point of the rand polymeric material, (ii) extruding or printing the rand polymeric material onto a target location on the upper and/or the plate while the rand polymeric material is at the first temperature, and (iii) keeping the rand polymeric material in contact with the upper and/or plate while decreasing the temperature of the rand polymeric material to a second temperature below the melting or softening point of the rand polymeric material forming a mechanical bond between the rand polymeric material and the upper and/or plate.

In some aspects the method may include providing an additional material, such as a textile or film layer, between the rand and the upper, the surface of the plate, or both, to improve the bonding of the rand.

In some aspects, affixing the rand to the plate can include (i) increasing a temperature of the first polyolefin resin composition of the plate to a first temperature above a melting or softening point of the first polyolefin resin composition, (ii) contacting the plate and the rand while the first polyolefin resin composition is at the first temperature, and (iii) keeping the plate and the rand in contact with each other while decreasing the temperature of the first polyolefin resin composition to a second temperature below the melting or softening point of the first polyolefin resin composition, forming a mechanical bond between the plate and the rand. Where the plate has an edge portion, the method may comprise affixing the rand to the edge portion which can include (i) increasing a temperature of the second resin composition to a first temperature above a melting or softening point of the second resin composition, (ii) contacting the edge portion and the rand while the second resin composition is at the first temperature, and (iii) keeping the edge portion and the rand in contact with each other while decreasing the temperature of the second resin composition to a second temperature below the melting or softening point of the second resin composition, forming a mechanical bond between the plate and the rand.

In yet other aspects, affixing the rand to the edge portion and/or the plate can alternatively or additionally include (i) increasing a temperature of the first polyolefin resin composition to a first temperature above a melting or softening point of the first polyolefin resin composition, (ii) contacting the plate and the rand while the first polyolefin resin composition is at the first temperature, and (iii) keeping the plate and the rand in contact with each other while decreasing the temperature of the first polyolefin resin composition to a second temperature below the melting or softening point of the first polyolefin resin composition, forming a mechanical bond between the plate and the rand. As a further example, affixing the rand to the edge portion can include (i) increasing a temperature of the second resin composition to a first temperature above a melting or softening point of the second resin composition, (ii) contacting the edge portion and the rand while the second resin composition is at the first temperature, and (iii) keeping the edge portion and the rand in contact with each other while decreasing the temperature of the second resin composition to a second temperature below the melting or softening point of the second resin composition, forming a mechanical bond between the edge portion and the rand.

In other aspects, affixing the rand to the plate, the upper or both can alternatively or additionally include (i) increasing a temperature of the rand polymeric material to a first temperature above a melting or softening point of the rand polymeric material, (ii) contacting the rand to the upper and/or the plate while the rand polymeric material is at the first temperature, and (iii) keeping the rand in contact with the upper and/or plate while decreasing the temperature of the rand polymeric material to a second temperature below the melting or softening point of the rand polymeric material forming a mechanical bond between the rand polymeric material and the upper and/or plate.

In some aspects, the method includes decorating the edge portion, the optional rand, or both. The method can include providing a sole structure with an edge portion having one or more decorative elements, providing a rand with one or more decorative elements, or both. The decorative elements can include printing or coloring, or both. The method can include printing or coloring the edge portion, the rand, or both, to provide the decorative elements. The method can include providing one or more separate components, such as a film or textile having printing or coloring, and coupling the separate component to an externally-facing or internally-facing surface of the edge portion, the rand, or both, to provide the decorative elements.

In some aspects, the method includes texturizing a target surface of the edge portion, the rand, or both. The texturizing may include molding or printing the edge portion, the rand, or both so that it has a textured surface. The texturizing may include embossing or debossing a surface of the edge portion, the rand, or both to provide a textured surface.

Property Analysis and Characterization Procedure

Cold Ross Flex Test Protocol

The cold Ross flex test is determined according the following test method. The purpose of this test is to evaluate the resistance to cracking of a sample under repeated flexing to 60 degrees in a cold environment. A thermoformed plaque of the material for testing is sized to fit inside the flex tester machine. Each material is tested as five separate samples. The flex tester machine is capable of flexing samples to 60 degrees at a rate of 100 plus or minus 5 cycles per minute. The mandrel diameter of the machine is 10 millimeters. Suitable machines for this test are the Emerson AR-6, the Satra STM 141F, the Gotech GT-7006, and the Shin II Scientific SI-LTCO (DaeSung Scientific). The sample(s) are inserted into the machine according to the specific parameters of the flex machine used. The machine is placed in a freezer set to −6 degrees Celsius for the test. The motor is turned on to begin flexing with the flexing cycles counted until the sample cracks. Cracking of the sample means that the surface of the material is physically split. Visible creases of lines that do not actually penetrate the surface are not cracks. The sample is measured to a point where it has cracked but not yet broken in two.

Abrasion Loss Test Protocol ASTM D 5963-97a

Abrasion loss is tested on cylindrical test pieces with a diameter of 16 plus or minus 0.2 millimeter and a minimum thickness of 6 millimeters cut from sheets using an ASTM standard hole drill. The abrasion loss is measured using Method B of ASTM D 5963-97a on a Gotech GT-7012-D abrasion test machine. The tests are performed as 22 degrees Celsius with an abrasion path of 40 meters. The Standard Rubber #1 used in the tests has a density of 1.336 grams per cubic centimeter ($g/cm^3$). The smaller the abrasion loss volume, the better the abrasion resistance.

Mud Pull Off Test Protocol

A two-inch diameter material sample is cut and affixed to the top plate of a set of parallel, flat aluminum test plates on a standard mechanical testing machine (e.g. Instron tensile testing equipment.) A 1-inch diameter mud sample, approximately 7 millimeters in height is loaded onto the bottom plate of the mechanical tester. The soil used to make the mud is commercially available under the tradename "TIMBERLINE TOP SOIL", model 50051562, from Timberline (subsidiary of Old Castle, Inc., Atlanta, Ga.) and was sifted with a square mesh with a pore dimension of 1.5 millimeter on each side. The mud was previously dried and then diluted to water to 22 percent water by weight. The force transducers are normalized to zero force. The plates are then pressed together to a load of 445 Newtons in the compressive direction. The load is then immediately removed and a small force hysteresis is measured at the mud detachment point that is greater than the tared value of zero in the tensile direction. The maximum force measured is the pull off force for the mud adhesion to the material substrate. The compression/detachment cycle is repeated at least 10 times until a stable value is obtained.

Crystallinity Test Protocol

To determine percent crystallinity of a resin composition including a copolymer, or of the copolymer in neat resin form and of a homopolymer of the main component of the copolymer (e.g., polypropylene homopolymer polypropylene), samples are analyzed by differential scanning calorimetry (DSC) over the temperature range from −80 degrees Celsius to 250 degrees Celsius. A heating rate of 10 degrees Celsius per minute is used. The melting endotherm is measured for each sample during heating. Universal Analysis software (TA Instruments, New Castle, Del., USA) is used to calculate percent crystallinity (% crystallinity) based upon the melting endotherm for the homopolymer (e.g., 207 Joules per gram for 100 percent crystalline polypropylene material). Specifically, the percent crystallinity (% crystallinity) is calculated by dividing the melting endotherm measured for the copolymer or for the resin composition by the 100 percent crystalline homopolymer melting endotherm.

Creep Relation Temperature $T_{cr}$ Test Protocol

The creep relation temperature $T_{cr}$ is determined according to the exemplary techniques described in U.S. Pat. No. 5,866,058. The creep relaxation temperature $T_{cr}$ is calculated to be the temperature at which the stress relaxation modulus of the tested material is 10 percent relative to the stress relaxation modulus of the tested material at the solidification temperature of the material, where the stress relaxation modulus is measured according to ASTM E328-02. The solidification temperature is defined as the temperature at which there is little to no change in the stress relaxation modulus or little to no creep about 300 seconds after a stress is applied to a test material, which can be observed by plotting the stress relaxation modulus (in Pa) as a function of temperature (in degrees Celsius).

Vicat Softening Temperature $T_{vs}$ Test Protocol

The Vicat softening temperature $T_{vs}$ is be determined according to the test method detailed in ASTM D1525-09 Standard Test Method for Vicat Softening Temperature of Plastics, preferably using Load A and Rate A. Briefly, the Vicat softening temperature is the temperature at which a flat-ended needle penetrates the specimen to the depth of 1 millimeter under a specific load. The temperature reflects the point of softening expected when a material is used in an elevated temperature application. It is taken as the temperature at which the specimen is penetrated to a depth of 1 millimeter by a flat-ended needle with a 1 square millimeter circular or square cross-section. For the Vicat A test, a load of 10 Newtons is used, whereas for the Vicat B test, the load is 50 Newtons. The test involves placing a test specimen in the testing apparatus so that the penetrating needle rests on its surface at least 1 millimeter from the edge. A load is applied to the specimen per the requirements of the Vicat A or Vicat B test. The specimen is then lowered into an oil bath at 23 degrees Celsius. The bath is raised at a rate of 50 degrees Celsius or 120 degrees Celsius per hour until the needle penetrates 1 millimeter. The test specimen must be between 3 and 6.5 millimeter thick and at least 10 millimeter in width and length. No more than three layers can be stacked to achieve minimum thickness.

Heat Deflection Temperature $T_{hd}$ Test Protocol

The heat deflection temperature $T_{hd}$ is be determined according to the test method detailed in ASTM D648-16 Standard Test Method for Deflection Temperature of Plastics Under Flexural Load in the Edgewise Position, using a 0.455 megapascals (MPa) applied stress. Briefly, the heat deflection temperature is the temperature at which a polymer or plastic sample deforms under a specified load. This property of a given plastic material is applied in many aspects of product design, engineering, and manufacture of products using thermoplastic components. In the test method, the bars are placed under the deflection measuring device and a load (0.455 megapascals) of is placed on each specimen. The specimens are then lowered into a silicone oil bath where the temperature is raised at 2 degrees Celsius per minute until they deflect 0.25 millimeter per ASTM D648-16. ASTM uses a standard bar 5 inches×½ inch×¼ inch. ISO edgewise testing uses a bar 120 millimeters×10 millimeters×4 millimeters. ISO flatwise testing uses a bar 80 millimeters×10 millimeters×4 millimeters.

Melting Temperature, $T_m$, and Glass Transition Temperature, $T_g$ Test Protocol The melting temperature $T_m$ and glass transition temperature $T_g$ are determined using a commercially available Differential Scanning calorimeter ("DSC") in accordance with ASTM D3418-97. Briefly, a 10-15 gram sample is placed into an aluminum DSC pan and then the lead was sealed with the crimper press. The DSC is configured to scan from −100 degrees Celsius to 225 degrees Celsius with a 20 degrees Celsius per minute heating rate, hold at 225 degrees Celsius for 2 minutes, and then cool down to 25 degrees Celsius at a rate of −10 degrees Celsius/minute. The DSC curve created from this scan is then analyzed using standard techniques to determine the glass transition temperature $T_g$ and the melting temperature $T_m$.

Melt Flow Index Test Protocol

The melt flow index is determined according to the test method detailed in ASTM D1238-13 Standard Test Method for Melt Flow Rates of Thermoplastics by Extrusion Plastometer, using Procedure A described therein. Briefly, the melt flow index measures the rate of extrusion of thermoplastics through an orifice at a prescribed temperature and load. In the test method, approximately 7 grams of the material is loaded into the barrel of the melt flow apparatus, which has been heated to a temperature specified for the material. A weight specified for the material is applied to a plunger and the molten material is forced through the die. A timed extrudate is collected and weighed. Melt flow rate values are calculated in grams per 10 minutes. Alternatively, melt flow index can be determined using International Standard ISO1133 Determination of the Melt Mass-Flow Rate (MFR) and Melt Volume-Flow Rate (MVR) of Thermoplastics using Procedure A described therein, at 190 degrees Celsius and a load of 2.16 kilograms.

Durometer Hardness Test Protocol

The hardness of a material is determined according to the test method detailed in ASTM D-2240 Durometer Hardness, using a Shore A scale.

Flexural Modulus Test Protocol

The flexural modulus (modulus of elasticity) for material is determined according to the test method detailed in ASTM D790. The modulus is calculated by taking the slope of the stress (megapascals) versus the strain in the steepest initial straight-line portion of the load-deflection curve.

Modulus Test Protocol

The (tensile) modulus for a material is determined according to the test method detailed in ASTM D412-98 Standard Test Methods for Vulcanized Rubber and Thermoplastic Rubbers and Thermoplastic Elastomers-Tension, with the following modifications. The sample dimension is the ASTM D412-98 Die C, and the sample thickness used is 2.0 millimeters plus or minus 0.5 millimeters. The grip type used is a pneumatic grip with a metal serrated grip face. The grip distance used is 75 millimeters. The loading rate used is 500 millimeters per minute. The modulus (initial) is calculated by taking the slope of the stress (megapascals) versus the strain in the initial linear region.

Enthalpy of Melting Test Protocol

The enthalpy of melting is determined by the following method. A 5 to 10 milligram sample of a material is weighed to determine the sample mass, is placed into an aluminum DSC pan, and then the lid of the DSC pan is sealed using a crimper press. The DSC is configured to scan from −100 degrees Celsius to 225 degrees Celsius with a 20 degrees Celsius per minute heating rate, hold at 225 degrees Celsius for 2 minutes, and then cool down to room temperature (e.g., 25 degrees Celsius) at a rate of −10 degrees Celsius per minute. The enthalpy of melting is calculated by integrating the area of the melting endotherm peak and normalizing by the sample mass.

Water Uptake Capacity Test Protocol

This test measures the water uptake capacity of a material after a predetermined soaking duration for a sample. The sample is initially dried at 60 degrees Celsius until there is no weight change for consecutive measurement intervals of at least 30 minutes apart (e.g., a 24-hour drying period at 60 degrees Celsius is typically a suitable duration). The total weight of the dried sample ($Wt_{sample\ dry}$) is then measured in grams. The dried sample is allowed to cool down to 25 degrees Celsius, and is fully immersed in a deionized water bath maintained at 25 degrees Celsius. After a given soaking duration, the sample is removed from the deionized water bath, blotted with a cloth to remove surface water, and the total weight of the soaked sample t ($Wt_{sample\ wet}$) is measured in grams.

Any suitable soaking duration can be used, where a 24-hour soaking duration is believed to simulate saturation conditions for a material (i.e., a hydrophilic resin will be in its saturated state). Accordingly, as used herein, the expression "having a water uptake capacity at 5 minutes" refers to a soaking duration of 5 minutes, the expression "having a water uptake capacity at 1 hour" refers to a soaking duration of 1 hour, the expression "having a water uptake capacity at 24 hours" refers to a soaking duration of 24 hours, and the like. If no time duration is indicated after a water uptake capacity value, the soaking duration corresponds to a period of 24 hours.

As can be appreciated, the total weight of a sample includes the weight of the material as dried or soaked t ($Wt_{sample\ dry}$ or $Wt_{sample\ wet}$) and the weight of the substrate ($Wt_{substrate}$) needs to be subtracted from the sample measurements.

The weight of the substrate ($Wt_{substrate}$) is calculated using the sample surface area (e.g., $4.0\ cm^2$), an average measured thickness of the material, and the average density of the material. Alternatively, if the density of the material for the substrate is not known or obtainable, the weight of the substrate ($Wt_{substrate}$) is determined by taking a second sample using the same sampling procedure as used for the primary sample, and having the same dimensions (surface area and film/substrate thicknesses) as the primary sample. The material of the second sample is then cut apart from the substrate of the second sample with a blade to provide an isolated substrate. The isolated substrate is then dried at 60 degrees Celsius for 24 hours, which can be performed at the same time as the primary sample drying. The weight of the isolated substrate ($Wt_{substrate}$) is then measured in grams.

The resulting substrate weight ($Wt_{substrate}$) is then subtracted from the weights of the dried and soaked primary sample t ($Wt_{sample\ dry}$ or $Wt_{sample\ wet}$) to provide the weights of the material as dried and soaked t ($Wt_{component\ dry}$ or $Wt_{component\ wet}$) as depicted by Equations 1 and 2.

$$Wt_{component\ dry} = Wt_{sample\ dry} - Wt_{substrate} \quad (Eq.\ 1)$$

$$Wt_{component\ wet} = Wt_{sample\ wet} - Wt_{substrate} \quad (Eq.\ 2)$$

The weight of the dried component t ($Wt_{component\ dry}$) is then subtracted from the weight of the soaked component t ($Wt_{component\ wet}$) to provide the weight of water that was taken up by the component, which is then divided by the weight of the dried component t ($Wt_{component\ dry}$) to provide the water uptake capacity for the given soaking duration as a percentage, as depicted below by Equation 3.

$$\text{Water Uptake Capacity} = \frac{Wt_{component\ wet} - Wt_{component\ dry}}{Wt_{component\ dry}} (100\ \text{percent}) \quad (Eq.\ 3)$$

For example, a water uptake capacity of 50 percent at 1 hour means that the soaked component weighed 1.5 times more than its dry-state weight after soaking for 1 hour. Similarly, a water uptake capacity of 500 percent at 24 hours means that the soaked component weighed 5 times more than its dry-state weight after soaking for 24 hours.

Water Uptake Rate Test Protocol

This test measures the water uptake rate of a material by modeling weight gain as a function of soaking time for a sample with a one-dimensional diffusion model. The sample is dried at 60 degrees Celsius until there is no weight change for consecutive measurement intervals of at least 30 minutes apart (a 24-hour drying period at 60 degrees Celsius is typically a suitable duration). The total weight of the dried sample ($Wt_{sample\ dry}$) is then measured in grams. Additionally, the average thickness of the component for the dried sample is measured for use in calculating the water uptake rate, as explained below.

The dried sample is allowed to cool down to 25 degrees Celsius, and is fully immersed in a deionized water bath maintained at 25 degrees Celsius. Between soaking durations of 1, 2, 4, 9, 16, and 25 minutes, the sample is removed from the deionized water bath, blotted with a cloth to remove surface water, and the total weight of the soaked sample t ($Wt_{sample\ wet}$) is measured, where "t" refers to the particular soaking-duration data point (e.g., 1, 2, 4, 9, 16, or 25 minutes).

The exposed surface area of the soaked sample is also measured with calipers for determining the specific weight gain, as explained below. The exposed surface area refers to the surface area that comes into contact with the deionized water when fully immersed in the bath. For samples obtained using the Component Sampling Procedure, the samples only have one major surface exposed. For convenience, the surface areas of the peripheral edges of the sample are ignored due to their relatively small dimensions.

The measured sample is fully immersed back in the deionized water bath between measurements. The 1, 2, 4, 9, 16, and 25 minute durations refer to cumulative soaking durations while the sample is fully immersed in the deionized water bath (i.e., after the first minute of soaking and first measurement, the sample is returned to the bath for one more minute of soaking before measuring at the 2-minute mark).

As discussed above in the Water Uptake Capacity Test, the total weight of a sample includes the weight of the material as dried or soaked t ($Wt_{component\ wet}$ or $Wt_{component\ dry}$) and the weight of the article or backing substrate ($Wt_{substrate}$). In order to determine a weight change of the material due to water uptake, the weight of the substrate ($Wt_{substrate}$) needs to be subtracted from the sample weight measurements. This can be accomplished using the same steps discussed above in the Water Uptake Capacity Test to provide the resulting material weights $Wt_{component\ wet}$ and $Wt_{component\ dry}$ for each soaking-duration measurement.

The specific weight gain ($Ws_t$) from water uptake for each soaked sample is then calculated as the difference between the weight of the soaked sample ($Wt_{component\ wet}$) and the weight of the initial dried sample t ($Wt_{component\ dry}$) where the resulting difference is then divided by the exposed surface area of the soaked sample ($A_t$) as depicted in Equation 4.

$$(Ws_t) = \frac{Wt_{component\ wet} - Wt_{component\ dry}}{A_t} \quad (Eq.\ 4)$$

where t refers to the particular soaking-duration data point (e.g., 1, 2, 4, 9, 16, or 25 minutes), as mentioned above.

The water uptake rate for the material is then determined as the slope of the specific weight gains ($Ws_t$) versus the square root of time (in minutes), as determined by a least squares linear regression of the data points. For the material, the plot of the specific weight gains ($Ws_t$) versus the square root of time (in minutes) provides an initial slope that is substantially linear (to provide the water uptake rate by the linear regression analysis). However, after a period of time depending on the thickness of the component, the specific weight gains will slow down, indicating a reduction in the water uptake rate, until the saturated state is reached. This is believed to be due to the water being sufficiently diffused throughout the material as the water uptake approaches saturation, and will vary depending on component thickness.

As such, for the component having an average thickness (as measured above) less than 0.3 millimeters, only the specific weight gain data points at 1, 2, 4, and 9 minutes are used in the linear regression analysis. In these cases, the data points at 16 and 25 minutes can begin to significantly diverge from the linear slope due to the water uptake approaching saturation, and are omitted from the linear regression analysis. In comparison, for the component having an average dried thickness (as measured above) of 0.3 millimeters or more, the specific weight gain data points at 1, 2, 4, 9, 16, and 25 minutes are used in the linear regression analysis. The resulting slope defining the water uptake rate for the sample has units of weight per (surface area-square root of time), such as grams per (meter$^2$-minutes$^{1/2}$) or g/m$^2$/√min.

Furthermore, some surfaces can create surface phenomenon that quickly attract and retain water molecules (e.g., via surface hydrogen bonding or capillary action) without actually drawing the water molecules into the film or substrate. Thus, samples of these films or substrates can show rapid specific weight gains for the 1-minute sample, and possibly for the 2-minute sample. After that, however, further weight gain is negligible. As such, the linear regression analysis is only applied if the specific weight gain in data points at 1, 2, and 4 minutes continue to show an increase in water uptake. If not, the water uptake rate under this test methodology is considered to be about zero g/m$^2$/√min.

Water Cycling Test Protocol

This test measures the water uptake capacity (or loss thereof) of a material over successive soaking cycles. A sample having a surface area of 4 square centimeters is dried at 60 degrees Celsius until there is no weight change for consecutive measurement intervals of at least 30 minutes apart (a 24-hour drying period at 60 degrees Celsius is typically a suitable duration). The total weight of the dried sample ($W_{,sample\ dry}$) is then measured in grams. Additionally, the average thickness of the component for the dried sample is measured.

The dried sample is allowed to cool down to 25 degrees Celsius, and is fully immersed in a deionized water bath maintained at 25 degrees Celsius for a duration of 24 hours. After soaking, the sample is removed from the deionized water bath, blotted with a cloth to remove surface water, and the total weight of the soaked sample ($W_{n,sample\ wet}$) is measured, where "n" refers to the particular soaking cycle data point (e.g., 1, 2, 4, 9, 16, or 25 cycles). The soaked sample is then dried at 60 degrees Celsius until there is no weight change for consecutive measurement intervals of at least 30 minutes apart. One cycle is considered to be one iteration of the soaking and drying step.

The sample is submitted to 1 or more successive cycles, during which the $W_{n,sample\ wet}$ is measured for each cycle.

A water cycling weight loss is measured as the percentage loss in $W_{n,sample\ wet}$ over the successive cycles. For example, the water cycling weight loss may be calculated as follows:

$$\text{Water Cycle Weight Loss (\%)} = \frac{(W_{1,sample\ wet} - W_{n,sample\ wet})}{(W_{1,sample\ wet})} \times 100 \quad \text{(Eq. 5)}$$

A water cycling weight loss of 15 percent means that a sample absorbs 15 percent less water (by weight) on the last cycle than on the first cycle, or that the sample has released 15 percent (by weight) of one or more materials present in the sample. For example, hydrogel material may migrate out of the sample during a soaking cycle, and may be visible in the water bath.

Swelling Capacity Test Protocol

This test measures the swelling capacity of a material in terms of increases in thickness and volume after a given soaking duration for a sample. The sample is initially dried at 60 degrees Celsius until there is no weight change for consecutive measurement intervals of at least 30 minutes apart (a 24-hour drying period is typically a suitable duration). The dimensions of the dried sample are then measured (e.g., thickness, length, and width for a rectangular sample; thickness and diameter for a circular sample, etc.). The dried sample is then fully immersed in a deionized water bath maintained at 25 degrees Celsius. After a given soaking duration, the sample is removed from the deionized water bath, blotted with a cloth to remove surface water, and the same dimensions for the soaked sample are re-measured.

Any suitable soaking duration can be used. Accordingly, as used herein, the expression "having a swelling thickness (or volume) increase at 5 minutes of." refers to a soaking duration of 5 minutes, the expression "having a swelling thickness (or volume) increase at 1 hour of" refers to a test duration of 1 hour, the expression "having a swelling thickness (or volume) increase at 24 hours of" refers to a test duration of 24 hours, and the like.

The swelling of the component is determined by (1) an increase in the thickness between the dried and soaked component, by (2) an increase in the volume between the dried and soaked component, or (3) both. The increase in thickness between the dried and soaked components is calculated by subtracting the measured thickness of the initial dried component from the measured thickness of the soaked component. Similarly, the increase in volume between the dried and soaked components is calculated by subtracting the measured volume of the initial dried component from the measured volume of the soaked component. The increases in the thickness and volume can also be represented as percentage increases relative to the dry thickness or volume, respectively.

Contact Angle Test Protocol

This test measures the contact angle of a material based on a static sessile drop contact angle measurement for a sample. The contact angle refers to the angle at which a liquid interface meets a solid surface, and is an indicator of how hydrophilic the surface is.

For a dry test (i.e., to determine a dry-state contact angle), the sample is initially equilibrated at 25 degrees Celsius and 20 percent humidity for 24 hours. For a wet test (i.e., to determine a wet-state contact angle), the sample is fully immersed in a deionized water bath maintained at 25 degrees Celsius for 24 hours. After that, the sample is removed from the bath and blotted with a cloth to remove surface water, and clipped to a glass slide if needed to prevent curling.

The dry or wet sample is then placed on a moveable stage of a contact angle goniometer, such as those commercially available under the tradename "RAME-HART F290" from Rame-Hart Instrument Co., Succasunna, N.J. A 10-microliter droplet of deionized water is then placed on the sample using a syringe and automated pump. An image is then immediately taken of the droplet (before film can take up the droplet), and the contact angle of both edges of the water droplet are measured from the image. The decrease in contact angle between the dried and wet samples is calculated by subtracting the measured contact angle of the wet material from the measured contact angle of the dry material.

Coefficient of Friction Test Protocol

This test measures the coefficient of friction of the Coefficient of Friction Test for a sample. For a dry test (i.e., to determine a dry-state coefficient of friction), the sample is initially equilibrated at 25 degrees Celsius and 20 percent humidity for 24 hours. For a wet test (i.e., to determine a wet-state coefficient of friction), the sample is fully immersed in a deionized water bath maintained at 25 degrees Celsius for 24 hours. After that, the sample is removed from the bath and blotted with a cloth to remove surface water.

The measurement is performed with an aluminum sled mounted on an aluminum test track, which is used to perform a sliding friction test for test sample on an aluminum surface of the test track. The test track measures 127 millimeters wide by 610 millimeters long. The aluminum sled measures 76.2 millimeters·times·76.2 millimeters, with a 9.5 millimeter radius cut into the leading edge. The contact area of the aluminum sled with the track is 76.2 millimeters× 66.6 millimeters, or 5,100 square millimeters).

The dry or wet sample is attached to the bottom of the sled using a room temperature-curing two-part epoxy adhesive, commercially available under the tradename "LOCTITE 608" from Henkel, Dusseldorf, Germany. The adhesive is used to maintain the planarity of the wet sample, which can curl when saturated. A polystyrene foam having a thickness of about 25.4 millimeters is attached to the top surface of the sled (opposite of the test sample) for structural support.

The sliding friction test is conducted using a screw-driven load frame. A tow cable is attached to the sled with a mount supported in the polystyrene foam structural support, and is wrapped around a pulley to drag the sled across the aluminum test track. The sliding or frictional force is measured using a load transducer with a capacity of 2,000 Newtons. The normal force is controlled by placing weights on top of the aluminum sled, supported by the polystyrene foam structural support, for a total sled weight of 20.9 kilograms (205 Newtons). The crosshead of the test frame is increased at a rate of 5 millimeters per second, and the total test displacement is 250 millimeters. The coefficient of friction is calculated based on the steady-state force parallel to the direction of movement required to pull the sled at constant velocity. The coefficient of friction itself is found by dividing the steady-state pull force by the applied normal force. Any transient value relating static coefficient of friction at the start of the test is ignored.

Storage Modulus Test Protocol

This test measures the resistance of a material to being deformed (ratio of stress to strain) when a vibratory or oscillating force is applied to it, and is a good indicator of film compliance in the dry and wet states. For this test, a sample is provided having a surface area with dimensions of 5.35 millimeters wide and 10 millimeters long. The material thickness can range from 0.1 millimeters to 2 millimeters, and the specific range is not particularly limited as the end modulus result is normalized according to material thickness.

The storage modulus (E') with units of megaPascals (MPa) of the sample is determined by dynamic mechanical analysis (DMA) using a DMA analyzer, such as a commercially available analyzer sold under the tradename "Q800 DMA ANALYZER" from TA Instruments, New Castle, Del., which is equipped with a relative humidity accessory to maintain the sample at constant temperature and relative humidity during the analysis.

Initially, the thickness of the test sample is measured using calipers (for use in the modulus calculations). The test sample is then clamped into the DMA analyzer, which is operated at the following stress/strain conditions during the analysis: isothermal temperature of 25 degrees Celsius, frequency of 1 Hertz, strain amplitude of 10 micrometers, preload of 1 Newton, and force track of 125 percent. The DMA analysis is performed at a constant 25 degrees Celsius temperature according to the following time/relative humidity (RH) profile: (i) 0 percent relative humidity for 300 minutes (representing the dry state for storage modulus determination), (ii) 50 percent relative humidity for 600 minutes, (iii) 90 percent relative humidity for 600 minutes (representing the wet state for storage modulus determination), and (iv) 0 percent relative humidity for 600 minutes.

The E' value (in megapascals) is determined from the DMA curve according to standard DMA techniques at the end of each time segment with a constant RH value. Namely, the E' value at 0 percent relative humidity (i.e., the dry-state storage modulus) is the value at the end of step (i), the E' value at 50 percent relative humidity is the value at the end of step (ii), and the E' value at 90 percent relative humidity (i.e., the wet-state storage modulus) is the value at the end of step (iii) in the specified time/relative humidity profile.

The material can be characterized by its dry-state storage modulus, its wet-state storage modulus, or the reduction in storage modulus between the dry-state and wet-state materials, where wet-state storage modulus is less than the dry-state storage modulus. This reduction in storage modulus can be listed as a difference between the dry-state storage modulus and the wet-state storage modulus, or as a percentage change relative to the dry-state storage modulus.

Glass Transition Temperature Test Protocol

This test measures the glass transition temperature ($T_g$) of a sample of material with a 10-milligram sample weight. The sample is measured in both a dry state and a wet state (i.e., after exposure to a humid environment as described herein).

The glass transition temperature is determined with DMA using a DMA analyzer, such as an analyzer commercially available under the tradename "Q2000 DMA ANALYZER" from TA Instruments, New Castle, Del., which is equipped with aluminum hermetic pans with pinhole lids. The sample chamber is purged with 50 milliliters per minute of nitrogen gas during analysis. Samples in the dry state are prepared by holding at 0 percent relative humidity until constant weight (less than 0.01 percent weight change over 120 minute period). Samples in the wet state are prepared by conditioning at a constant 25 degrees Celsius according to the following time/relative humidity (RH) profile: (i) 250 minutes at 0 percent relative humidity, (ii) 250 minutes at 50 percent relative humidity, and (iii) 1,440 minutes at 90 percent relative humidity. Step (iii) of the conditioning program can be terminated early if sample weight is measured during conditioning and is measured to be substantially constant within 0.05 percent during an interval of 100 minutes.

After the sample is prepared in either the dry or wet state, it is analyzed by DSC to provide a heat flow versus temperature curve. The DSC analysis is performed with the following time/temperature profile: (i) equilibrate at −90 degrees Celsius for 2 minutes, (ii) ramp at +10 degrees Celsius per minute to 250 degrees Celsius, (iii) ramp at −50 degrees Celsius per minute to −90 degrees Celsius, and (iv) ramp at +10 degrees Celsius per minute to 250 degrees Celsius. The glass transition temperature value (in Celsius) is determined from the DSC curve according to standard DSC techniques.

Sampling Procedures

Using the Test Protocols described above, various properties of the materials disclosed herein and components and articles formed therefrom can be characterized using samples prepared with the following sampling procedures:

Neat Material Sampling Procedure

A material sampling procedure can be used to obtain a neat sample of a polymeric material or resin composition or, in some instances, a sample of a material used to form a polymeric material or resin composition. The material is provided in media form, such as flakes, granules, powders, pellets, and the like. If a source of the polymeric material or resin composition is not available in a neat form, the sample can be cut from a plate or other component containing the polymeric material or resin composition, thereby isolating a sample of the material.

Plaque Sampling Procedure

A sample of polymeric material is prepared, for example, a polyolefin resin is combined with the effective amount of the polymeric resin modifier along with any additional components to form the resin composition A portion of the polymeric material or resin composition is then molded into a plaque sized to fit the testing apparatus. For example, when using a Ross flexing tester, the plaque is sized to fit inside the Ross flexing tester used, the plaque having dimensions of about 15 centimeters (cm) by 2.5 centimeters (cm) and a thickness of about 1 millimeter (mm) to about 4 millimeter (mm) by thermoforming the polymeric material in a mold. The sample is prepared by mixing the components of the polymeric material together, melting the components, pouring or injecting the melted composition into the mold cavity, cooling the melted composition to solidify it in the mold cavity to form the plaque, and then removing the solid plaque from the mold cavity.

Component Sampling Procedure

This procedure can be used to obtain a sample of a material from a component of an article of footwear or an article of footwear. A sample including the material in a non-wet state (e.g., at 25 degrees Celsius and 20 percent relative humidity) is cut from the article of footwear or component of an article of footwear using a blade. If the material is bonded to one or more additional materials, the procedure can include separating the additional materials from the material to be texted. For example, to test a material on a bottom surface of an outsole, the outsole top surface can be skinned, abraded, scraped, or otherwise cleaned to remove any upper adhesives, yarns, fibers, foams, and the like which are affixed to the material to be tested. The resulting sample includes the material and may include any additional materials bonded to the material.

This procedure can be used to obtain a sample of the hydrogel material when the hydrogel material is incorporated as a layer of the sole structure of an article of footwear (e.g., bonded to materials such as second polymeric material and/or other materials). The resulting sole structure component sample includes the hydrogel material and any article substrate bonded to the hydrogel material, and maintains the interfacial bond between the hydrogel material and the associated backing materials of the finished article. As such, any test using a Component Sampling Procedure can simulate how the hydrogel material will perform as part of an article of footwear. Additionally, this type of sample is also useful in cases where the interfacial bond between the hydrogel material and the backing materials is less defined, such as where the hydrogel material of the outsole is highly diffused into the backing materials of the finished article (e.g., with a concentration gradient).

The sample is taken at a location along the article of footwear or component that provides a substantially constant material thickness for the material as present on the article of footwear (within plus or minus 10 percent of the average material thickness), such as in a forefoot region, midfoot region, or a heel region of an outsole. For many of the test protocols described above, a sample having a surface area of 4 square centimeters ($cm^2$) is used. The sample is cut into a size and shape (e.g., a dogbone-shaped sample) to fit into the testing apparatus. In cases where the material is not present on the article of footwear or component in any segment having a 4 square centimeter surface area and/or where the material thickness is not substantially constant for a segment having a 4 square centimeter surface area, sample sizes with smaller cross-sectional surface areas can be taken and the area-specific measurements are adjusted accordingly.

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

All publications, patents, and patent applications cited in this specification are cited to disclose and describe the methods and/or materials in connection with which the publications are cited. All such publications, patents, and patent applications are herein incorporated by references as if each individual publication or patent were specifically and individually indicated to be incorporated by reference. Such incorporation by reference is expressly limited to the methods and/or materials described in the cited publications, patents, and patent applications and does not extend to any lexicographical definitions from the cited publications, patents, and patent applications. Any lexicographical definition in the publications, patents, and patent applications cited that is not also expressly repeated in the instant specification should not be treated as such and should not be read as defining any terms appearing in the accompanying claims.

Although any methods and materials similar or equivalent to those described herein can also be used in the practice or testing of the present disclosure, the preferred methods and materials are now described. Functions or constructions well-known in the art may not be described in detail for brevity and/or clarity. Aspects of the present disclosure will employ, unless otherwise indicated, techniques of nanotechnology, organic chemistry, material science and engineering and the like, which are within the skill of the art. Such techniques are explained fully in the literature.

It should be noted that ratios, concentrations, amounts, and other numerical data can be expressed herein in a range format. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'". It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1 percent to 5 percent" should be interpreted to include not only the explicitly recited values of about 0.1 percent to about 5 percent, but also include individual values (e.g., 1 percent, 2 percent, 3 percent, and 4 percent) and the sub-ranges (e.g., 0.5 percent, 1.1 percent, 2.4 percent, 3.2 percent, and 4.4 percent) within the indicated range.

The term "providing," as used herein and as recited in the claims, is not intended to require any particular delivery or receipt of the provided item. Rather, the term "providing" is merely used to recite items that will be referred to in subsequent elements of the claim(s), for purposes of clarity and ease of readability.

The terms and phrases used herein to refer to sampling procedures and test protocols, for example, "Neat Material Sampling Procedure", "Plaque Sampling Procedure", "Cold Ross Flex Test", "ASTM D 5963-97a", "CrystallinityTest", and the like refer to the respective sampling procedures and test methodologies described in the Property Analysis and Characterization Procedure section. These sampling procedures and test methodologies characterize the properties of the recited materials, films, articles and components, and the like, and are not required to be performed as active steps in the claims.

The term "about," as used herein, can include traditional rounding according to significant figures of the numerical value. In some aspects, the term about is used herein to mean a deviation of 10 percent, 5 percent, 2.5 percent, 1 percent, 0.5 percent, 0.1 percent, 0.01 percent, or less from the specified value.

The articles "a" and "an," as used herein, mean one or more when applied to any feature in aspects of the present disclosure described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The term "heteroalkyl" as used herein refers to an alkyl group containing at least one heteroatom. Suitable heteroatoms include, but are not limited to, O, N, Si, P and S, wherein the nitrogen, phosphorous and sulfur atoms are optionally oxidized, and the nitrogen heteroatom is optionally quaternized.

A random copolymer of propylene with about 2.2 percent by weight (wt. percent) ethylene is commercially available under the tradename "PP9054" from ExxonMobil Chemical Company, Houston, Tex. It has an MFR (ASTM-1238D, 2.16 kilograms, 230 degrees Celsius.) of about 12 grams per 10 minutes and a density of 0.90 grams per cubic centimeter ($g/cm^3$).

PP9074 is a random copolymer of propylene with about 2.8 percent by weight (wt. percent) ethylene and is commercially available under the tradename "PP9074" from ExxonMobil Chemical Company, Houston, Tex. It has an MFR (ASTM-1238D, 2.16 kilograms, 230 degrees Celsius.) of about 24 grams per 10 minutes and a density of 0.90 grams per cubic centimeter ($g/cm^3$).

PP1024E4 is a propylene homopolymer commercially available under the tradename "PP1024E4" from ExxonMobil Chemical Company, Houston, Tex. It has an MFR (ASTM-1238D, 2.16 kilograms, 230 degrees Celsius.) of about 13 grams per 10 minutes and a density of 0.90 grams per cubic centimeter ($g/cm^3$).

"VISTAMAXX 6202" is a copolymer primarily composed of isotactic propylene repeat units with about 15 percent by weight (wt. percent) of ethylene repeat units randomly distributed along the copolymer. It is a metallocene catalyzed copolymer available from ExxonMobil Chemical Company, Houston, Tex. and has an MFR (ASTM-1238D, 2.16 kilograms, 230 degrees Celsius.) of about 20 grams per 10 minutes, a density of 0.862 grams per cubic centimeter ($g/cm^3$), and a Durometer Hardness of about 64 (Shore A).

"VISTAMAXX 3000" is a copolymer primarily composed of isotactic propylene repeat units with about 11 percent by weight (wt. percent) of ethylene repeat units randomly distributed along the copolymer. It is a metallocene catalyzed copolymer available from ExxonMobil Chemical Company and has an MFR (ASTM-1238D, 2.16 kilograms, 230 degrees Celsius.) of about 8 grams per 10 minutes, a density of 0.873 grams per cubic centimeter ($g/cm^3$), and a Durometer Hardness of about 27 (Shore D).

"VISTAMAXX 6502" is a copolymer primarily composed of isotactic propylene repeat units with about 13 percent by weight of ethylene repeat units randomly distributed along the copolymer. It is a metallocene catalyzed copolymer available from ExxonMobil Chemical Company and has an MFR (ASTM-1238D, 2.16 kilograms, 230 degrees Celsius.) of about 45 grams per 10 minutes, a density of 0.865 grams per cubic centimeter ($g/cm^3$), and a Durometer Hardness of about 71 (Shore A).

Examples

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

Materials

For the examples described below, the following base resins were used.

TABLE 1

Base Resins
Base Resin Description

| Polyolefin Base Resin | Supplier | MFI | Description |
|---|---|---|---|
| PP9054 | ExxonMobil | 12 | Propylene Random Copolymer |
| PP9074Med | ExxonMobil | 24 | Propylene Random Copolymer/High Clarity |
| PP1024E4 | ExxonMobil | 13 | Propylene Homopolymer |

The following polymeric resin modifiers were used in the examples.

TABLE 2

Polymeric Resin Modifiers
Modifier/Blend Description

| Polymeric Resin Modifiers | Supplier | MFI | Loading percent | Ethylene Percent |
|---|---|---|---|---|
| VISTAMAXX 6202 | ExxonMobil | 21 | 30 | 15 |
| VISTAMAXX 3000 | ExxonMobil | 9.1 | 50 | 11 |
| VISTAMAXX 6502 | ExxonMobil | 43 | 40 | 13 |

The resin compositions including the base resins and varying amounts of polymeric resin modifier were prepared and tested to determine the abrasion loss pursuant to the Abrasion Loss Test using the Neat Material Sampling Procedure; and by a flex test pursuant to the Cold Ross Flex Test using the Plaque Sampling Procedure. The results are presented in Table 3. The percent (percent) crystallization was measured for sample resin compositions using according to the Crystallinity Test using the Neat Material Sampling Procedure. The results are reported in Table 4.

TABLE 3

Density, DIN Abrasion Loss, and Cold Ross Flex Summary of Resin Compositions with Varying Amounts of Polymeric Resin Modifier

| Polyolefin Base Resin | Base Resin wt. percent | Polymeric Resin Modifier | Resin Modifier wt. percent | Cold Ross Flex Summary | Density | DIN Abrasion Loss (cm³) |
|---|---|---|---|---|---|---|
| PP9054 | 100 | n/a | 0 | Fail | 0.896 | 0.089 |
| PP9054 | 85 | 6202 | 15 | Pass | 0.891 | 0.085 |
| PP9054 | 70 | 6202 | 30 | * | 0.891 | 0.095 |
| PP9054 | 50 | 6202 | 50 | * | 0.883 | 0.158 |
| PP9054 | 85 | 6502 | 15 | * | 0.896 | 0.084 |
| PP9054 | 80 | 6502 | 20 | Pass | * | * |
| PP9054 | 60 | 6502 | 40 | * | * | * |
| PP9054 | 85 | 3000 | 15 | * | 0.897 | 0.078 |
| PP9054 | 75 | 3000 | 25 | Pass | * | * |
| PP9054 | 50 | 3000 | 50 | * | * | * |
| PP9074Med | 100 | n/a | 0 | Fail | 0.902 | 0.089 |
| PP9074Med | 85 | 6202 | 15 | * | 0.894 | 0.101 |
| PP9074Med | 70 | 6202 | 30 | Pass | * | * |
| PP1024E4 | 100 | n/a | 0 | Pass | 0.903 | 0.083 |
| PP1024E4 | 85 | 6202 | 15 | * | 0.899 | 0.162 |
| PP1024E4 | 50 | 3000 | 50 | Pass | * | * |

* not determined

TABLE 4

Percent Crystallization of Representative Resin Compositions

| Base Resin | Base Resin wt. percent | Blend Resin | Blend Resin wt. percent | percent Crystallization |
|---|---|---|---|---|
| PP9054 | 100 | n/a | 0 | 38 percent |
| PP9054 | 85 | 6202 | 15 | 34 percent |
| PP9054 | 70 | 6202 | 30 | 30 percent |
| PP9054 | 80 | 6502 | 20 | 24 percent |
| PP9054 | 60 | 6502 | 40 | 24 percent |
| PP9054 | 75 | 3000 | 25 | 29 percent |
| PP9054 | 50 | 3000 | 50 | 23 percent |
| PP9074Med | 100 | n/a | 0 | 45 percent |
| PP9074Med | 70 | 6202 | 30 | 30 percent |
| PP1024E4 | 100 | n/a | 0 | 54 percent |
| PP1024E4 | 50 | 3000 | 50 | 30 percent |

It should be emphasized that the above-described aspects of the present disclosure are merely possible examples of implementations, and are set forth only for a clear understanding of the principles of the disclosure. Many variations and modifications may be made to the above-described aspects of the disclosure without departing substantially from the spirit and principles of the disclosure. All such modifications and variations are intended to be included herein within the scope of this disclosure.

We claim:

1. A sole structure for an article of footwear, the sole structure comprising:
   a plate comprising a first polyolefin resin, the plate having a first side and a second side and a perimeter, wherein the first side is configured to be ground-facing when the plate is a component of an article of footwear; and
   an edge portion comprising a second resin that is different from the first polyolefin resin, the edge portion disposed on at least a portion of the perimeter;
   wherein the first polyolefin resin comprises a resin composition comprising:
      a polypropylene copolymer, which is a random copolymer of ethylene and propylene having an ethylene repeat unit content of about 1 percent to about 5 percent based on the total weight of the polypropylene copolymer; and
      an effective amount of a polymeric resin modifier, which is a copolymer comprising isotactic propylene repeat units and ethylene repeat units having an ethylene repeat unit content of about 10 percent to about 15 percent by weight based upon a total weight of the polymeric resin modifier, wherein the effective amount of the polymeric resin modifier is from about 5 percent to about 30 percent by weight based upon a total weight of the resin composition; and
   wherein the second resin comprises a polymeric component that is substantially similar to the polymeric component of the first polyolefin resin, except the polymeric component of the second resin comprises a greater concentration of the resin modifier than the polymeric component of the first polyolefin resin.

2. The sole structure of claim 1, wherein the edge portion has a flexural modulus that is at least 10 percent lower than a flexural modulus of the plate.

3. The sole structure of claim 1, wherein the edge portion is integral with the plate.

4. The sole structure of claim 1, further comprising a chassis operably coupled with the plate, wherein the chassis comprises the edge portion.

5. The sole structure of claim 1, wherein the plate, the edge portion, or both, have a decorative portion that is colored or printed or both colored and printed.

6. The sole structure of claim 1, wherein the edge portion has a width of from about 0.25 millimeter to about 25 millimeters.

7. An article of footwear comprising:
an upper operably coupled with a sole structure, the sole structure comprising:
a plate comprising a first polyolefin resin, the plate having a first ground-facing side, a second side, and a perimeter; and
an edge portion comprising a second resin that is different from the first polyolefin resin, the edge portion disposed on at least a portion of the perimeter of the plate;
wherein the plate and the edge portion are attached to the upper;
wherein the first polyolefin resin comprises a resin composition comprising:
a polypropylene copolymer, which is a random copolymer of ethylene and propylene having an ethylene repeat unit content of about 1 percent to about 5 percent based on the total weight of the polypropylene copolymer; and
an effective amount of a polymeric resin modifier, which is a copolymer comprising isotactic propylene repeat units and ethylene repeat units having an ethylene repeat unit content of about 10 percent to about 15 percent by weight based upon a total weight of the polymeric resin modifier, wherein the effective amount of the polymeric resin modifier is from about 5 percent to about 30 percent by weight based upon a total weight of the resin composition; and
wherein the second resin comprises a polymeric component that is substantially similar to the polymeric component of the first polyolefin resin, except the polymeric component of the second resin comprises a greater concentration of the resin modifier than the polymeric component of the first polyolefin resin.

8. The article of claim 7, wherein the plate, the edge portion, or both are mechanically bonded to the upper.

9. The article of claim 7, wherein the edge portion has a width of from about 0.25 millimeter to about 25 millimeters.

10. The article of claim 7, wherein the edge portion has a flexural modulus that is at least 10 percent lower than a flexural modulus of the plate.

11. The article of claim 7, wherein the plate, the edge portion, or both, have a decorative portion that is colored or printed or both colored and printed.

12. The article of claim 11, wherein a decorative textile or film is disposed on an interior surface of the plate or edge portion, or both.

13. The article of claim 7, wherein the edge portion has a textured surface.

14. The article of claim 7, wherein the sole structure further comprises one or more traction elements operably coupled with a ground-facing side of the sole structure.

\* \* \* \* \*